United States Patent
Dudar

(10) Patent No.: US 10,815,937 B2
(45) Date of Patent: Oct. 27, 2020

(54) EVAPORATIVE EMISSIONS SYSTEM DIAGNOSTIC FOR GTDI ENGINES USING AN ELECTRONIC BOOSTER

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 420 days.

(21) Appl. No.: 15/727,318

(22) Filed: Oct. 6, 2017

(65) Prior Publication Data

US 2019/0107081 A1   Apr. 11, 2019

(51) Int. Cl.
| | | |
|---|---|---|
| *F02M 25/08* | (2006.01) | |
| *F02D 41/00* | (2006.01) | |
| *F02B 33/34* | (2006.01) | |
| *F02B 39/10* | (2006.01) | |
| *F02B 37/04* | (2006.01) | |

(Continued)

(52) U.S. Cl.
CPC .......... *F02M 25/0818* (2013.01); *F02B 33/34* (2013.01); *F02B 37/04* (2013.01); *F02B 39/10* (2013.01); *F02D 41/004* (2013.01); *F02D 41/0032* (2013.01); *F02D 41/0037* (2013.01); *F02M 25/089* (2013.01);

(Continued)

(58) Field of Classification Search
CPC ............. F02M 25/0818; F02M 25/089; F02M 25/0809; F02B 37/04; F02B 39/10; F02B 33/34; F02D 41/0032; F02D 41/004; F02D 41/0037; F02D 41/0007; F02D 41/042; G01M 15/102

See application file for complete search history.

(56) References Cited

U.S. PATENT DOCUMENTS

| | | | | |
|---|---|---|---|---|
| 6,550,316 B1 * | 4/2003 | Wong | ................. | F02M 25/0809 73/40.5 R |
| 6,807,851 B2 * | 10/2004 | Wakahara | .......... | F02M 25/0809 73/114.38 |

(Continued)

OTHER PUBLICATIONS

Dudar, Aed, "Evaporative Emissions System Check Valve Monitor for GTDI Engines," U.S. Appl. No. 15/225,662, filed Aug. 1, 2016, 77 pages.

(Continued)

*Primary Examiner* — David Hamaoui
(74) *Attorney, Agent, or Firm* — Geoffrey Brumbaugh; McCoy Russell LLP

(57) ABSTRACT

Methods and systems are provided for diagnosing a vehicle fuel system and evaporative emissions system, and for diagnosing components in the evaporative emissions system. In one example, a method comprises activating an electric compressor while an engine that propels a vehicle is not in operation, to evacuate the fuel system and evaporative emissions system, sealing the fuel system and evaporative emissions system responsive to a threshold vacuum being reached during the evacuating, and indicating a presence or absence of non-gross undesired evaporative emissions based on a pressure rise in the sealed fuel system and evaporative emissions system. In this way, sources of undesired evaporative emissions may be readily detected, such that release of undesired evaporative emissions to the environment may be reduced.

7 Claims, 11 Drawing Sheets

| | Vac threshold reached under boost? | Vac threshold reached under natural aspiration? | Diagnosis |
|---|---|---|---|
| A | Yes | Yes | CV1, CV2 not stuck closed and no gross undesired emissions |
| B | No | No | CV1, CV2 not stuck closed and gross undesired emissions present |
| C | Yes | No | CV2 not stuck closed, CV1 stuck closed and no gross undesired emissions present |
| D | No | Yes | CV2 stuck closed, CV1 not stuck closed and no gross undesired emissions present |

(51) Int. Cl.
*G01M 15/10* (2006.01)
*F02D 41/04* (2006.01)

(52) U.S. Cl.
CPC ....... *G01M 15/102* (2013.01); *F02D 41/0007* (2013.01); *F02D 41/042* (2013.01)

(56) References Cited

U.S. PATENT DOCUMENTS

| | | | | |
|---|---|---|---|---|
| 7,272,488 | B2* | 9/2007 | Hayashi | F02M 25/0827 |
| | | | | 701/114 |
| 8,725,347 | B2* | 5/2014 | Jentz | G01M 3/025 |
| | | | | 180/441 |
| 9,133,796 | B2* | 9/2015 | Plymale | F02M 25/089 |
| 9,243,595 | B2* | 1/2016 | Euliss | F02M 25/08 |
| 9,376,991 | B2* | 6/2016 | Dudar | F02M 25/0818 |
| 9,399,970 | B2* | 7/2016 | Peters | F02M 25/0818 |
| 9,470,185 | B2* | 10/2016 | Dudar | F02M 25/0809 |
| 9,528,473 | B2* | 12/2016 | Dudar | F02M 25/0836 |
| 9,797,348 | B2* | 10/2017 | Dudar | F02M 25/089 |
| 9,822,719 | B2* | 11/2017 | Dudar | F02M 25/0854 |
| 9,828,951 | B2* | 11/2017 | Dudar | F02M 25/0809 |
| 9,840,985 | B2* | 12/2017 | Martin | F02M 25/0818 |
| 9,945,752 | B2* | 4/2018 | Dudar | G01L 27/002 |
| 9,957,924 | B2* | 5/2018 | Dudar | F02M 25/0809 |
| 9,976,519 | B2* | 5/2018 | Tseng | F02M 25/0809 |
| 10,001,088 | B2* | 6/2018 | Dudar | F02M 25/0818 |
| 10,018,158 | B2* | 7/2018 | Dudar | F02M 25/0809 |
| 10,041,449 | B2* | 8/2018 | Dudar | F02M 25/0818 |
| 10,107,233 | B2* | 10/2018 | Dudar | F02M 25/0818 |
| 10,145,339 | B1* | 12/2018 | Werner | F02M 25/0872 |
| 10,150,365 | B2* | 12/2018 | Dudar | B60K 15/03504 |
| 10,190,934 | B2* | 1/2019 | Dudar | G01M 3/025 |
| 10,273,907 | B2* | 4/2019 | Dudar | F02M 25/0809 |
| 10,378,485 | B2* | 8/2019 | Dudar | F02M 25/0818 |
| 10,393,071 | B2* | 8/2019 | Dudar | F01N 3/103 |
| 10,451,010 | B2* | 10/2019 | Dudar | F02D 41/221 |
| 2013/0253799 | A1* | 9/2013 | Peters | F02M 25/0818 |
| | | | | 701/102 |
| 2014/0026865 | A1 | 1/2014 | Dudar et al. | |
| 2016/0290285 | A1* | 10/2016 | Dudar | F02M 25/089 |
| 2017/0031415 | A1 | 2/2017 | Allen-Ware et al. | |
| 2017/0241376 | A1* | 8/2017 | Dudar | F02M 25/0809 |
| 2017/0342931 | A1* | 11/2017 | Dudar | F02D 41/222 |
| 2017/0350351 | A1* | 12/2017 | Lucka | F02M 25/0818 |
| 2017/0356393 | A1* | 12/2017 | Dudar | F02M 25/0809 |
| 2017/0363046 | A1* | 12/2017 | Dudar | F02D 41/064 |
| 2018/0030932 | A1* | 2/2018 | Dudar | F02M 25/0809 |
| 2019/0186392 | A1* | 6/2019 | Dudar | F02D 41/22 |

OTHER PUBLICATIONS

Davies, A., "A Little Fan That Fixes the Turbocharger's Biggest Problem," Wired website, Available online at https://www.wired.com/2017/04/little-fan-fixes-turbochargers-biggest-problem/, Apr. 28, 2017, 7 pages.

* cited by examiner

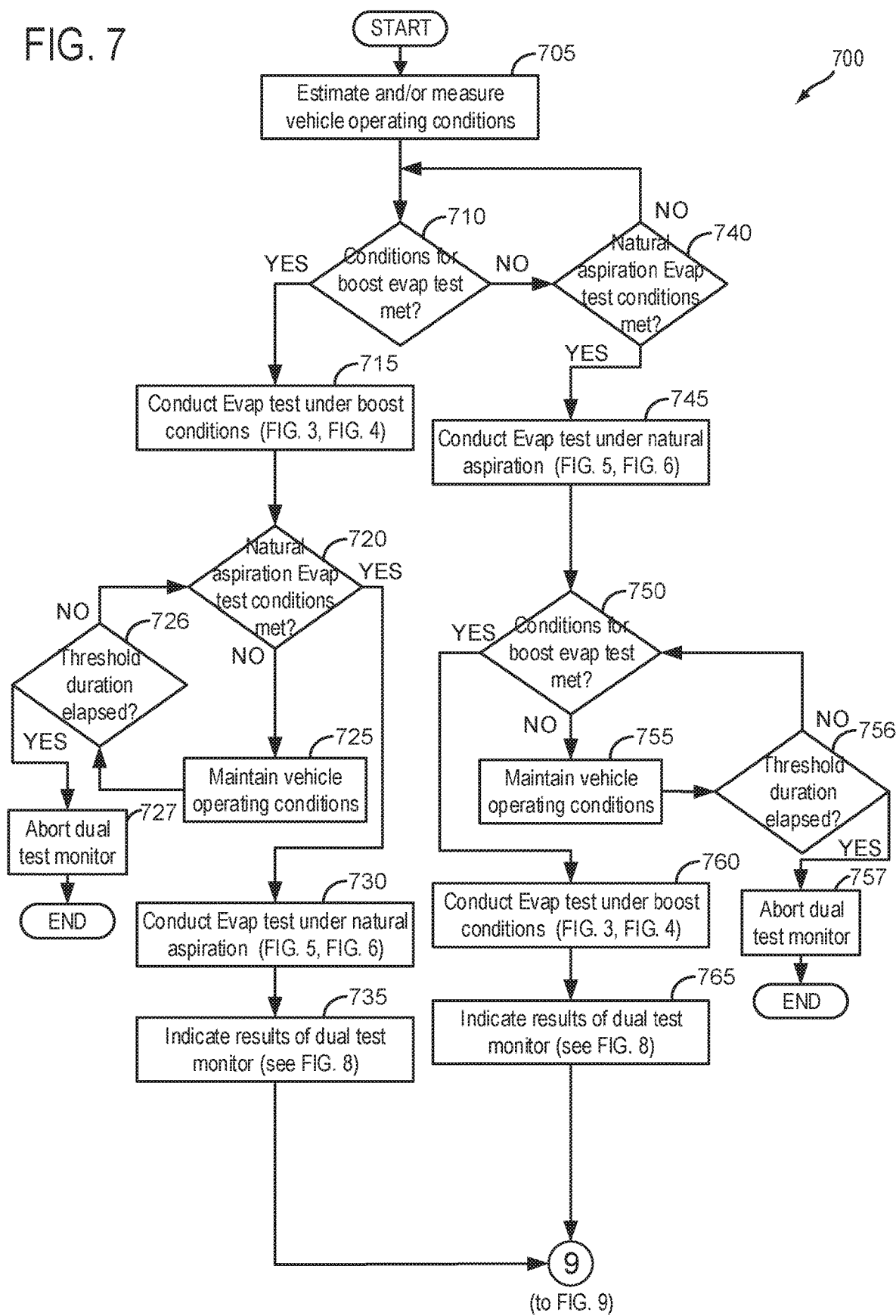

| | Vac threshold reached under boost? | Vac threshold reached under natural aspiration? | Diagnosis |
|---|---|---|---|
| A | Yes | Yes | CV1, CV2 not stuck closed and no gross undesired emissions |
| B | No | No | CV1, CV2 not stuck closed and gross undesired emissions present |
| C | Yes | No | CV2 not stuck closed, CV1 stuck closed and no gross undesired emissions present |
| D | No | Yes | CV2 stuck closed, CV1 not stuck closed and no gross undesired emissions present |

US 10,815,937 B2

EVAPORATIVE EMISSIONS SYSTEM DIAGNOSTIC FOR GTDI ENGINES USING AN ELECTRONIC BOOSTER

FIELD

The present description relates generally to methods and systems for diagnosing a vehicle fuel system and evaporative emissions system for undesired evaporative emissions, and for diagnosing components in the evaporative emissions system, where the vehicle includes an electronic booster.

BACKGROUND/SUMMARY

Vehicles may be fitted with evaporative emission control systems such as onboard fuel vapor recovery systems. Such systems capture and prevent release of vaporized hydrocarbons to the atmosphere, for example fuel vapors generated in a vehicle gasoline tank during refueling. Specifically, the vaporized hydrocarbons (HCs) are stored in a fuel vapor canister packed with an adsorbent which adsorbs and stores the vapors. At a later time, when the engine is in operation, the evaporative emission control system allows the vapors to be purged into the engine intake manifold for use as fuel. The fuel vapor recovery system may include one more check valves, ejectors, and/or controller actuatable valves for facilitating purge of stored vapors under boosted or non-boosted engine operation.

Various approaches have been developed for detecting undesired fuel vapor evaporative emissions and/or degraded components in such fuel vapor recovery systems. However, the inventors have recognized several potential issues with such methods. The inventors have recognized that, in particular, it may be difficult to diagnose one or more check valves positioned in the evaporative emissions control system, during vehicle operation under boosted or non-boosted conditions. For example, under non-boosted conditions (e.g. natural aspiration), it may be difficult to determine if a first check valve positioned downstream of a canister purge valve (CPV) and upstream of an intake manifold of the engine is stuck closed, or if gross undesired evaporative emissions are present in the evaporative emissions control system. Furthermore, under boosted conditions, it may similarly be difficult to determine if a second check valve positioned downstream of the CPV and upstream of an ejector and intake passage, is stuck closed, or if gross undesired evaporative emissions are present in the evaporative emissions control system. More specifically, a stuck closed first check valve may be incorrectly interpreted as gross undesired evaporative emissions under non-boosted conditions. Alternatively, under boosted conditions, gross undesired evaporative emissions may be incorrectly interpreted as a stuck closed second check valve.

Furthermore, in certain types of vehicles, for example hybrid electric vehicles (HEVs) and plug-in HEVs (PHEVs), engine run-time may be limited, and thus techniques such as engine off natural vacuum (EONV), which rely on heat rejection from the engine, may not be utilized to conduct tests for a presence or absence of non-gross undesired evaporative emissions stemming from the evaporative emissions system and/or a fuel system of the vehicle. To get around such an issue, a vacuum pump may be incorporated into the vehicle system for conducting tests for non-gross undesired evaporative emissions. However, such a pump adds weight, cost, etc., and its use may not be address the diagnostics discussed above under boosted and non-boosted conditions. The inventors have herein recognized these issues.

Thus, the inventors herein have developed systems and methods to at least partially address the above issues. In one example a method is provided, comprising under predetermined conditions, supplying air from an electric compressor to an engine that propels a vehicle, evacuating a fuel system and an evaporative emissions system of the vehicle to a threshold vacuum by activating the electric compressor when the engine is off, and indicating a presence or absence of non-gross undesired evaporative emissions based on a pressure rise in the fuel system and the evaporative emissions system after reaching the threshold vacuum. In this way, the presence of non-gross undesired evaporative emissions may be diagnosed during engine-off conditions, without additional componentry such as the vacuum pump referred to above.

In one example, such a method may include responsive to the threshold vacuum being reached during the evacuating the fuel system and the evaporative emissions system via activating the electric compressor, indicating an absence of gross undesired evaporative emissions in the fuel system and the evaporative emissions system, and indicating that a second check valve, positioned upstream of the ejector system, is functioning as desired. Responsive to the threshold vacuum being reached during the evacuating the fuel system and the evaporative emissions system, in one example such a method may include subsequently evacuating the fuel system and the evaporative emissions system under conditions of negative pressure in an intake of the engine where the electric compressor is off and, responsive to the threshold vacuum being reached during evacuating the fuel system and the evaporative emissions system under conditions of negative pressure, indicating that a first check valve positioned upstream of the intake is functioning as desired. In this way, it may be possible to robustly and accurately diagnose the presence or absence of gross undesired evaporative emissions and whether the first and/or second check valves are functioning as desired. The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 7 shows a high-level example method for conducting a dual-test monitor on a vehicle evaporative emissions system, utilizing the methods depicted at FIGS. 3-6.

FIG. 8 schematically illustrates an example lookup table stored at a vehicle controller, for determining results of the dual test monitor of FIG. 7.

DETAILED DESCRIPTION

The following description relates to systems and methods for conducting one or more tests for a presence or absence of undesired evaporative emissions on a vehicle fuel system and evaporative emissions system, and for diagnosing components in the evaporative emissions system, based on the results of the one or more tests. The tests for the presence or absence of undesired evaporative emissions may be conducted on a vehicle system that includes a dual-path purge system, with an ejector system and an electric booster, such as the vehicle system depicted at FIG. 1. The vehicle system depicted at FIG. 1 may comprise a hybrid electric vehicle system, such as the vehicle system depicted at FIG. 2. In one example, the one or more tests may include an engine-off boost evaporative emissions test, which may utilize the electric booster to generate positive intake pressure with respect to atmospheric pressure. The positive pressure may be communicated to an ejector system, which may draw a vacuum (negative pressure with respect to atmospheric pressure) on the vehicle fuel system and evaporative emissions system in order to indicate the presence or absence of undesired evaporative emissions, according to FIG. 3. In another example, a similar test as that depicted in FIG. 3, may be conducted under conditions where the engine is operating to combust air and fuel, as illustrated by the method depicted at FIG. 4.

Figure 5:
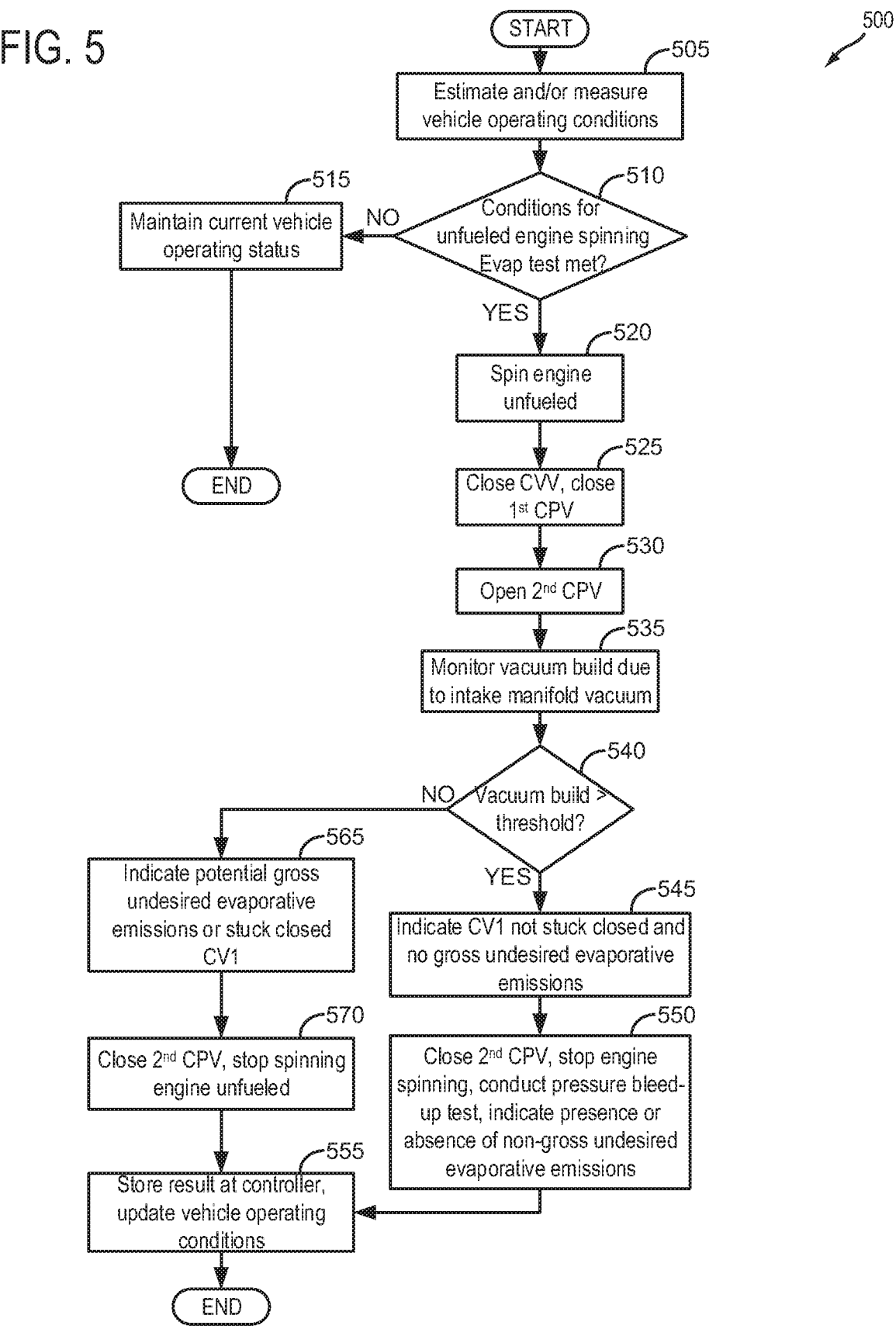
FIG. 5 shows a high-level example method for conducting a test for undesired evaporative emissions on a fuel system and evaporative emissions system, via spinning an engine unfueled.

In another example, the one or more tests may include drawing a vacuum on the fuel system and evaporative emissions system via natural aspiration, where the engine is spun unfueled, to generate negative pressure in an intake manifold of the engine that is used to draw the vacuum on the fuel system and evaporative emissions system, according to the method of FIG. 5. In still another example, the one or more tests may include drawing a vacuum on the fuel system and evaporative emissions system via natural aspiration, where the engine is in operation and combusting air and fuel, which may generate negative pressure in the intake manifold of the engine that is used to draw the vacuum on the fuel system and evaporative emissions system, according to the method of FIG. 6.

The methods depicted at FIGS. 3-6 may be utilized in various combinations, to conduct a dual test monitor, which may enable a determination of whether gross or non-gross undesired evaporative emissions are present in the fuel system and evaporative emissions system, and whether one or more components (e.g. check valves) in the evaporative emissions system are functioning as desired, according to the method of FIG. 7. Results of such a test may be interpreted via a lookup table stored at a controller of the vehicle, such as the lookup table illustrated at FIG. 8.

Figure 9:
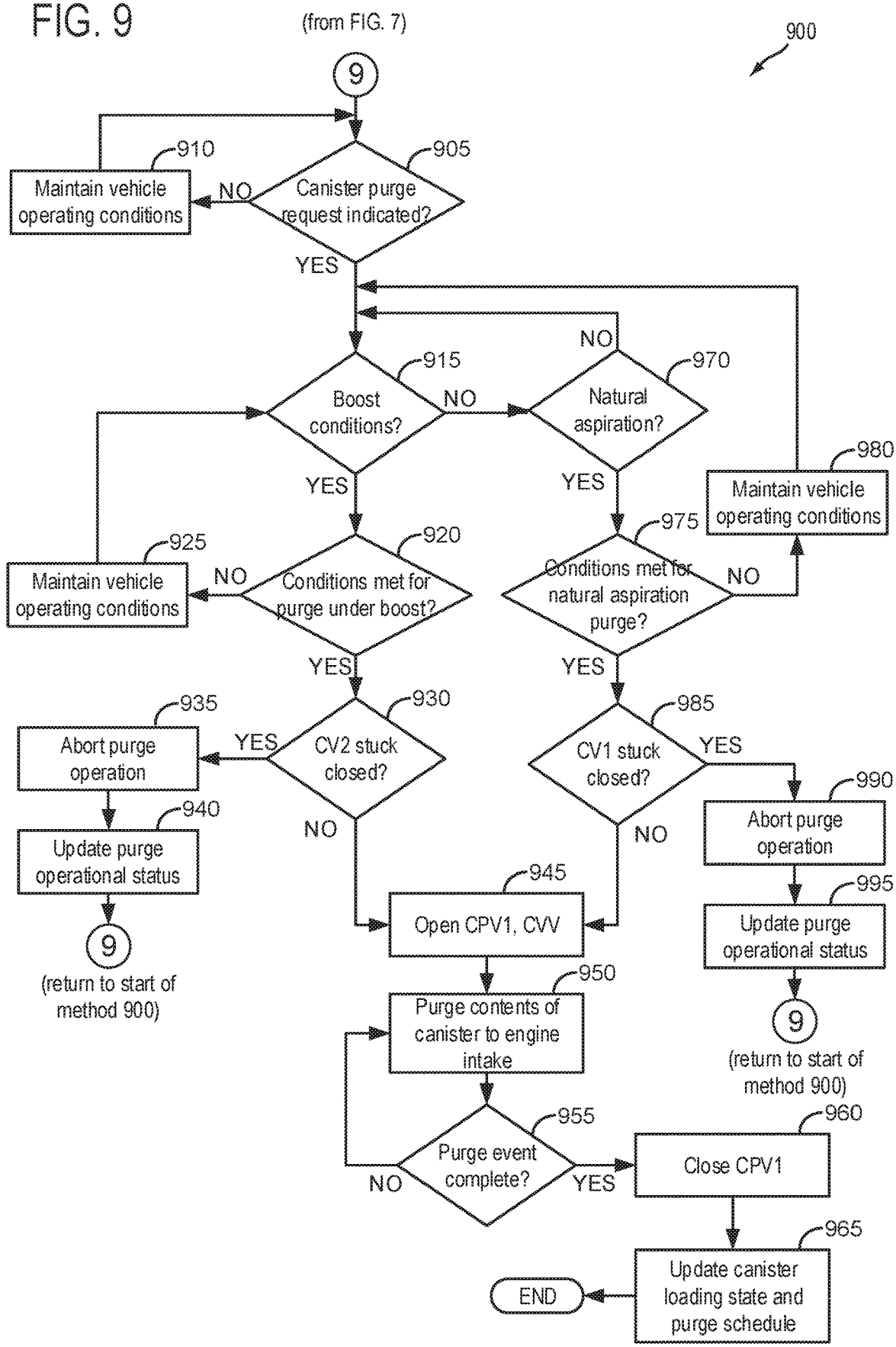
FIG. 9 shows a high-level example method for conducting a fuel vapor canister purging operation, depending on results of the dual test monitor of FIG. 7.
Figure 10:
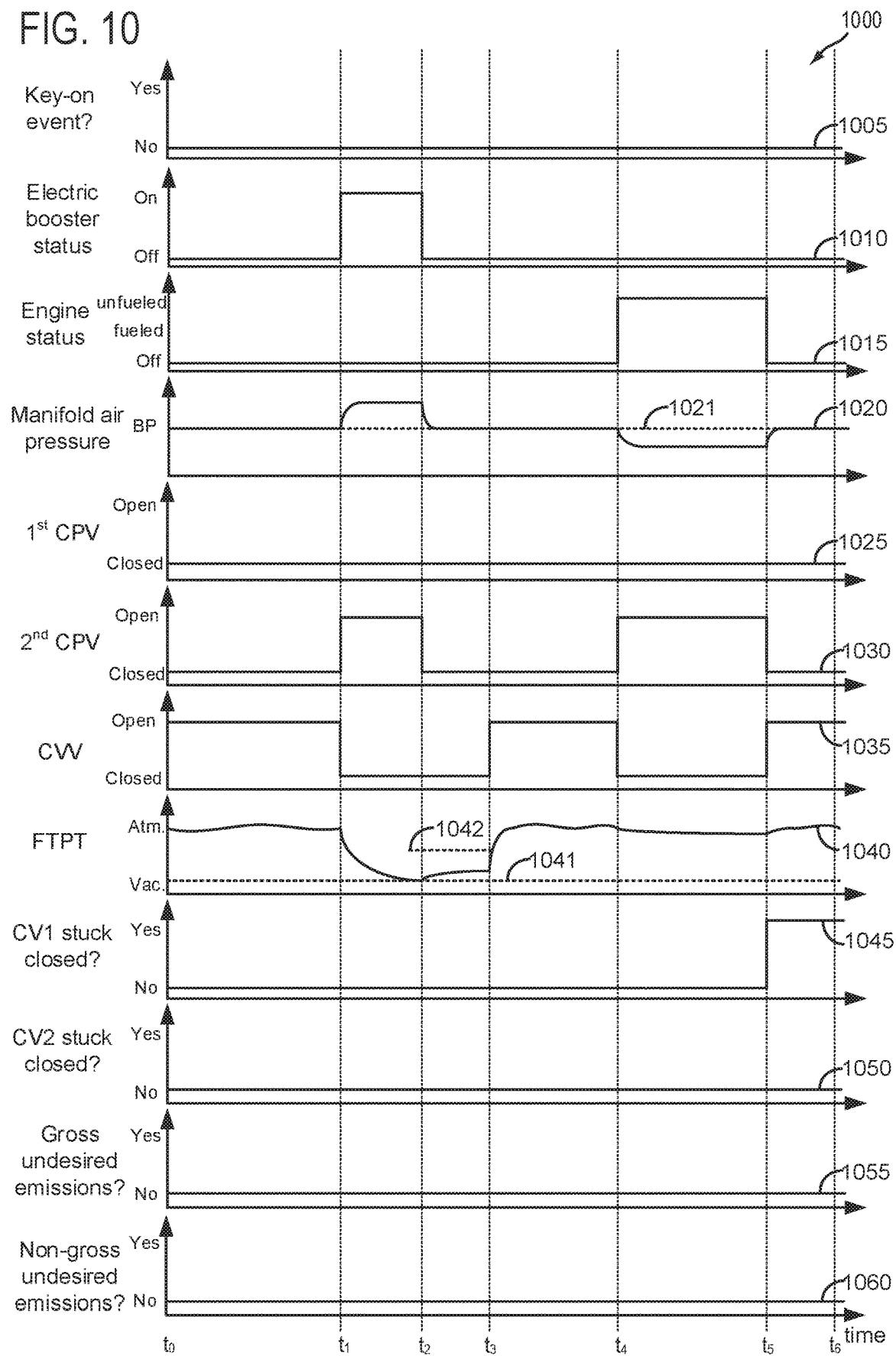
FIG. 10 shows an example timeline for conducting the dual test monitor, according to FIG. 7.
Figure 11:
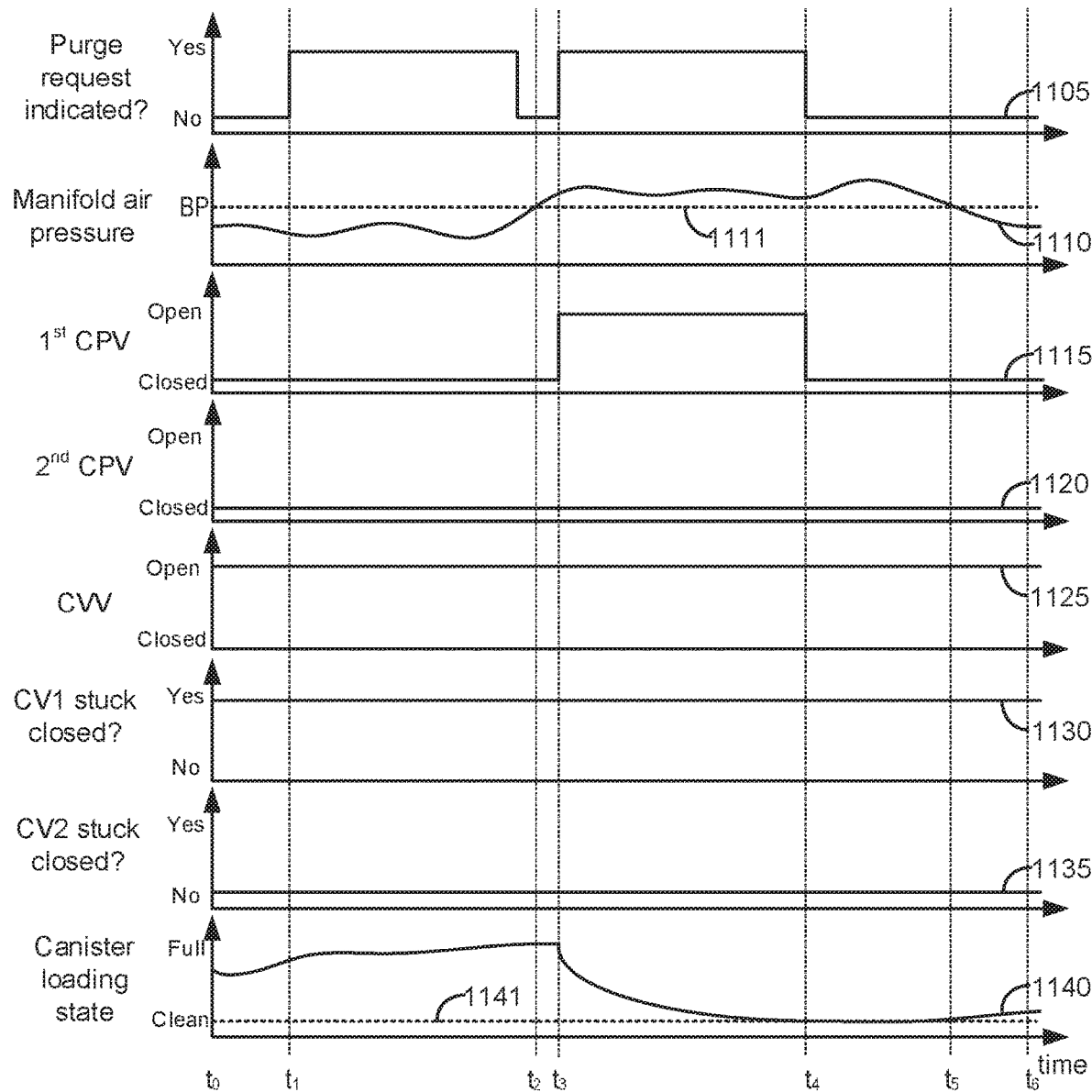
FIG. 11 shows an example timeline for conducting a fuel vapor canister purging operation, subsequent to obtaining results of the dual test monitor illustrated at FIG. 7.

In some examples, responsive to one or another of the one or more check valves in the evaporative emissions system being indicated to be stuck closed, a fuel vapor canister purging operation may be opportunistically conducted in order to ensure robust cleaning of the fuel vapor canister, according to the method depicted at FIG. 9. A timeline for conducting the dual test monitor depicted at FIG. 7 is depicted at FIG. 10. A timeline for opportunistically conducting the fuel vapor canister purging operation according to FIG. 9, is depicted at FIG. 11.

Figure 1:
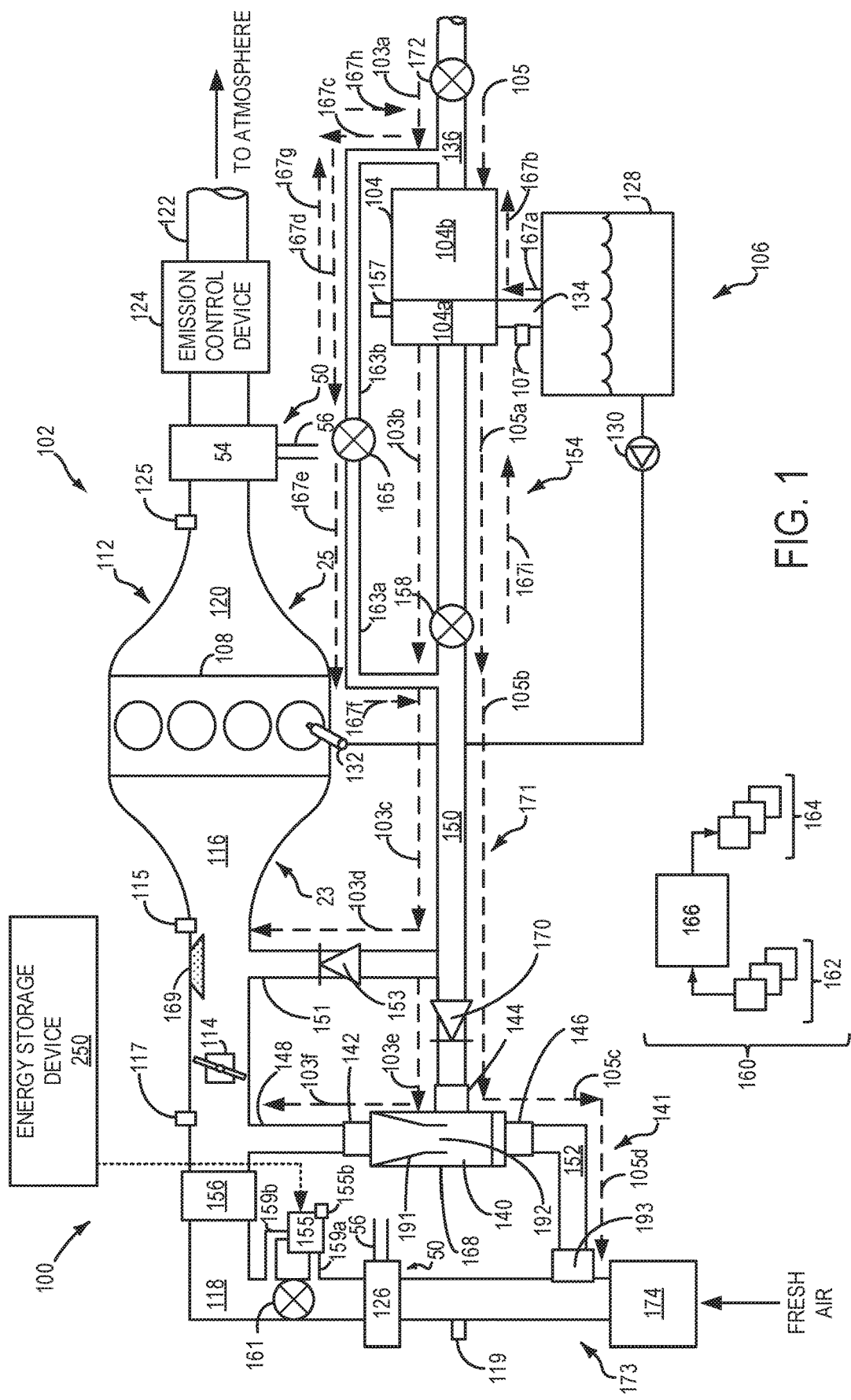
FIG. 1 shows a schematic diagram of a multi-path fuel vapor recovery system of a vehicle system.

Turning to the figures, FIG. 1 shows a schematic depiction of a vehicle system 100. The vehicle system 100 includes an engine system 102 coupled to a fuel vapor recovery system (evaporative emissions control system) 154 and a fuel system 106. The engine system 102 may include an engine 112 having a plurality of cylinders 108. In some examples, the vehicle system may be configured as a hybrid electric vehicle (HEV) or plug-in HEV (PHEV). Accordingly, an onboard energy storage device 250 may be included in the vehicle system 100. The onboard energy storage device 250 may comprise a high-voltage battery, capacitor, supercapacitor, etc. Details of componentry and operating conditions related to hybrid vehicle operation will be discussed in detail at FIG. 2. The engine 112 includes an engine intake 23 and an engine exhaust 25. The engine intake 23 includes a throttle 114 fluidly coupled to the engine intake manifold 116 via an intake passage 118. An air filter 174 is positioned upstream of throttle 114 in intake passage 118. The engine exhaust 25 includes an exhaust manifold 120 leading to an exhaust passage 122 that routes exhaust gas to the atmosphere. The engine exhaust 122 may include one or more emission control devices 124, which may be mounted in a close-coupled position in the exhaust. One or more emission control devices may include a three-way catalyst, lean NOx trap, diesel particulate filter, oxidation catalyst, etc. It will be appreciated that other components may be included in the vehicle system, such as a variety of valves and sensors, as further elaborated below.

Throttle 114 may be located in intake passage 118 downstream of a compressor 126 of a boosting device, such as turbocharger 50, or a supercharger. Compressor 126 of turbocharger 50 may be arranged between air filter 174 and throttle 114 in intake passage 118. Compressor 126 may be at least partially powered by exhaust turbine 54, arranged between exhaust manifold 120 and emission control device 124 in exhaust passage 122. Compressor 126 may be coupled to exhaust turbine 54 via shaft 56. Compressor 126 may be configured to draw in intake air at atmospheric air pressure into an air induction system (AIS) 173 and boost it to a higher pressure. Using the boosted intake air, a boosted engine operation may be performed.

An amount of boost may be controlled, at least in part, by controlling an amount of exhaust gas directed through exhaust turbine 54. In one example, when a larger amount of boost is requested, a larger amount of exhaust gases may be directed through the turbine. Alternatively, for example when a smaller amount of boost is requested, some or all of the exhaust gas may bypass turbine via a turbine bypass passage as controlled by wastegate (not shown). An amount of boost may additionally or optionally be controlled by controlling an amount of intake air directed through compressor 126. Controller 166 may adjust an amount of intake air that is drawn through compressor 126 by adjusting the position of a compressor bypass valve (not shown). In one example, when a larger amount of boost is requested, a smaller amount of intake air may be directed through the compressor bypass passage.

While turbochargers (e.g. 50) are commonly used in gasoline turbo direct injection (GTDI) vehicles to boost power to the driven wheels, there may in some examples be a delay in time between a request for the boosted operation, and the delivery of torque. More specifically, as power from the turbocharger may utilize waste heat from the exhaust system, there may be a delay in turbo spooling, as torque from the exhaust pressure onto the exhaust turbine may first overcome rotational inertia of the turbine-compressor assembly, as well as friction and compressor load.

To assist the turbocharger, an electric booster 155 (eBooster) may be incorporated into the vehicle propulsion system. Electric booster 155 may be powered via an onboard energy storage device 250, which may comprise a battery, capacitor, supercapacitor, etc. In one example, electric booster 155 may be activated (actuated on) in response to a demand for wheel torque, in order to provide the desired boost air rapidly to the engine, without delay as may otherwise occur if the turbocharger 50 was utilized without the electric booster. In such an example, responsive to the turbocharger spooling up to a threshold speed (e.g. 70,000 rpm), the electric booster 155 may be actuated off, or deactivated. More specifically, operational control of the electric booster 155 may be under control of the vehicle controller (e.g. 166). For example, the controller may send a signal to an electric booster actuator 155*b*, which may actuate on the electric booster. In another example, the controller may send a signal to the electric booster actuator 155*b*, which may actuate off the electric booster. In one example the electric booster actuator may comprise a motor which drives the compression of air.

Electric booster 155 may be positioned between a first electric booster conduit 159*a*, and a second electric booster conduit 159*b*. First electric booster conduit 159*a* may fluidically couple intake passage 118 to electric booster 155 upstream of electric booster bypass valve 161. Second electric booster conduit 159*b* may fluidically couple electric booster 155 to intake passage 118 downstream of electric booster bypass valve 161. As an example, air may be drawn into electric booster 155 via first electric booster conduit 159*a* upstream of electric booster bypass valve 161, and compressed air may exit electric booster 155 and be routed via second electric booster conduit to intake passage 118 downstream of electric booster bypass valve 161. In this way, compressed air may be routed to engine intake 23.

In circumstances where the electric booster 155 is activated to provide boost more rapidly than if the turbocharger 50 were solely relied upon, it may be understood that electric booster bypass valve 161 may be commanded closed while electric booster 155 is activated. In this way, intake air may flow through turbocharger 50 and through electric booster 155. Once the turbocharger reaches the threshold speed, the electric booster 155 may be turned off, and the electric booster bypass valve 161 may be commanded open.

Fuel system 106 may include a fuel tank 128 coupled to a fuel pump system 130. The fuel pump system 130 may include one or more pumps for pressurizing fuel delivered to fuel injectors 132 of engine 112. While only a single fuel injector 132 is shown, additional injectors may be provided for each cylinder. For example, engine 112 may be a direct injection gasoline engine and additional injectors may be provided for each cylinder. It will be appreciated that fuel system 106 may be a return-less fuel system, a return fuel system, or various other types of fuel system. In some examples, a fuel pump may be configured to draw the tank's liquid from the tank bottom. Vapors generated in fuel system 106 may be routed to fuel vapor recovery system (evaporative emissions control system) 154, described further below, via conduit 134, before being purged to the engine intake 23.

Fuel vapor recovery system 154 includes a fuel vapor retaining device or fuel vapor storage device, depicted herein as fuel vapor canister 104. Canister 104 may be filled with an adsorbent capable of binding large quantities of vaporized HCs. In one example, the adsorbent used is activated charcoal. Canister 104 may include a buffer 104*a* (or buffer region) and a non-buffer region 104*b*, each of the buffer 104*a* and the non-buffer region 104*b* comprising the adsorbent. The adsorbent in the buffer 104*a* may be the same as, or different from, the adsorbent in the non-buffer region 104*b*. As illustrated, the volume of buffer 104*a* may be smaller than (e.g. a fraction of) the volume of the non-buffer region 104*b*. Buffer 104*a* may be positioned within canister 104 such that during canister loading, fuel tank vapors are first adsorbed within the buffer, and then when the buffer is saturated, further fuel tank vapors are adsorbed in the non-buffer region 104*b* of canister 104. In comparison, during canister purging, fuel vapors may first be desorbed from the non-buffer region 104*b* (e.g., to a threshold amount) before being desorbed from the buffer 104*a*. In other words, loading and unloading of the buffer is not linear with the loading and unloading of the non-buffer region. As such, the effect of the canister buffer is to dampen any fuel vapor spikes flowing from the fuel tank to the canister, thereby reducing the possibility of any fuel vapor spikes going to the engine.

Canister 104 may receive fuel vapors from fuel tank 128 through conduit 134. While the depicted example shows a single canister, it will be appreciated that in alternate embodiments, a plurality of such canisters may be connected together. Canister 104 may communicate with the atmosphere through vent line 136. In some examples, a canister vent valve 172 may be located along vent line 136, coupled between the fuel vapor canister and the atmosphere, and may adjust a flow of air and vapors between canister 104 and the atmosphere. However, in other examples, a canister vent valve may not be included. In one example, operation of canister vent valve 172 may be regulated by a canister vent solenoid (not shown). For example, based on whether the canister is to be purged or not, the canister vent valve may be opened or closed. In some examples, an evaporative level check monitor (ELCM) (not shown) may be disposed in vent line 136 and may be configured to control venting and/or assist in detection of undesired evaporative emissions. Furthermore, in some examples, one or more oxygen sensors may be positioned in the engine intake 116, or coupled to the canister 104 (e.g., downstream of the canister), to provide an estimate of canister load. In still further examples, one or more temperature sensors 157 may be coupled to and/or within canister 104. As will be discussed in further detail below, as fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister, and may be used to estimate canister load.

Conduit 134 may optionally include a fuel tank isolation valve (not shown). Among other functions, fuel tank isolation valve may allow the fuel vapor canister 104 to be maintained at a low pressure or vacuum without increasing the fuel evaporation rate from the tank (which would otherwise occur if the fuel tank pressure were lowered). The fuel tank 128 may hold a plurality of fuel blends, including fuel with a range of alcohol concentrations, such as various gasoline-ethanol blends, including E10, E85, gasoline, etc., and combinations thereof.

Fuel vapor recovery system 154 may include a dual path purge system 171. Purge system 171 is coupled to canister 104 via a conduit 150. Conduit 150 may include a canister purge valve (CPV) 158 disposed therein. Discussed herein, CPV 158 may be referred to as first CPV (CPV1) 158. Specifically, CPV1 158 may regulate the flow of vapors along duct 150. The quantity and rate of vapors released by CPV1 158 may be determined by the duty cycle of an associated CPV1 solenoid (not shown). In one example, the duty cycle of the CPV1 solenoid may be determined by controller 166 responsive to engine operating conditions, including, for example, an air-fuel ratio. By commanding the CPV1 to be closed, the controller may seal the fuel vapor canister from the fuel vapor purging system, such that no vapors are purged via the fuel vapor purging system. In contrast, by commanding the CPV1 to be open, the controller may enable the fuel vapor purging system to purge vapors from the fuel vapor canister.

Fuel vapor canister 104 operates to store vaporized hydrocarbons (HCs) from fuel system 106. Under some operating conditions, such as during refueling, fuel vapors present in the fuel tank may be displaced when liquid is added to the tank. The displaced air and/or fuel vapors may be routed from the fuel tank 128 to the fuel vapor canister 104, and then to the atmosphere through vent line 136. In this way, an increased amount of vaporized HCs may be stored in fuel vapor canister 104. During a later engine operation, the stored vapors may be released back into the incoming air charge via fuel vapor purging system 171.

In some examples, an air intake system hydrocarbon trap (AIS HC) 169 may be placed in the intake manifold of engine 112 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 169. In addition, fuel vapors stored during an engine shutdown can also be desorbed from the AIS HC during engine operation. In this way, AIS HC 169 may be continually loaded and purged, and the trap may reduce evaporative emissions from the intake passage even when engine 112 is shut down.

Conduit 150 is coupled to an ejector 140 in an ejector system 141 and includes a second check valve (CV2) 170 disposed therein between ejector 140 and CPV1 158. Second check valve (CV2) 170 may prevent intake air from flowing through from the ejector into conduit 150, while allowing flow of air and fuel vapors from conduit 150 into ejector 140. CV2 170 may be a vacuum-actuated check valve, for example, that opens responsive to vacuum derived from ejector 140.

A conduit 151 couples conduit 150 to intake 23 at a position within conduit 150 between CV2 170 and CPV1 158 and at a position in intake 23 downstream of throttle 114. For example, conduit 151 may be used to direct fuel vapors from canister 104 to intake 23 using vacuum generated in intake manifold 116 during a purge event. Conduit 151 may include a first check valve (CV1) 153 disposed therein. First check valve (CV1) 153 may prevent intake air from flowing through from intake manifold 116 into conduit 150, while allowing flow of fluid and fuel vapors from conduit 150 into intake manifold 116 via conduit 151 during a canister purging event. CV1 may be a vacuum actuated check valve, for example, that opens responsive to vacuum derived from intake manifold 116.

Conduit 148 may be coupled to ejector 140 at a first port or inlet 142. Ejector 140 includes a second port 144 or inlet coupling ejector 140 to conduit 150. Ejector 140 is coupled to intake 23 at a position upstream of throttle 114 and downstream of compressor 126 via a conduit 148. During boost conditions, conduit 148 may direct compressed air in intake conduit 118 downstream of compressor 126 into ejector 140 via port 142.

In some examples, a second canister purge valve (CPV2) 165 may be configured to be selectively fluidically coupled to conduit 150 downstream of CPV1 158, and to vent line 136 upstream of fuel vapor canister 104. More specifically, a conduit 163a (first conduit 163a) may fluidically couple CPV2 165 to conduit 150 (purge conduit 150) downstream of CPV1 158, and a conduit 163b (second conduit 163b) may fluidically couple CPV2 165 to vent line 136 between CVV 172 and fuel vapor canister 104. Operation of the CPV2 165, and conditions for operating CPV2 165, will be discussed in detail below. Briefly, CPV2 may be regulated by a CPV2 solenoid (not shown), where a command from the controller 166 of the vehicle to the CPV2 solenoid may actuate open or closed the CPV2.

Ejector 140 may also be coupled to intake conduit 118 at a position upstream of compressor 126 via a shut-off valve 193. Shut-off valve 193 is hard-mounted directly to air induction system 173 along conduit 118 at a position between air filter 174 and compressor 126. For example, shut-off valve 193 may be coupled to an existing AIS nipple or other orifice, e.g., an existing SAE male quick connect port, in AIS 173. Hard-mounting may include a direct mounting that is inflexible. For example, an inflexible hard mount could be accomplished through a multitude of methods including spin welding, laser bonding, or adhesive. Shut-off valve 193 is configured to close in response to undesired emissions detected downstream of outlet 146 of ejector 140. As shown in FIG. 1, in some examples, a conduit or hose 152 may couple the third port 146 or outlet of ejector 140 to shut-off valve 193. In this example, if a disconnection of shut-off valve 193 with AIS 173 is detected, then shut-off valve 193 may close so air flow from the engine intake downstream of the compressor through the converging orifice in the ejector is discontinued. However, in other examples, shut-off valve may be integrated with ejector 140 and directly coupled thereto.

Ejector 140 includes a housing 168 coupled to ports 146, 144, and 142. In one example, only the three ports 146, 144, and 142 are included in ejector 140. Ejector 140 may include various check valves disposed therein. For example, in some examples, ejector 140 may include a check valve positioned adjacent to each port in ejector 140 so that unidirectional flow of fluid or air is present at each port. For example, air from intake conduit 118 downstream of compressor 126 may be directed into ejector 140 via inlet port 142 and may flow through the ejector and exit the ejector at outlet port 146 before being directed into intake conduit 118 at a position upstream of compressor 126. This flow of air through the ejector may create a vacuum due to the Venturi effect at inlet port 144 so that vacuum is provided to conduit 150 via port 144 during boosted operating conditions. In particular, a low pressure region is created adjacent to inlet port 144 which may be used to draw purge vapors from the canister into ejector 140.

Ejector 140 includes a nozzle 191 comprising an orifice which converges in a direction from inlet 142 toward suction inlet 144 so that when air flows through ejector 140 in a direction from port 142 towards port 146, a vacuum is created at port 144 due to the Venturi effect. This vacuum may be used to assist in fuel vapor purging during certain conditions, e.g., during boosted engine conditions. In one example, ejector 140 is a passive component. That is, ejector 140 is designed to provide vacuum to the fuel vapor purge system via conduit 150 to assist in purging under various conditions, without being actively controlled. Thus, whereas CPV1 158, CPV2 165, and throttle 114 may be controlled via controller 166, for example, ejector 140 may be neither controlled via controller 166 nor subject to any other active control. In another example, the ejector may be actively controlled with a variable geometry to adjust an amount of vacuum provided by the ejector to the fuel vapor recovery system via conduit 150.

During select engine and/or vehicle operating conditions, such as after an emission control device light-off temperature has been attained (e.g., a threshold temperature reached after warming up from ambient temperature) and with the engine running, the controller 166 may adjust the duty cycle of a canister vent valve solenoid (not shown) and open or maintain open canister vent valve 172. For example, canister vent valve 172 may remain open except during vacuum tests performed on the system (described in further detail below). At the same time, controller 166 may adjust the duty cycle of the CPV1 solenoid (not shown) and open CPV1 158. Pressures within fuel vapor purging system 171 may then draw fresh air through vent line 136, fuel vapor canister 104, and CPV1 158 such that fuel vapors flow into conduit 150.

The operation of ejector 140 within fuel vapor purging system 171 during vacuum conditions will now be described. The vacuum conditions may include intake manifold vacuum conditions. For example, intake manifold vacuum conditions may be present during an engine idle condition, with manifold pressure below atmospheric pressure by a threshold amount. This vacuum in the intake system 23 may draw fuel vapor from the canister through conduits 150 and 151 into intake manifold 116, as represented by dashed arrow(s) 167a, 103a, 103c and 103d. Further, at least a portion of the fuel vapors may flow from conduit 150 into ejector 140 via port 144 via dashed arrow 103e. Upon entering the ejector via port 144, the fuel vapors may flow through nozzle 191 toward port 142. Specifically, the intake manifold vacuum causes the fuel vapors to flow through orifice 192. Because the diameter of the area within the nozzle gradually increases in a direction from port 144 towards port 142, the fuel vapors flowing through the nozzle in this direction diffuse, which raises the pressure of the fuel vapors. After passing through the nozzle, the fuel vapors exit ejector 140 through first port 142 and flow through duct 148 to intake passage 118 and then to intake manifold 116, indicated by dashed arrow 103f.

Next, the operation of ejector 140 within fuel vapor purging system 171 during boost conditions will be described. The boost conditions may include conditions during which the mechanical compressor (e.g. 126) and/or electric booster (e.g. 155) is in operation. For example, the boost conditions may include one or more of a high engine load condition and a super-atmospheric intake condition, with intake manifold pressure greater than atmospheric pressure by a threshold amount.

Fresh air enters intake passage 118 at air filter 174. During boost conditions, compressor 126 and/or electric booster 155 pressurizes the air in intake passage 118, such that intake manifold pressure is positive. Pressure in intake passage 118 upstream of compressor 126 is lower than intake manifold pressure during operation of compressor 126, and this pressure differential induces a flow of fluid from intake conduit 118 through duct 148 and into ejector 140 via ejector inlet 142. This fluid may include a mixture of air and fuel, in some examples. After the fluid flows into the ejector via the port 142, it flows through the converging orifice 192 in nozzle 191 in a direction from port 142 towards outlet 146. Because the diameter of the nozzle gradually decreases in a direction of this flow, a low pressure zone is created in a region of orifice 192 adjacent to suction inlet 144. The pressure in this low pressure zone may be lower than a pressure in duct 150. When present, this pressure differential provides a vacuum to conduit 150 to draw fuel vapor from canister 104, as indicated via dashed arrow(s) 105, 105a, 167a, and 105b. This pressure differential may further induce flow of fuel vapors from the fuel vapor canister, through the CPV1 (where the CPV is commanded open), and into port 144 of ejector 140. Upon entering the ejector, the fuel vapors may be drawn along with the fluid from the intake manifold out of the ejector via outlet port 146 and into intake 118 at a position upstream of compressor 126, as indicated via dashed arrows 105c and 105d. Operation of compressor 126 then draws the fluid and fuel vapors from ejector 140 into intake passage 118 and through the compressor 126. After being compressed by compressor 126, the fluid and fuel vapors flow through charge air cooler 156, for delivery to intake manifold 116 via throttle 114. In examples where the electric booster is active, the fluid may travel through the compressor 126 and the electric booster 155, where electric booster bypass valve 161 may be closed. However, in other examples where the electric booster is not active, the fluid may travel through the compressor 126, to charge air cooler for delivery to intake manifold 116 via an open electric booster bypass valve 161. It may be understood that the above-described operation of ejector 140 during boost conditions relates to an engine-on condition, where the vehicle is in operation and the engine is combusting air and fuel. However, there may be other opportunities for operating the vehicle system under boost conditions, with the engine off. Such examples will be described in detail below.

Vehicle system 100 may further include a control system 160. Control system 160 is shown receiving information from a plurality of sensors 162 (various examples of which are described herein) and sending control signals to a plurality of actuators 164 (various examples of which are described herein). As one example, sensors 162 may include an exhaust gas sensor 125 (located in exhaust manifold 120) and various temperature and/or pressure sensors arranged in intake system 23. For example, a pressure or airflow sensor 115 in intake conduit 118 downstream of throttle 114, a pressure or air flow sensor 117 in intake conduit 118 between compressor 126 and throttle 114, and a pressure or air flow sensor 119 in intake conduit 118 upstream of compressor 126. In some examples, pressure sensor 119 may comprise a dedicated barometric pressure sensor. Other sensors such as additional pressure, temperature, air/fuel ratio, and composition sensors may be coupled to various locations in the vehicle system 100. As another example, actuators 164 may include fuel injectors 132, throttle 114, compressor 126, a fuel pump of pump system 130, etc. The control system 160 may include an electronic controller 166. The controller may receive input data from the various sensors, process the input data, and trigger the actuators in response to the processed input data based on instruction or code programmed therein corresponding to one or more routines.

In some examples, the controller may be placed in a reduced power mode or sleep mode, wherein the controller maintains essential functions only, and operates with lower battery consumption than in a corresponding awake mode. For example, the controller may be placed in a sleep mode following a vehicle-off event in order to perform a diagnostic routine at a duration following the vehicle-off event. The controller may have a wake input that allows the controller to be returned to an awake mode based on an input received from one or more sensors. In some examples, the controller may schedule a wake-up time, which may comprise setting a timer and when the timer elapses, the controller may be woken up from sleep mode.

Diagnostic tests may be periodically performed on the evaporative emissions control system 154 and fuel system 106 in order to indicate the presence or absence of undesired evaporative emissions. In one example, under natural aspiration conditions (e.g. intake manifold vacuum conditions) where the engine 112 is being operated to combust air and fuel, CVV 172 may be commanded closed, and CPV1 158 may be commanded open. Furthermore, second CPV (CPV2) 165 may be commanded closed. By commanding closed CVV 172, CPV2 165, and commanding open CPV1 158 during natural aspiration conditions where the engine is in operation, the evaporative emissions control system 154 and fuel system 106 may be evacuated (as indicated via dashed arrows 103a, 167a, 167g, 167h, 103b, 103c, 103d, 167e, 167f) in order to ascertain the presence or absence of undesired evaporative emissions, by monitoring pressure in the fuel system and evaporative emissions control system. Thus, it may be understood that conduit 163a and conduit 163b may be evacuated, but air may not flow through the CPV2 when it is closed. Pressure in the fuel system and evaporative emissions control system may be monitored, for example, via a pressure sensor 107. In some examples pressure sensor 107 may comprise a fuel tank pressure transducer (FTPT). If a threshold vacuum (e.g. negative pressure threshold with respect to atmospheric pressure) is reached during evacuating the evaporative emissions control system 154 and fuel system 106, an absence of gross undesired evaporative emissions may be indicated. Furthermore, if the threshold vacuum is reached, then it may be indicated that the first check valve (CV1) 153 is not stuck closed or substantially closed, as in a case where CV1 153 is stuck closed, pressure sensor 107 may not indicate pressure changes. However, in a case where CV1 is stuck closed, it may not be possible to indicate whether the threshold vacuum was not reached as a result of the CV1 being stuck closed, or due to gross undesired evaporative emissions in the evaporative emissions control system and/or fuel system.

As will be discussed in further detail below, the inventors herein have developed systems and methods to address these issues. Furthermore, in a case where the threshold vacuum is reached, thus indicative of an absence of gross undesired evaporative emissions and a CV1 functioning as desired, the CPV1 158 may be commanded closed and pressure in the fuel system and evaporative emissions system may be monitored. A pressure rise (e.g. bleed-up) greater than a predetermined pressure rise threshold, or a pressure rise rate (bleed-up rate) rate greater than a predetermined pressure rise rate threshold may indicate the presence of non-gross undesired evaporative emissions.

While the above-described example focuses on natural aspiration conditions where the engine is in operation to combust air and fuel, there may be other (natural aspiration) opportunities to conduct such a diagnostic test for the presence or absence of undesired evaporative emissions in the fuel system and evaporative emissions system, with the engine not combusting air and fuel. For example, as discussed above, the vehicle propulsion system 100 may comprise a HEV or a PHEV. Such hybrid powertrains may have limited engine run-time, as the vehicle may operate solely using power derived from the onboard energy storage device 250 for extended periods. Thus, it may be desirable to conduct the test for undesired evaporative emissions using intake manifold vacuum under conditions where the engine is not combusting air and fuel. Instead, a motor (e.g. 220, see FIG. 2), using power supplied via the energy storage device 250, may be operated to spin the engine unfueled (without combusting air and fuel). By spinning the engine unfueled, a vacuum (e.g. negative pressure with respect to atmospheric pressure) may develop in the intake manifold. However, because the engine is not operating to combust air and fuel, a different strategy may be utilized to conduct the test for the presence of undesired evaporative emissions. More specifically, if the same strategy as depicted above were to be utilized, fuel vapors from the fuel tank 128 may be drawn through the buffer 104a, and through CPV 158 to engine intake. In this scenario, fuel vapors may not be adequately adsorbed by the buffer 104a, and it may be undesirable to route fuel vapors from the fuel tank to engine intake when the engine is not operating to combust air and fuel. In such an example, increased undesired evaporative emissions may result, as fuel vapors may be routed to engine intake and then to engine exhaust, without being combusted.

Thus, to avoid such issues, responsive to intake manifold vacuum greater than a threshold intake manifold vacuum due to spinning the engine unfueled in a forward, or default direction, via a motor (e.g. 220), the CPV1 158 may be commanded closed, and the CPV2 165 may be commanded open. Furthermore, the CVV 172 may be commanded closed. In this way, the fuel system and evaporative emissions system may be evacuated via a path defined by dashed arrows 167a, 167b, 103a, 167c, 167d, 167e, 167f, 103c, 103d, and 165i. Said another way, fuel tank vapors may be drawn from fuel tank 128, through buffer 104a, through non-buffer region 104b, through vent line 136, and through conduits 163b and 163a and 150, before being drawn through the first check valve 153 en route to engine intake. By evacuating the evaporative emissions system and fuel system in such a way, fuel tank vapors may be drawn across the entirety (e.g. the buffer and non-buffer region) of the fuel vapor canister 104, such that the fuel vapors may be adsorbed prior to being routed to engine intake.

Similar to the methodology described above regarding evacuating the fuel system and evaporative emissions system using natural aspiration conditions while the engine is operating to combust air and fuel, the methodology described by spinning the engine unfueled may enable a determination as to whether CV1 is functioning as desired, and whether there is an absence of gross undesired evaporative emissions, for example, based on whether the threshold vacuum is reached in the fuel system and evaporative emissions system. If the threshold vacuum is not reached, it may be that there are gross undesired evaporative emissions, or that the CV1 may be stuck closed. Furthermore, in a case where the threshold vacuum is reached, thus indicative of an absence of gross undesired evaporative emissions and a CV1 functioning as desired, the CPV2 165 may be commanded closed and pressure in the fuel system and evaporative emissions system may be monitored. Pressure bleed-up greater than the predetermined pressure rise threshold, or the pressure bleed-up rate greater than the predetermined pressure rise rate threshold may indicate the presence of non-gross undesired evaporative emissions, as discussed.

Another example describes a diagnostic test for the presence or absence of undesired evaporative emissions stemming from the fuel system and/or evaporative emissions system, under boost conditions (e.g. intake manifold pressure greater than barometric pressure by a predetermined threshold), where the engine is operating to combust air and fuel. In such an example, the CVV 172 may be commanded closed, and the CPV1 158 may be commanded open. Furthermore, the CPV2 165 may be commanded closed. By commanding closed the CVV 172 and CPV2 165, and commanding open the CPV1 158 during boost conditions where the engine is operating to combust air and fuel, the evaporative emissions control system 154 and fuel system 106 may be evacuated (as indicated via dashed arrows 167*a*, 105, 105*a*, 105*b*, 105*c*, 105*d*, 103*e*, 103*f*) in order to ascertain the presence or absence of undesired evaporative emissions. As illustrated, it may be understood that in such an example fuel vapors from the fuel tank may additionally be evacuated (dashed arrow 167*a*). However, because the engine is operating to combust air and fuel, any fuel vapors not adequately adsorbed via the buffer region 104*a* of the canister 104, may be combusted in the engine. In this way, the diagnostic may be conducted without increasing undesired evaporative emissions.

In such an example, during the evacuating the fuel system and evaporative emissions system, as discussed above, pressure in the fuel system and evaporative emissions control system may be monitored via, for example, pressure sensor 107. If the threshold vacuum (e.g. negative pressure threshold with respect to atmospheric pressure) is reached during evacuating the evaporative emissions control system 154 and fuel system 106, an absence of gross undesired evaporative emissions may be indicated. Furthermore, if the threshold vacuum is reached, then it may be indicated that the second check valve (CV2) 170 is not stuck closed or substantially closed, as in a case where CV2 170 is stuck closed, pressure sensor 107 may not indicate pressure changes. However, similar to that described above for the diagnostic test performed on the evaporative emissions control system 154 and fuel system 106 under natural aspiration conditions, a diagnostic test conducted during boost conditions where the threshold vacuum is not reached may not be able to discern whether the inability to achieve the threshold vacuum is the result of a stuck closed CV2, or the presence of gross undesired evaporative emissions. As such, the inventors herein have developed systems and methods to address these issues, which will be discussed in detail below.

While the above-described example focuses on boosted conditions where the engine is operating to combust air and fuel, there may be other opportunities to conduct such a diagnostic test for the presence or absence of undesired evaporative emissions in the fuel system and evaporative emissions system, with the engine not combusting air and fuel. For example, as discussed above, because the vehicle system may comprise a HEV or PHEV where such powertrains may have limited engine run-time, it may be desirable to conduct a test for the presence or absence of undesired evaporative emissions under conditions of positive pressure in the intake manifold, where the engine is not in operation. One such example includes supplying air in the form of positive pressure (with respect to atmospheric pressure) to the intake manifold via operating the electric booster 155 via power supplied from the energy storage device 250. By operating the electric booster 155 while the engine is off, positive pressure in the intake manifold may in turn result in negative pressure (with respect to atmospheric pressure) being communicated to the fuel system and evaporative emissions system via the ejector system 141 as discussed above. However, similar to that discussed above for conducting the test for undesired evaporative emissions by spinning the engine unfueled, if vacuum (negative pressure with respect to atmospheric pressure) were communicated to the fuel system and evaporative emissions system with the CPV1 158 open and the CVV 172 closed, then fuel tank vapors may be drawn from the fuel tank, through buffer 104*a* of canister 104, and to engine intake, without being adequately adsorbed by the canister. As mentioned, such a routine may result in increased undesired evaporative emissions as the fuel vapors may be routed through the engine and to engine exhaust (and to atmosphere) without being combusted by the engine.

Thus, to avoid such issues, responsive to activating the electric booster 155 to induce positive pressure in the intake of engine 112, the CPV1 158 may be commanded closed, the CPV2 165 may be commanded open, and the CVV 172 may be commanded closed. In this way, the fuel system and evaporative emissions system may be evacuated via a path defined by dashed arrows 167*a*, 167*b*, 103*a*, 167*i*, 167*c*, 167*d*, 167*e*, 167*f*, 103*c*, 103*e*, 105*c*, 105*d*, 103*f*) 105, 105*a*, 105*b*, 105*c*, 105*d*, 103*e*, 103*f*). Said another way, fuel tank vapors may be drawn from fuel tank 128, through buffer 104*a*, through non-buffer region 104*b*, through vent line 136, and through conduits 163*b* and 163*a* and 150, before being drawn through the second check valve 170 en route to engine intake.

Similar to the methodology described above regarding evacuating the fuel system and evaporative emissions system under boosted conditions while the engine is operating to combust air and fuel, the methodology described by operating the electric booster while the engine is off (e.g. not combusting air and fuel and not being spun unfueled) may enable a determination as to whether CV2 170 is functioning as desired, and whether there is an absence of gross undesired evaporative emissions, for example if the threshold vacuum is reached. If the threshold vacuum is not reached, it may be that there are gross undesired evaporative emissions, or that the CV2 may be stuck closed. Furthermore, in a case where the threshold vacuum is reached, thus indicative of an absence of gross undesired evaporative emissions and a CV2 functioning as desired, the CPV2 165 may be commanded closed and pressure in the fuel system and evaporative emissions system may be monitored. Pressure bleed-up greater than the predetermine pressure rise threshold, or the pressure bleed-up rate greater than the predetermined pressure rise rate threshold may indicate the presence of non-gross undesired evaporative emissions, as discussed.

As discussed above, in a case where intake manifold vacuum alone is utilized to conduct the test for undesired evaporative emissions, and/or in a case where positive pressure alone in the intake system is utilized to conduct the test for undesired evaporative emissions, it may be challenging to interpret results of the diagnostic when the threshold vacuum is not indicated to be reached in the fuel system and evaporative emissions system. Specifically, as mentioned, it may not be clear whether the CV1 is stuck closed, or whether there is the presence of undesired evaporative emissions in the fuel system and/or evaporative emissions system, under conditions where the threshold vacuum is not reached during evacuating the fuel system and evaporative emissions system via intake manifold vacuum. Similarly, it may not be clear whether the CV2 is stuck closed, or whether there is the presence of undesired evaporative emissions in the fuel system and/or evaporative emissions system, under conditions where the threshold vacuum is not reached during evacuating the fuel system and evaporative emissions system using positive pressure in the intake system.

Thus, in order to conclusively ascertain whether inability to reach predetermined threshold(s) during evacuating the evaporative emissions control system 154 and fuel system 106 (under either positive pressure in the intake system or negative pressure conditions in the intake manifold) is the result of stuck closed CV1 or CV2 valves, or the result of gross undesired evaporative emissions, diagnostic tests under both positive pressure conditions (e.g. boost) and under negative pressure conditions (e.g. natural aspiration) may be utilized. For example, and which will be discussed in greater detail below, a diagnostic test may first be conducted under positive pressure conditions, and subsequently under natural aspiration conditions, or vice versa. By conducting diagnostic tests under both positive intake pressure conditions and under negative intake pressure conditions, functionality of both CV1 153 and CV2 170, along with the presence or absence undesired evaporative emissions may be conclusively indicated. Furthermore, responsive to an indication that either CV1 153 or CV2 170 is stuck closed, purge operations may be updated such that purge operations are only conducted via a flowpath that includes a check valve that is not stuck closed. Such examples will be discussed in detail below with regard to the methods depicted at FIGS. 3-7 and FIG. 9.

Figure 2:
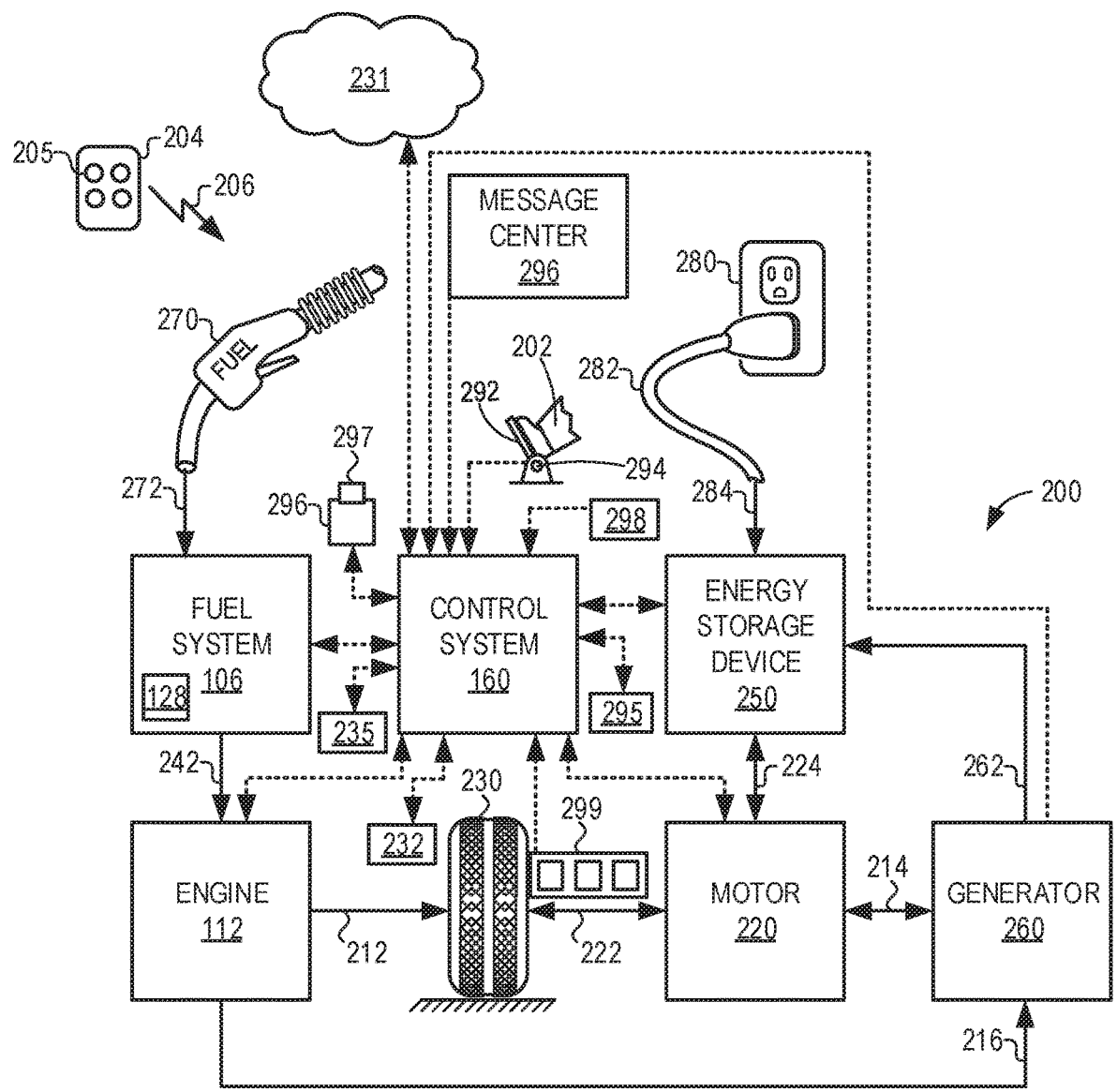
FIG. 2 shows a high-level block diagram illustrating an example vehicle system.

FIG. 2 illustrates an example vehicle propulsion system 200. It may be understood that vehicle propulsion system 200 may comprise the same vehicle propulsion system as vehicle propulsion system 100 depicted at FIG. 1. Vehicle propulsion system 200 includes a fuel burning engine 112 and a motor 220. As a non-limiting example, engine 112 comprises an internal combustion engine and motor 220 comprises an electric motor. Motor 220 may be configured to utilize or consume a different energy source than engine 112. For example, engine 112 may consume a liquid fuel (e.g., gasoline) to produce an engine output while motor 220 may consume electrical energy to produce a motor output. As such, a vehicle with propulsion system 200 may be referred to as a hybrid electric vehicle (HEV).

Vehicle propulsion system 200 may utilize a variety of different operational modes depending on operating conditions encountered by the vehicle propulsion system. Some of these modes may enable engine 112 to be maintained in an off state (i.e., set to a deactivated state) where combustion of fuel at the engine is discontinued. For example, under select operating conditions, motor 220 may propel the vehicle via drive wheel 230 as indicated by arrow 222 while engine 112 is deactivated.

During other operating conditions, engine 112 may be set to a deactivated state (as described above) while motor 220 may be operated to charge energy storage device 250. For example, motor 220 may receive wheel torque from drive wheel 230 as indicated by arrow 222 where the motor may convert the kinetic energy of the vehicle to electrical energy for storage at energy storage device 250 as indicated by arrow 224. This operation may be referred to as regenerative braking of the vehicle. Thus, motor 220 can provide a generator function in some examples. However, in other examples, generator 260 may instead receive wheel torque from drive wheel 230, where the generator may convert the kinetic energy of the vehicle to electrical energy for storage at energy storage device 250 as indicated by arrow 262.

During still other operating conditions, engine 112 may be operated by combusting fuel received from fuel system 106 as indicated by arrow 242. For example, engine 112 may be operated to propel the vehicle via drive wheel 230 as indicated by arrow 212 while motor 220 is deactivated. During other operating conditions, both engine 112 and motor 220 may each be operated to propel the vehicle via drive wheel 230 as indicated by arrows 212 and 222, respectively. A configuration where both the engine and the motor may selectively propel the vehicle may be referred to as a parallel type vehicle propulsion system. Note that in some examples, motor 220 may propel the vehicle via a first set of drive wheels and engine 112 may propel the vehicle via a second set of drive wheels.

In other examples, vehicle propulsion system 200 may be configured as a series type vehicle propulsion system, whereby the engine does not directly propel the drive wheels. Rather, engine 112 may be operated to power motor 220, which may in turn propel the vehicle via drive wheel 230 as indicated by arrow 222. For example, during select operating conditions, engine 112 may drive generator 260 as indicated by arrow 216, which may in turn supply electrical energy to one or more of motor 220 as indicated by arrow 214 or energy storage device 250 as indicated by arrow 262. As another example, engine 112 may be operated to drive motor 220 which may in turn provide a generator function to convert the engine output to electrical energy, where the electrical energy may be stored at energy storage device 250 for later use by the motor.

Fuel system 106 may include one or more fuel storage tanks 128 for storing fuel on-board the vehicle. For example, fuel tank 128 may store one or more liquid fuels, including but not limited to: gasoline, diesel, and alcohol fuels. In some examples, the fuel may be stored on-board the vehicle as a blend of two or more different fuels. For example, fuel tank 128 may be configured to store a blend of gasoline and ethanol (e.g., E10, E85, etc.) or a blend of gasoline and methanol (e.g., M10, M85, etc.), whereby these fuels or fuel blends may be delivered to engine 112 as indicated by arrow 242. Still other suitable fuels or fuel blends may be supplied to engine 112, where they may be combusted at the engine to produce an engine output. The engine output may be utilized to propel the vehicle as indicated by arrow 212 or to recharge energy storage device 250 via motor 220 or generator 260.

In some examples, energy storage device 250 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 250 may include one or more batteries and/or capacitors.

Control system 160 may communicate with one or more of engine 112, motor 220, fuel system 106, energy storage device 250, and generator 260. Control system 160 may receive sensory feedback information from one or more of engine 112, motor 220, fuel system 106, energy storage device 250, and generator 260. Further, control system 160 may send control signals to one or more of engine 112, motor 220, fuel system 106, energy storage device 250, and generator 260 responsive to this sensory feedback. Control system 160 may receive an indication of an operator requested output of the vehicle propulsion system from a vehicle operator 202. For example, control system 160 may receive sensory feedback from pedal position sensor 294 which communicates with pedal 292. Pedal 292 may refer schematically to a brake pedal and/or an accelerator pedal. Furthermore, in some examples control system 160 may be in communication with a remote engine start receiver 295 (or transceiver) that receives wireless signals 206 from a key fob 204 having a remote start button 205. In other examples (not shown), a remote engine start may be initiated via a cellular telephone, or smartphone based system where a user's cellular telephone sends data to a server and the server communicates with the vehicle to start the engine.

Energy storage device 250 may periodically receive electrical energy from a power source 280 residing external to the vehicle (e.g., not part of the vehicle) as indicated by arrow 284. As a non-limiting example, vehicle propulsion system 200 may be configured as a plug-in hybrid electric vehicle (PHEV), whereby electrical energy may be supplied to energy storage device 250 from power source 280 via an electrical energy transmission cable 282. During a recharging operation of energy storage device 250 from power source 280, electrical transmission cable 282 may electrically couple energy storage device 250 and power source 280. While the vehicle propulsion system is operated to propel the vehicle, electrical transmission cable 282 may disconnected between power source 280 and energy storage device 250. Control system 160 may identify and/or control the amount of electrical energy stored at the energy storage device, which may be referred to as the state of charge (SOC).

In other examples, electrical transmission cable 282 may be omitted, where electrical energy may be received wirelessly at energy storage device 250 from power source 280. For example, energy storage device 250 may receive electrical energy from power source 280 via one or more of electromagnetic induction, radio waves, and electromagnetic resonance. As such, it may be appreciated that any suitable approach may be used for recharging energy storage device 250 from a power source that does not comprise part of the vehicle. In this way, motor 220 may propel the vehicle by utilizing an energy source other than the fuel utilized by engine 112.

Fuel system 106 may periodically receive fuel from a fuel source residing external to the vehicle. As a non-limiting example, vehicle propulsion system 200 may be refueled by receiving fuel via a fuel dispensing device 270 as indicated by arrow 272. In some examples, fuel tank 128 may be configured to store the fuel received from fuel dispensing device 270 until it is supplied to engine 112 for combustion. In some examples, control system 160 may receive an indication of the level of fuel stored at fuel tank 128 via a fuel level sensor. The level of fuel stored at fuel tank 128 (e.g., as identified by the fuel level sensor) may be communicated to the vehicle operator, for example, via a fuel gauge or indication in a vehicle instrument panel 296.

The vehicle propulsion system 200 may also include an ambient temperature/humidity sensor 298, and a roll stability control sensor, such as a lateral and/or longitudinal and/or yaw rate sensor(s) 299. The vehicle instrument panel 296 may include indicator light(s) and/or a text-based display in which messages are displayed to an operator. The vehicle instrument panel 296 may also include various input portions for receiving an operator input, such as buttons, touch screens, voice input/recognition, etc. For example, the vehicle instrument panel 296 may include a refueling button 297 which may be manually actuated or pressed by a vehicle operator to initiate refueling. For example, in response to the vehicle operator actuating refueling button 297, a fuel tank in the vehicle may be depressurized so that refueling may be performed.

In some examples, vehicle propulsion system 200 may include one or more onboard cameras 235. Onboard cameras 235 may communicate photos and/or video images to control system 160, for example. Onboard cameras may in some examples be utilized to record images within a predetermined radius of the vehicle, for example.

Control system 160 may be communicatively coupled to other vehicles or infrastructures using appropriate communications technology, as is known in the art. For example, control system 160 may be coupled to other vehicles or infrastructures via a wireless network 231, which may comprise Wi-Fi, Bluetooth, a type of cellular service, a wireless data transfer protocol, and so on. Control system 160 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 160 may be communicatively coupled to other vehicles or infrastructures via a wireless network 231 and the internet (e.g. cloud), as is commonly known in the art.

Vehicle system 200 may also include an on-board navigation system 232 (for example, a Global Positioning System) that an operator of the vehicle may interact with. The navigation system 232 may include one or more location sensors for assisting in estimating vehicle speed, vehicle altitude, vehicle position/location, etc. This information may be used to infer engine operating parameters, such as local barometric pressure. As discussed above, control system 160 may further be configured to receive information via the internet or other communication networks. Information received from the GPS may be cross-referenced to information available via the internet to determine local weather conditions, local vehicle regulations, etc.

Thus, as discussed herein, a system for a vehicle may comprise an engine including an intake, a motor configured to spin the engine unfueled, a fuel system including a fuel tank, the fuel tank fluidically coupled to an evaporative emissions system comprising a fuel vapor canister, a canister vent valve, positioned in a vent line that couples the fuel vapor canister to atmosphere, a first canister purge valve positioned in a purge line stemming from the fuel vapor canister, a second canister purge valve selectively fluidically coupled to the purge line via a first conduit and selectively fluidically coupled to the vent line via a second conduit, a first check valve positioned in a conduit upstream of an intake of the engine and downstream of the first canister purge valve and the second canister purge valve, a second check valve positioned in the purge line downstream of the first canister purge valve and the second canister purge valve and downstream of the conduit upstream of the intake of the engine, an ejector system positioned downstream of the second check valve, an electric compressor, positioned in the intake upstream of the air intake throttle and configured to supply air to the engine, and a fuel tank pressure transducer positioned between the fuel tank and the fuel vapor canister. Such a system may include a controller storing instructions in non-transitory memory. When executed, the instructions may, in a first condition, evacuate the fuel system and evaporative emissions system by commanding closed the canister vent valve, commanding closed the first canister purge valve, commanding open the second canister purge valve, and evacuating the fuel system and evaporative emissions system through the first check valve by spinning the engine unfueled via the motor to generate a vacuum in the intake of the engine that serves to evacuate the fuel system and evaporative emissions system. In a second condition, the controller may evacuate the fuel system and evaporative emissions system by commanding closed the canister vent valve, commanding closed the first canister purge valve, commanding open the second canister purge valve and evacuating the fuel system and evaporative emissions system through the second check valve via the ejector system with the electric compressor activated. The controller may further indicate a presence or an absence of gross undesired evaporative emissions and indicate whether the first check valve and the second check valve are functioning as desired, as a function of whether a threshold vacuum is reached during evacuating the fuel system and the evaporative emissions system in both the first and second conditions, where the threshold vacuum is indicated via the fuel tank pressure transducer. The controller may further indicate a presence or an absence of non-gross undesired evaporative emissions in the fuel system and the evaporative emissions system based on a pressure rise in the fuel system and the evaporative emissions system as indicated via the fuel tank pressure transducer, in either or both of the first condition and/or the second condition subsequent to the threshold vacuum being reached and subsequent to sealing the fuel system and evaporative emissions system from the intake of the engine and from atmosphere after the threshold vacuum is reached.

In one example of such a system, the controller may store additional instructions to indicate both the first check valve and the second check valve are functioning as desired and the absence of gross-undesired evaporative emissions in response to the threshold vacuum being reached in both the first condition and the second condition. The controller may store additional instructions to indicate the first check valve is stuck closed but that the second check valve is functioning as desired and the absence of gross undesired evaporative emissions in response to the threshold vacuum being reached in the second condition but not the first condition. The controller may store additional instructions to indicate the second check valve is stuck closed but that the first check valve is functioning as desired and the absence of gross undesired evaporative emissions in response to the threshold vacuum being reached in the first condition but not the second condition. Further, the controller may store additional instructions to indicate the presence of gross undesired evaporative emissions responsive to the threshold vacuum not being reached during either the first condition or the second condition.

In some examples of such a system, the controller may store additional instructions to, in either or both of the first condition and/or the second condition, in response to the threshold vacuum being reached, seal the fuel system and the evaporative emissions system by commanding closed the second canister purge valve and commanding or maintaining closed the canister vent valve and the first canister purge valve. The controller may store additional instructions to monitor pressure in the fuel system and evaporative emissions system via the fuel tank pressure transducer; and indicate the presence of non-gross undesired evaporative emissions responsive to pressure in the fuel system and the evaporative emissions system remaining below a pressure rise threshold, or responsive to a rate of pressure rise in the fuel system and the evaporative emissions system remaining below a pressure rise rate threshold, for a predetermined duration of time.

Figure 3:
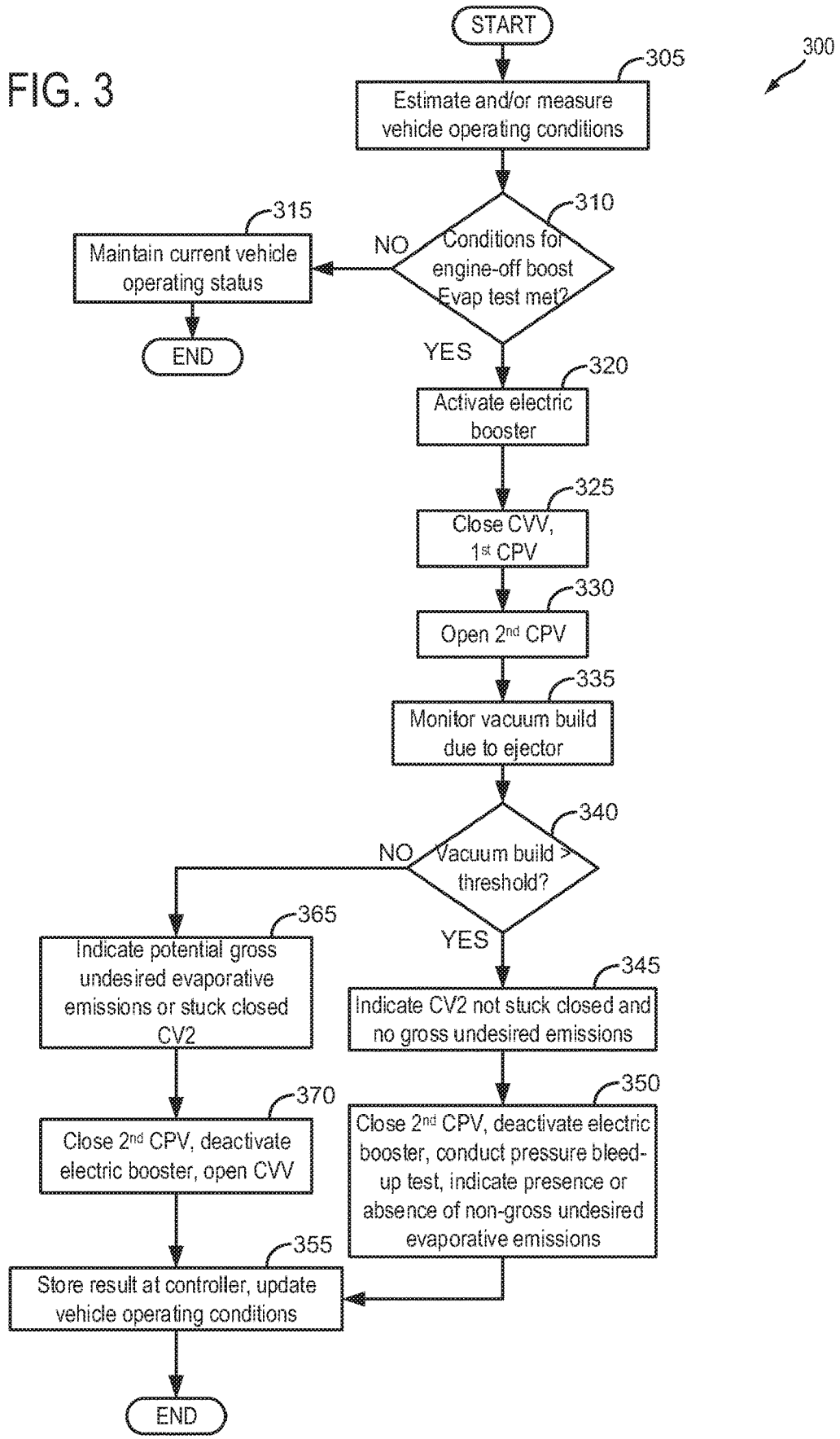
FIG. 3 shows a high-level flow chart for an example method for conducting a test for undesired evaporative emissions on a fuel system and evaporative emissions system via an electric booster during engine-off conditions.

Turning to FIG. 3, a flow chart for a high level example method 300 for performing an evaporative emissions test diagnostic procedure on an evaporative emissions control system (e.g. 154) and fuel system (e.g. 106), is shown. More specifically, method 300 may be used to conduct an evaporative emissions test diagnostic procedure by operating or activating (e.g. turning on) an electric booster (e.g. 155) while an engine of the vehicle is not in operation. By activating the electric booster, pressure in an intake of the engine may become positive with respect to atmospheric pressure, which may result in a negative pressure with respect to atmospheric pressure being communicated to a fuel system and evaporative emissions system, the result of positive pressure in the intake being routed through an ejector system (e.g. 141), which may reduce pressure in the fuel system and evaporative emissions system via a venturing effect. In this way, the evaporative emissions test procedure may be conducted under conditions where the engine is off, which may be desirable in the case of a HEV or PHEV, where such vehicles may have limited engine run time.

It may be understood that in some examples, the evaporative emissions test procedure may be conducted using the electric booster if the vehicle is not in operation, or may be conducted if the vehicle is in operation, but where the engine is off (e.g. solely electric operation of the vehicle). By conducting the evaporative emissions test via activating the electric booster, an absence of gross undesired evaporative emissions and an indication that a second check valve (CV2) (e.g. 170) is not stuck closed may be conclusively indicated responsive to a threshold vacuum being reached during conducting the evaporative emissions test diagnostic. Responsive to the threshold being reached, the fuel system and evaporative emissions system may be sealed, and pressure bleed-up may be monitored in order to indicate a presence or absence of non-gross undesired evaporative emissions. Furthermore, responsive to an indication that the threshold vacuum is not reached during conducting the evaporative emissions test diagnostic, it may be indicated that either gross undesired emissions are present, or that CV2 is stuck closed. Whether the threshold vacuum is indicated to be reached or not, the results of the evaporative emissions test diagnostic procedure may be stored at the controller, as discussed in further detail below.

Method 300 will be described with reference to the systems described herein and shown in FIGS. 1-2, though it should be understood that similar methods may be applied to other systems without departing from the scope of this disclosure. Method 300 may be carried out by a controller, such as controller 166 in FIG. 1, and may be stored at the controller as executable instructions in non-transitory memory. Instructions for carrying out method 300 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, such as first canister purge valve (CPV1) (e.g. 158), second canister purge valve (CPV2) (e.g. 165) (canister vent valve (CVV) (e.g. 172), electric booster (e.g. 155), etc., according to the method below.

Method 300 begins at 305 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Continuing at 310, method 300 may include indicating whether conditions for an engine-off boost evaporative emissions test are met. Conditions being met at 310 may include a threshold duration of time passing since a prior engine-off boost evaporative emissions test, or other evaporative emissions test on the fuel system and/or evaporative emissions system where positive pressure in the engine intake is utilized to conduct the test. In another example, conditions being met may include a threshold state of charge (SOC) of the onboard energy storage device (e.g. battery, capacitor, supercapacitor, etc.). The threshold SOC may comprise a threshold SOC to enable use of the electric booster (e.g. 155) to evacuate the fuel system and evaporative emissions system, without adversely affecting other vehicle operating parameters that may utilize energy provided via the onboard energy storage device. Conditions being met at 310 may additionally or alternatively include an indication of a threshold amount of time since the engine was last in operation. The threshold amount of time may in some examples comprise an amount of time where any heat rejection from the engine to the fuel system and/or evaporative emissions system may not adversely impact the engine-off boost evaporative emissions test. As discussed above, an engine-off boost evaporative emissions test may be conducted in some examples while the vehicle is in operation, but with the engine off (e.g. electric-only mode of operation), or may be conducted with the engine off, and under conditions where the vehicle is not in operation (e.g. key-off). In examples where the engine-off boost evaporative emissions test is conducted under conditions where the vehicle is not in operation, the method may include waking the controller at a predetermined time after a key-off event, in order to conduct the test. In one example, the predetermined time may be a function of a last engine-on event, duration of a last engine on event, ambient conditions such as temperature and/or humidity, etc. Conditions being met at 310 may additionally or alternatively include an indication that a purge event is not in progress. Still further, conditions being met at 310 may in some examples include no prior indication of undesired evaporative emissions in the fuel system and/or evaporative emissions system, an no prior indication of CV2 (e.g. 170) being stuck closed.

If, at 310, conditions are not indicated to be met for conducting the test, method 300 may proceed to 315. At 315, method 300 may include maintaining current vehicle operating status. For example, at 315, method 300 may include maintaining the CPV1 in its current configuration, maintaining the CPV2 in its current configuration, and maintaining the CVV in its current configuration. Furthermore, other engine system actuators such as throttle, fuel injectors, etc., may be maintained in their current status. Method 300 may then end.

Returning to 310, responsive to conditions being indicated to be met for conducting the engine-off boost evaporative emissions test, method 300 may proceed to 320. At 320, method 300 may include activating, or actuating on the electric booster (e.g. 155). More specifically, as discussed above, the controller may signal to the electric booster actuator 155*b*, actuating on the electric booster. By actuating on the electric booster, a positive pressure with respect to atmosphere may develop in the engine intake (e.g. 23). In one example, the electric booster may be actuated on at its full capacity, to rapidly increase pressure in the engine intake. However, in other examples, the electric booster may be actuated on at any capacity which is predetermined to provide enough positive pressure in the engine intake to evacuate the fuel system and evaporative emissions system within a predetermined amount of time. In some examples, actuation of the electric booster may be a function of SOC of the onboard energy storage device.

With the electric booster activated at 320, method 300 may proceed to 325. At 325, method 300 may include commanding closed (actuating closed) the CVV, and commanding closed (actuating closed) CPV1. Proceeding to 330, method 300 may include commanding open (actuating open) CPV2. By commanding closed the CVV and CPV1, while commanding open the CPV2, vacuum derived from the ejector system (e.g. 140) under boost conditions may be applied to the evaporative emissions system (e.g. 154) and fuel system (e.g. 106). More specifically, by commanding closed the CVV at step 325, the evaporative emissions system and fuel system may be sealed from atmosphere. By commanding open the CPV2 at 330, vacuum derived from the ejector may be applied to the sealed evaporative emissions system and fuel system. It may be understood that if the CPV1 were commanded open, instead of the CPV2, then vacuum from the ejector system may draw fuel vapors from the fuel tank, through the buffer (e.g. 104*a*) of the canister (e.g. 104), without the fuel vapors being routed through the non-buffer region (e.g. 104*b*), which may lead to an increase in undesired emissions as the fuel vapors may not be combusted in the engine as the engine is off. Instead, by commanding open the CPV2 while the CPV1 is closed, vacuum from the ejector system may draw fuel tank vapors through an entirety of the canister, en route to engine intake. In this way fuel vapors may be effectively adsorbed by the canister, which may prevent or reduce release of undesired emission to atmosphere.

Proceeding to 335, method 300 may include monitoring vacuum build in the evaporative emissions system and fuel system. For example, monitoring vacuum build (e.g. negative pressure with respect to atmospheric pressure) may include monitoring pressure via a pressure sensor (e.g. 107), positioned in the fuel system and/or evaporative emissions system. Monitoring vacuum build at 335 may be conducted for a predetermined time duration, in some examples.

Continuing at 340, method 300 may include indicating whether vacuum build as monitored by the pressure sensor during evacuating the evaporative emissions system and fuel system is greater (e.g. more negative) than a predetermined threshold vacuum. The predetermined threshold vacuum may be in some examples be a function of atmospheric pressure. For example, the predetermined threshold vacuum may comprise a decreased vacuum level responsive to decreasing barometric pressure, and increased vacuum level responsive to increasing barometric pressure. The predetermined threshold vacuum may be further based on a predetermined diameter, or area, of an orifice whereby undesired evaporative emissions may be escaping from in the fuel system and/or evaporative emissions system.

At 340, if it is indicated that vacuum build in the fuel system and evaporative emissions system has reached the predetermined threshold vacuum, method 300 may proceed to 345. At 345, method 300 may further include indicating that CV2 (e.g. 170) is not stuck closed. If CV2 were stuck closed, then the pressure sensor (e.g. 107) would not have registered a change in pressure during evacuating the fuel system and evaporative emissions system. In other words, the CV2 must be functioning as desired responsive to the predetermined threshold vacuum being reached. Furthermore, at 345, it may be indicated that there are no gross undesired evaporative emissions stemming from the fuel system and/or evaporative emissions system. For example, method 300 may include indicating an absence of gross undesired evaporative emissions stemming from an orifice the size of the predetermined diameter, or area, discussed above at 340, where the predetermined diameter, or area, corresponds to gross undesired evaporative emissions. In some examples, gross undesired evaporative emissions may include an orifice diameter corresponding to 0.04" or greater.

Continuing at 350, method 300 may include closing the CPV2 to isolate the fuel system and evaporative emissions system from atmosphere and from engine intake, and monitoring a pressure bleed-up in the fuel system and evaporative emissions system. Furthermore, at 350, method 300 may include actuating off (deactivating) the electric booster. With the fuel system and evaporative emissions system isolated from atmosphere and engine intake, pressure in the fuel system and evaporative emissions system may be monitored by a pressure sensor (e.g. 107). Pressure may be monitored for a predetermined duration, in some examples. If pressure in the fuel system and evaporative emissions system reaches the predetermined pressure rise threshold, or if a rate of pressure bleed-up exceeds a predetermined pressure rise rate threshold, then non-gross undesired evaporative emissions may be indicated. However, if, during the predetermined duration, pressure does not reach the predetermined pressure rise threshold, or if the rate of pressure bleed-up does not exceed the predetermined pressure rise rate threshold, then it may be indicated that non-gross undesired evaporative emissions are not present. While step 345 includes indicating an absence of gross undesired evaporative emissions, it may be understood that at step 350, indicating the presence or absence of non-gross undesired evaporative emissions comprises undesired evaporative emissions stemming from a smaller orifice size (non-gross undesired evaporative emissions) than that corresponding to gross undesired evaporative emissions. For example, at 350, non-gross undesired evaporative emissions may be indicated corresponding to an orifice size smaller than an orifice size corresponding to gross undesired evaporative emissions. As such, step 350 comprises testing for presence or absence of non-gross undesired evaporative emissions by comparing a pressure change in the fuel system or evaporative emission system to a reference pressure change after evacuating the fuel system and evaporative emissions system.

Proceeding to step 355, method 300 may include storing the results of the evaporative emissions test diagnostic procedure at the controller. As will be discussed in further detail below, the results of the evaporative emissions test diagnostic procedure conducted according to method 300 may in some examples be utilized in conjunction with results of an evaporative emissions test diagnostic procedure conducted under conditions of negative pressure in the intake of the engine (see FIGS. 5-7), in order to conclusively determine the presence or absence of undesired evaporative emissions, and functionality of both CV2 (e.g. 170) and a first check valve (CV1) (e.g. 153).

At 355, method 300 may include updating vehicle operating parameters, responsive to the results of the evaporative emissions test diagnostic. For example, responsive to an indication of an absence of gross undesired evaporative emissions, but further responsive to an indication of a presence of non-gross undesired evaporative emissions, updating vehicle operating conditions may include adjusting an evaporative emissions test schedule, and may further include illuminating a malfunction indicator light (MIL) on the vehicle dash, alerting the vehicle operator that is advisable to service the vehicle.

In some examples, updating vehicle operating conditions responsive to the absence of gross undesired evaporative emissions, and further responsive to an indication of the presence of non-gross undesired evaporative emissions, the evaporative emissions system may be configured with the CVV closed, the CPV1 closed, and the CPV2 open. With the evaporative emissions system configured as such, fuel tank vapors may travel from the fuel tank, through an entirety of the fuel vapor canister (e.g. both the buffer and non-buffer regions), en route to engine intake. In such an example, the vehicle system may be further configured to operate in an electric mode of operation wherever possible, for subsequent times when the vehicle is in operation. In this way, fuel tank vapors may be routed through the entirety of the canister, and may then be routed to engine intake. However, with the engine off, any fuel tank vapors not adsorbed by the canister may be adsorbed via an AIS HC trap (e.g. 169) positioned in the intake of the engine. In this way, undesired evaporative emissions may be reduced, even under conditions where a presence of non-gross undesired evaporative emissions are indicated. More specifically, if there is a small (e.g. non-gross) source of undesired evaporative emissions, by routing fuel tank vapors through the entirety of the fuel vapor canister, en route to engine intake via the open CPV2 (and closed CVV), it may be more likely that the vapors may travel to engine intake as discussed, rather than being released to atmosphere, due to less resistance to flow en route to engine intake than through the small source.

Further, at 355, responsive to an indication of an absence of gross undesired evaporative emissions, and further responsive to an indication of the absence of non-gross undesired evaporative emissions, method 300 may include maintaining closed the CPV1, maintaining closed the CPV2, and commanding open the CVV. By maintaining closed the CPV1 and CPV2, the fuel system and evaporative emissions system may be sealed from engine intake (and from the ejector). Furthermore, by commanding open the CVV, fuel vapors generated in the fuel tank (for example running loss fuel vapors, refueling vapors, or vapors resulting from diurnal temperature fluctuations) may be routed to the fuel vapor canister (e.g. 104) for storage, prior to exiting to atmosphere. Method 300 may then end.

Returning to 340, if it is indicated that vacuum build in the fuel system and evaporative emissions system did not reach the predetermined threshold vacuum, method 300 may proceed to 365. At 365, method 300 may include indicating that either CV2 is stuck closed, or that gross undesired evaporative emissions are present in the fuel system and evaporative emissions system. In other words, the vacuum build may have been prevented from reaching the predetermined vacuum threshold due to the CV2 being stuck closed, or due to gross undesired evaporative emissions. Accordingly, a conclusive determination as to the source of the inability to reach the predetermined threshold vacuum may not be indicated at 365. Instead, method 300 may proceed to 370. At 370, method 300 may include commanding closed (actuating closed) the CPV2, and may include deactivating the electric booster. Proceeding to 355, method 200 may include storing the results of the evaporative emissions test diagnostic at the controller, and may further include updating vehicle operating conditions. Updating vehicle operating conditions at 355 may include scheduling a test for undesired evaporative emissions under conditions of negative pressure with respect to atmospheric pressure in the intake of the engine, in order to determine whether the CV2 is stuck closed, or whether gross undesired evaporative emissions are present, as will be discussed in detail below with regard to FIGS. 5-8. Method 300 may then end.

While FIG. 3 depicts an example where an electric booster is utilized to conduct the test for undesired evaporative emissions, in other examples such a test may be conducted while the engine is in operation to combust air and fuel. Such an example will be discussed below with regard to FIG. 4.

Figure 4:
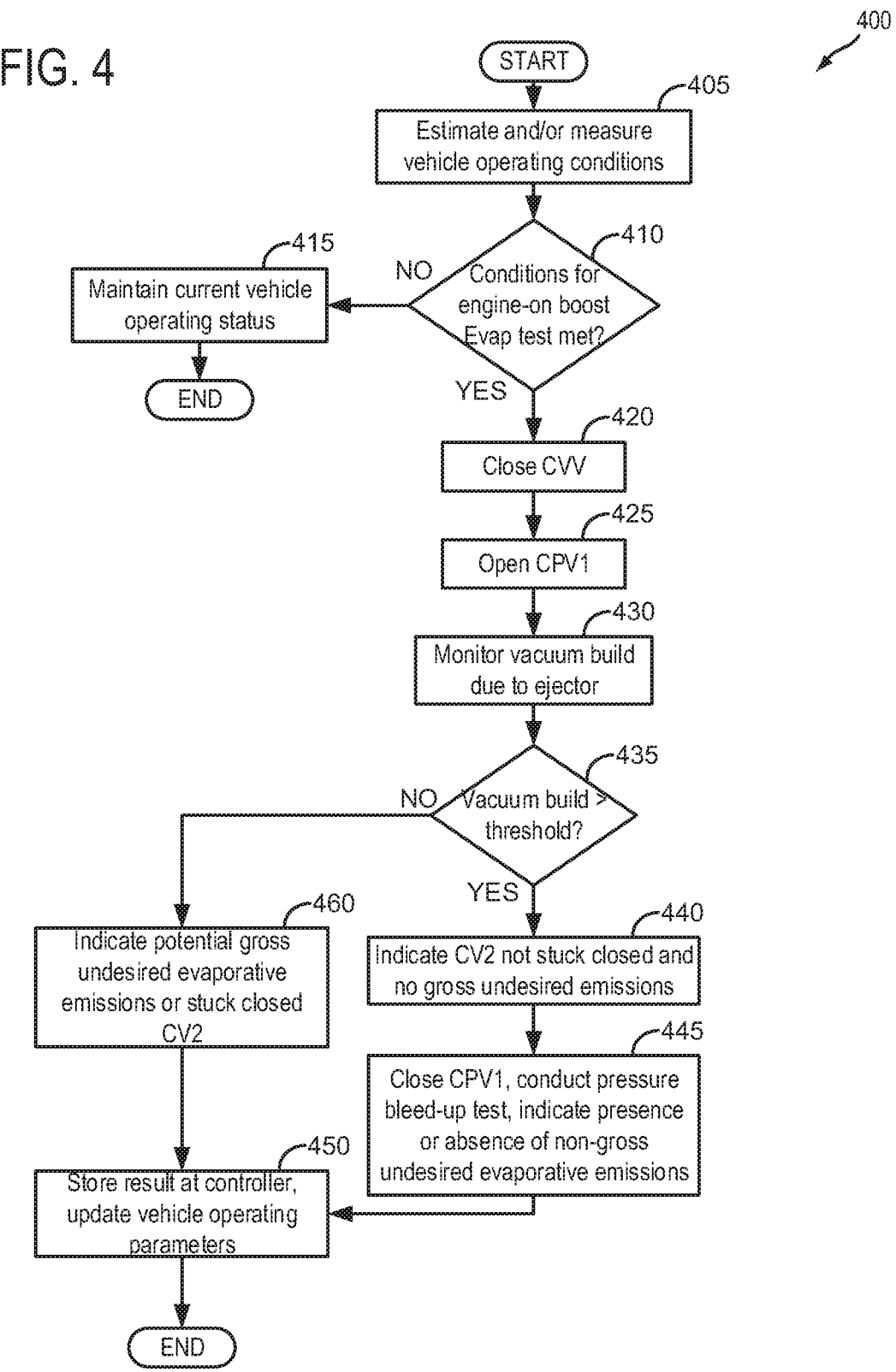
FIG. 4 shows a high-level flow chart for an example method for conducting a test for undesired evaporative emissions on a fuel system and evaporative emissions system under boosted engine operation, where the engine is operating to combust air and fuel.

Turning to FIG. 4, another flow chart for a high level example method 400 for performing an evaporative emissions test diagnostic procedure on an evaporative emissions control system (e.g. 154) and fuel system (e.g. 106), is shown. More specifically, method 400 may be used to conduct an evaporative emissions test diagnostic procedure responsive to an indication that conditions are met for an evaporative emissions test under boost conditions, where boost conditions include an engine-on condition (as opposed to FIG. 3 where the engine is not in operation). It may be understood that the engine-one condition includes a condition where the engine is operating to combust air and fuel. Conducting such an evaporative emissions test diagnostic procedure may include the fuel system and evaporative emission system being coupled to a compressor inlet through an orifice having an inlet pressure reduced by a venturing effect, thus enabling evacuation of the fuel system and evaporative emissions system under boost conditions. In this way, by conducting the evaporative emissions test under boost conditions, an absence of undesired evaporative emissions and an indication that a second check valve (CV2) (e.g. 170) is not stuck closed may be conclusively indicated responsive to the threshold vacuum being reached during conducting the evaporative emissions test diagnostic. Furthermore, responsive to an indication that the threshold vacuum is not reached during conducting the evaporative emissions test diagnostic, it may be indicated that either gross undesired emissions are present, or that CV2 is stuck closed. Whether the threshold vacuum is indicated to be reached or not, the results of the evaporative emissions test diagnostic procedure may be stored at the controller, as discussed in further detail below.

Method 400 will be described with reference to the systems described herein and shown in FIGS. 1-2, though it should be understood that similar methods may be applied to other systems without departing from the scope of this disclosure. Method 400 may be carried out by a controller, such as controller 166 in FIG. 1, and may be stored at the controller as executable instructions in non-transitory memory. Instructions for carrying out method 400 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, such as first canister purge valve (CPV1) (e.g. 158), second canister purge valve (CPV2) (e.g. 165), canister vent valve (CVV) (e.g. 172), etc., according to the method below.

It may be understood that method 400 is substantially similar to method 300 depicted at FIG. 3, except that method 400 is conducted via boost provided via engine operation (and in some examples supplemented with electric boost). However, to ensure clarity, the entirety of method 400 will be described below.

Method 400 begins at 405 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Continuing at 410, method 400 may include indicating whether conditions for an evaporative emissions test under boost with the engine in operation, are met. For example, conditions for an evaporative emissions test under boost being met may include an indication of manifold air pressure (MAP) greater than barometric pressure (BP) by a predetermined threshold amount while the engine is operating. In some examples, conditions being met at 410 may include MAP greater than BP by a predetermined threshold for a predetermined time duration. Conditions being met at 410 may in some examples further include an indication that an evaporative emissions test diagnostic on the evaporative emissions control system and fuel system under boost conditions has not already been conducted during the current drive cycle. In some examples, conditions being met at 410 may further include an indication that an evaporative emissions test diagnostic under boost has not been conducted within a predetermined duration of time. For example, consider a situation where an engine-off boost evaporative emissions test was conducted just prior to the vehicle being activated (turned on) with engine operation. In such an example, it may not be desirable to conduct an engine-on boost evaporative emissions test, as it is unlikely that the status of the fuel system and evaporative emissions system has changed since the prior test. Thus, in some examples, the predetermined duration of time in which an engine-on boost evaporative emissions test may not be conducted responsive to a recent engine-off boost evaporative emissions test may comprise 5 hours, 4 hours, 3 hours, 2 hours, 1 hour, less than 1 hour, etc. Conditions being met at 410 may in some examples further include an indication that a purge event is not in progress. Still further, conditions being met at 410 may in some examples include no prior indication of undesired evaporative emissions in the fuel system and/or evaporative emissions system, and no prior indication of CV2 (e.g. 170) being stuck closed.

If, at 410, conditions for the evaporative emissions test diagnostic procedure under boost with the engine in operation are not indicated to be met, method 400 may proceed to 415. At 415, method 400 may include maintaining current vehicle operating status. For example, at 415, method 400 may include maintaining the CPV1 and CPV2 in their current configurations, and may further include maintaining the CVV in its current configuration. Furthermore, other engine system actuators such as throttle, fuel injectors, etc., may be maintained in their current status. Method 400 may then end.

Returning to 410, if it is indicated that conditions for the evaporative emissions test diagnostic procedure under boost with the engine in operation are met, method 400 may proceed to 420. At 420, method 400 may include commanding closed (actuating closed) the CVV. Proceeding to 425, method 400 may include commanding open (actuating open) the CPV1. While not explicitly illustrated, it may be understood that at step 425, method 400 may further include commanding or maintaining closed the CPV2. By commanding closed the CVV and commanding open the CPV1 (with the CPV2 closed), vacuum derived from the ejector (e.g. 140) under boost conditions may be applied to the evaporative emissions system (e.g. 154) and fuel system (e.g. 106). More specifically, by commanding closed the CVV at step 420, the evaporative emissions system and fuel system may be sealed from atmosphere. By commanding open the CPV1 at 425, vacuum derived from the ejector may be applied to the sealed evaporative emissions system and fuel system. While opening in the CPV1 to draw vacuum on the fuel system and evaporative emissions system may route fuel tank vapors through the buffer (e.g. 104a) without traveling through the entirety of the fuel vapor canister, such action may be tolerable due to the engine being in operation. Thus, and fuel vapors routed to engine intake may be combusted in the engine.

Proceeding to 430, method 400 may include monitoring vacuum build in the evaporative emissions system and fuel system. For example, monitoring vacuum build (e.g. negative pressure with respect to atmospheric pressure) may include monitoring pressure via a pressure sensor (e.g. 107), positioned in the fuel system and/or evaporative emissions system. Monitoring vacuum build at 430 may be conducted for a predetermined time duration, in some examples.

Accordingly, proceeding to 435, method 400 may include indicating whether vacuum build as monitored by the pressure sensor during evacuating the evaporative emissions system and fuel system is greater than the predetermined vacuum threshold. The predetermined vacuum threshold may be in some examples be a function of atmospheric pressure. For example, the predetermined vacuum threshold may comprise a decreased vacuum level responsive to decreasing barometric pressure, and increased vacuum level responsive to increasing barometric pressure. The predetermined vacuum threshold may be further based on a predetermined diameter, or area, of an orifice whereby undesired evaporative emissions may be escaping from in the fuel system and/or evaporative emissions system.

At 435, if it is indicated that vacuum build in the fuel system and evaporative emissions system has reached the predetermined vacuum threshold, method 400 may proceed to 440. At 440, method 400 may include indicating that CV2 (e.g. 170) is not stuck closed. If CV2 were stuck closed, then the pressure sensor (e.g. 107) would not have registered a change in pressure during evacuating the fuel system and evaporative emissions system. In other words, the CV2 must be functioning as desired responsive to the predetermined threshold vacuum being reached. Furthermore, at 440, it may be indicated that there are no gross undesired evaporative emissions stemming from the fuel system and/or evaporative emissions system. For example, method 400 may include indicating an absence of gross undesired evaporative emissions stemming from an orifice the size of the predetermined diameter, or area, discussed above at 435, where the predetermined diameter, or area, corresponds to gross undesired evaporative emissions. In some examples, gross undesired evaporative emissions may include an orifice diameter corresponding to 0.04" or greater.

Proceeding to 445, method 400 may include closing the CPV1 to isolate the fuel system and evaporative emissions system from atmosphere and from engine intake, and monitoring a pressure bleed-up in the fuel system and evaporative emissions system. Again, pressure may be monitored by a pressure sensor (e.g. 107). Pressure may be monitored for a predetermined duration, in some examples. If pressure in the fuel system and evaporative emissions system reaches a predetermined pressure rise threshold, or if a rate of pressure bleed-up exceeds a predetermined pressure rise rate threshold, then non-gross undesired evaporative emissions may be indicated. However, if, during the predetermined duration, pressure does not reach the predetermined pressure rise threshold, or if the rate of pressure bleed-up does not exceed the predetermined pressure rise rate threshold, then it may be indicated that non-gross undesired evaporative emissions are not present. While step 440 includes indicating an absence of gross undesired evaporative emissions, it may be understood that at step 445, indicating the presence or absence of non-gross undesired evaporative emissions comprises undesired evaporative emissions stemming from a smaller orifice size than that corresponding to gross undesired evaporative emissions. For example, at 445, non-gross undesired evaporative emissions may be indicated corresponding to an orifice size smaller than an orifice size corresponding to gross undesired evaporative emissions. As such, step 445 comprises testing for presence or absence of non-gross undesired evaporative emissions by comparing a pressure change in the fuel system or evaporative emission system to a reference pressure change after evacuating the fuel system and evaporative emissions system.

Proceeding to step 450, method 400 may include storing the results of the evaporative emissions test diagnostic procedure at the controller. As will be discussed in further detail below, the results of the evaporative emissions test diagnostic procedure conducted according to method 400 may in some examples be utilized in conjunction with results of an evaporative emissions test diagnostic procedure conducted under conditions of negative pressure in the intake of the engine (see FIGS. 5-7), in order to conclusively determine the presence or absence of undesired evaporative emissions, and functionality of both CV2 (e.g. 170) and a first check valve (CV1) (e.g. 153).

At 450, method 400 may include updating vehicle operating parameters, responsive to the results of the evaporative emissions test diagnostic. For example, responsive to an indication of an absence of gross undesired evaporative emissions, but further responsive to an indication of a presence of non-gross undesired evaporative emissions, updating vehicle operating conditions may include adjusting an evaporative emissions test schedule, and may further include illuminating a malfunction indicator light (MIL) on the vehicle dash, alerting the vehicle operator that is advisable to service the vehicle.

In some examples, updating vehicle operating conditions responsive to the absence of gross undesired evaporative emissions, and further responsive to an indication of the presence of non-gross undesired evaporative emissions, the evaporative emissions system may be configured with the CVV closed, the CPV1 closed, and the CPV2 open, as discussed above with regard to FIG. 3. Briefly, with the evaporative emissions system configured as such, fuel tank vapors may travel from the fuel tank, through an entirety of the fuel vapor canister (e.g. both the buffer and non-buffer regions), en route to engine intake. In such an example, the vehicle system may be further configured to operate in an electric mode of operation wherever possible, for subsequent times when the vehicle is in operation. In this way, fuel tank vapors may be routed through the entirety of the canister, and may then be routed to engine intake. However, with the engine off, any fuel tank vapors not adsorbed by the canister may be adsorbed via an AIS HC trap (e.g. 169) positioned in the intake of the engine. In this way, undesired evaporative emissions may be reduced, even under conditions where a presence of non-gross undesired evaporative emissions are indicated.

Further, at 450, responsive to an indication of an absence of gross undesired evaporative emissions, and further responsive to an indication of the absence of non-gross undesired evaporative emissions, method 400 may include maintaining closed the CPV1, maintaining closed the CPV2, and commanding open the CVV. By maintaining closed the CPV1 and CPV2, the fuel system and evaporative emissions system may be sealed from engine intake (and from the ejector). Furthermore, by commanding open the CVV, fuel vapors generated in the fuel tank (for example running loss fuel vapors, refueling vapors, or vapors resulting from diurnal temperature fluctuations) may be routed to the fuel vapor canister (e.g. 104) for storage, prior to exiting to atmosphere. Method 400 may then end.

Returning to 435, if it is indicated that vacuum build in the fuel system and evaporative emissions system did not reach the predetermined threshold vacuum, method 400 may proceed to 460. At 460, method 400 may include indicating that either CV2 is stuck closed, or that gross undesired evaporative emissions are present in the fuel system and evaporative emissions system. In other words, the vacuum build may have been prevented from reaching the predetermined vacuum threshold due to the CV2 being stuck closed, or due to gross undesired evaporative emissions. Accordingly, a conclusive determination as to the source of the inability to reach the predetermined threshold vacuum may not be indicated at 460. Instead, method 400 may proceed to 450. At 450, method 400 may include storing the results of the evaporative emissions test diagnostic at the controller. As discussed above, and which will be discussed in further detail below with regard to FIGS. 5-8, the results of the evaporative emissions test diagnostic procedure conducted according to method 400 may in some examples be utilized in conjunction with results of an evaporative emissions test diagnostic procedure conducted under negative pressure conditions in the intake of the engine (see FIGS. 5-7), in order to conclusively ascertain why the threshold vacuum was not reached during evacuating the evaporative emissions system and fuel system according to method 400.

Continuing to 455, method 400 may include commanding closed the CPV1, and commanding open the CVV. As described above, by commanding closed the CPV1, the fuel system and evaporative emissions system may be sealed from engine intake (and from the ejector). Furthermore, by commanding open the CVV, fuel vapors generated in the fuel tank (for example running loss fuel vapors, refueling vapors, or vapors resulting from diurnal temperature fluctuations) may be routed to the fuel vapor canister (e.g. 104) for storage, prior to exiting to atmosphere. Method 400 may then end.

Turning now to FIG. 5, another flow chart for a high level example method 500 for performing an evaporative emissions test diagnostic procedure on an evaporative emissions control system (e.g. 154) and fuel system (e.g. 106), is shown. More specifically, method 500 may be used to conduct an evaporative emissions test diagnostic procedure by spinning the engine unfueled, to generate engine intake vacuum to conduct the test. In this way, by conducting the evaporative emissions test by spinning the engine unfueled to generate intake vacuum, an absence of undesired evaporative emissions and an indication that a first check valve (CV1) (e.g. 153) is not stuck closed may be conclusively indicated responsive to a threshold vacuum being reached during conducting the evaporative emissions test diagnostic. Furthermore, responsive to an indication that the threshold vacuum is not reached during conducting the evaporative emissions test diagnostic, it may be indicated that either gross undesired evaporative emissions are present, or that CV1 is stuck closed. Whether the threshold vacuum is indicated to be reached or not, the results of the evaporative emissions test diagnostic procedure may be stored at the controller, as discussed in further detail below. Such a diagnostic may be desirable for vehicles such as HEVs or PHEVs (see FIGS. 1-2), where fueled engine operation is limited due to the vehicle being frequently able to be propelled via electric power. It may be understood that method 500 may be conducted with the vehicle in a non-operational state (e.g. key-off), or if the vehicle is in operation but being propelled solely via electric power.

Method 500 will be described with reference to the systems described herein and shown in FIGS. 1-2, though it should be understood that similar methods may be applied to other systems without departing from the scope of this disclosure. Method 500 may be carried out by a controller, such as controller 166 in FIG. 1, and may be stored at the controller as executable instructions in non-transitory memory. Instructions for carrying out method 500 and the rest of the methods included herein may be executed by the controller based on instructions stored on a memory of the controller and in conjunction with signals received from sensors of the engine system, such as the sensors described above with reference to FIGS. 1-2. The controller may employ engine, fuel system, and evaporative emissions system actuators, such as first canister purge valve (CPV1) (e.g. 158), second canister purge valve (CPV2) (e.g. 165), canister vent valve (CVV) (e.g. 172), motor (e.g. 220), etc., according to the method below.

Method 500 begins at 505 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 510, method 500 may include indicating whether conditions for an unfueled engine spinning evaporative emissions test are met. For example, conditions for an unfueled engine spinning evaporative emissions test may include a threshold duration of time passing since a prior unfueled engine spinning evaporative emissions test, or other evaporative emissions test on the fuel system and/or evaporative emissions system where negative pressure with respect to atmospheric pressure in the engine intake is utilized to conduct the test. In another example, conditions being met may include a threshold state of charge (SOC) of the onboard energy storage device (e.g. battery, capacitor, supercapacitor, etc.). The threshold SOC may comprise a threshold SOC to enable use of the motor (e.g. 220) to evacuate the fuel system and evaporative emissions system, without adversely affecting other vehicle operating parameters that may utilize energy provided via the onboard energy storage device. Conditions being met at 510 may additionally or alternatively include an indication of a threshold amount of time since the engine was last in operation. The threshold amount of time may in some examples comprise an amount of time where any heat rejection from the engine to the fuel system and/or evaporative emissions system may not adversely impact the unfueled engine spinning evaporative emissions test. As discussed above, the unfueled engine spinning evaporative emissions test may be conducted in some examples while the vehicle is in operation, but where the vehicle is being propelled via electric power, and/or under conditions where the vehicle is not in operation (e.g. key-off). In examples where the unfueled engine spinning evaporative emissions test is conducted under conditions where the vehicle is not in operation, the method may include waking the controller at a predetermined time after a key-off event, in order to conduct the test. In one example, the predetermined time may be a function of a last engine-on event, duration of a last engine on event, ambient conditions such as temperature and/or humidity, etc. Conditions being met at 510 may additionally or alternatively include an indication that a purge event is not in progress. Still further, conditions being met at 510 may in some examples include no prior indication of undesired evaporative emissions in the fuel system and/or evaporative emissions system, and no prior indication of CV1 (e.g. 153) being stuck closed.

If, at 510, conditions are not indicated to be met for conducting the test, method 500 may proceed to 515. At 515, method 500 may include maintaining current vehicle operating status. For example, at 515, method 500 may include maintaining the CPV1 in its current configuration, maintaining the CPV2 in its current configuration, and maintaining the CVV in its current configuration. Furthermore, other engine system actuators such as throttle, fuel injectors, etc., may be maintained in their current status. Method 500 may then end.

Returning to 510, responsive to conditions being indicated to be met for conducting the unfueled engine spinning evaporative emissions test, method 500 may proceed to 520. At 520, method 500 may include spinning the engine unfueled. For example, the motor (e.g. 220) may be actuated to rotate or spin the engine unfueled (e.g. without fuel injection and without spark). It may be understood that the engine may be spun in the default, or forward direction. By spinning the engine unfueled, a vacuum may develop in the engine intake (e.g. 23). The engine may be spun at a predetermined speed (RPM), where the predetermined speed may comprise a speed in which intake vacuum (e.g. negative pressure with respect to atmospheric pressure) is sufficient to conduct the test for undesired evaporative emissions. For example, the predetermined speed may comprise a speed in which, in the absence of undesired evaporative emissions in the fuel system and evaporative emissions system, the threshold vacuum is reached within a predetermined duration of time. In some examples, speed at which the engine is spun unfueled may be a function of SOC of the onboard energy storage device.

With the electric booster activated at 520, method 500 may proceed to 525. At 525, method 500 may include commanding closed (actuating closed) the CVV, and commanding closed (actuating closed) CPV1. Proceeding to 530, method 500 may include commanding open (actuating open) CPV2. By commanding closed the CVV and CPV1, while commanding open the CPV2, vacuum derived from the intake as a result of spinning the engine unfueled may be applied to the evaporative emissions system (e.g. 154) and fuel system (e.g. 106). More specifically, by commanding closed the CVV at step 525, the evaporative emissions system and fuel system may be sealed from atmosphere. By commanding open the CPV2 at 530, vacuum derived from the ejector may be applied to the sealed evaporative emissions system and fuel system. It may be understood that if the CPV1 were commanded open, instead of the CPV2, then vacuum from the engine intake may draw fuel vapors from the fuel tank, through the buffer (e.g. 104a) of the canister (e.g. 104), without the fuel vapors being routed through the non-buffer region (e.g. 104b), which may lead to an increase in undesired emissions as the fuel vapors may not be combusted in the engine as the engine is unfueled, and not combusting air and fuel. Instead, by commanding open the CPV2 while the CPV1 is closed, vacuum from the engine intake may draw fuel tank vapors through an entirety of the canister, en route to engine intake. In this way fuel vapors may be effectively adsorbed by the canister, which may prevent or reduce release of undesired emission to atmosphere.

Proceeding to 535, method 500 may include monitoring vacuum build in the evaporative emissions system and fuel system. For example, monitoring vacuum build (e.g. negative pressure with respect to atmospheric pressure) may include monitoring pressure via a pressure sensor (e.g. 107), positioned in the fuel system and/or evaporative emissions system. Monitoring vacuum build at 535 may be conducted for a predetermined time duration, in some examples.

Continuing at 540, method 500 may include indicating whether vacuum build as monitored by the pressure sensor during evacuating the evaporative emissions system and fuel system is greater (e.g. more negative) than the predetermined threshold vacuum. The predetermined threshold vacuum may be in some examples be a function of atmospheric pressure. For example, the predetermined threshold may comprise a decreased vacuum level responsive to decreasing barometric pressure, and increased vacuum level responsive to increasing barometric pressure. The predetermined threshold may be further based on a predetermined diameter, or area, of an orifice whereby undesired evaporative emissions may be escaping from in the fuel system and/or evaporative emissions system.

At 540, if it is indicated that vacuum build in the fuel system and evaporative emissions system has reached the predetermined threshold vacuum, method 500 may proceed to 545. At 545, method 500 may further include indicating that CV1 (e.g. 153) is not stuck closed. If CV1 were stuck closed, then the pressure sensor (e.g. 107) would not have registered a change in pressure during evacuating the fuel system and evaporative emissions system. In other words, the CV1 must be functioning as desired responsive to the predetermined threshold vacuum being reached. Furthermore, at 545, it may be indicated that there are no gross undesired evaporative emissions stemming from the fuel system and/or evaporative emissions system. For example, method 500 may include indicating an absence of gross undesired evaporative emissions stemming from an orifice the size of the predetermined diameter, or area, discussed above at 540, where the predetermined diameter, or area, corresponds to gross undesired evaporative emissions. In some examples, gross undesired evaporative emissions may include an orifice diameter corresponding to 0.04" or greater.

Continuing at 550, method 500 may include closing the CPV2 to isolate the fuel system and evaporative emissions system from atmosphere and from engine intake, and monitoring a pressure bleed-up in the fuel system and evaporative emissions system. Furthermore, at 550, method 500 may include actuating off (deactivating) the motor, to spin the engine to rest. With the fuel system and evaporative emissions system isolated from atmosphere and engine intake, pressure in the fuel system and evaporative emissions system may be monitored by a pressure sensor (e.g. 107). Pressure may be monitored for a predetermined duration, in some examples. If pressure in the fuel system and evaporative emissions system reaches the predetermined pressure rise threshold, or if a rate of pressure bleed-up exceeds a predetermined pressure rise rate threshold, then non-gross undesired evaporative emissions may be indicated. However, if, during the predetermined duration, pressure does not reach the predetermined pressure rise threshold, or if the rate of pressure bleed-up does not exceed the predetermined pressure rise rate threshold, then it may be indicated that non-gross undesired evaporative emissions are not present. While step 540 includes indicating an absence of gross undesired evaporative emissions, it may be understood that at step 550, indicating the presence or absence of non-gross undesired evaporative emissions comprises undesired evaporative emissions stemming from a smaller orifice size than that corresponding to gross undesired evaporative emissions. For example, at 550, non-gross undesired evaporative emissions may be indicated corresponding to an orifice size smaller than an orifice size corresponding to gross undesired evaporative emissions. As such, step 550 comprises testing for presence or absence of non-gross undesired evaporative emissions by comparing a pressure change in the fuel system or evaporative emission system to a reference pressure change after evacuating the fuel system and evaporative emissions system.

Proceeding to step 555, method 500 may include storing the results of the evaporative emissions test diagnostic procedure at the controller. As will be discussed in further detail below, the results of the evaporative emissions test diagnostic procedure conducted according to method 500 may in some examples be utilized in conjunction with results of an evaporative emissions test diagnostic procedure conducted under conditions of positive pressure in the intake of the engine (see FIGS. 3-4), in order to conclusively determine the presence or absence of undesired evaporative emissions, and functionality of both CV2 (e.g. 170) and a first check valve (CV1) (e.g. 153).

At 555, method 500 may include updating vehicle operating parameters, responsive to the results of the evaporative emissions test diagnostic. For example, responsive to an indication of an absence of gross undesired evaporative emissions, but further responsive to an indication of a presence of non-gross undesired evaporative emissions, updating vehicle operating conditions may include adjusting an evaporative emissions test schedule, and may further include illuminating a malfunction indicator light (MIL) on the vehicle dash, alerting the vehicle operator that is advisable to service the vehicle.

In some examples, updating vehicle operating conditions responsive to the absence of gross undesired evaporative emissions, and further responsive to an indication of the presence of non-gross undesired evaporative emissions, the evaporative emissions system may be configured with the CVV closed, the CPV1 closed, and the CPV2 open. With the evaporative emissions system configured as such, fuel tank vapors may travel from the fuel tank, through an entirety of the fuel vapor canister (e.g. both the buffer and non-buffer regions), en route to engine intake. In such an example, the vehicle system may be further configured to operate in an electric mode of operation wherever possible, for subsequent times when the vehicle is in operation. In this way, fuel tank vapors may be routed through the entirety of the canister, and may then be routed to engine intake. However, with the engine off, any fuel tank vapors not adsorbed by the canister may be adsorbed via an AIS HC trap (e.g. 169) positioned in the intake of the engine. In this way, undesired evaporative emissions may be reduced, even under conditions where a presence of non-gross undesired evaporative emissions are indicated. More specifically, if there is a small (e.g. non-gross) source of undesired evaporative emissions, by routing fuel tank vapors through the entirety of the fuel vapor canister, en route to engine intake via the open CPV2 (and closed CVV), it may be more likely that the vapors may travel to engine intake as discussed, rather than being released to atmosphere, due to less resistance to flow en route to engine intake than through the small source.

Further, at 555, responsive to an indication of an absence of gross undesired evaporative emissions, and further responsive to an indication of the absence of non-gross undesired evaporative emissions, method 500 may include maintaining closed the CPV1, maintaining closed the CPV2, and commanding open the CVV. By maintaining closed the CPV1 and CPV2, the fuel system and evaporative emissions system may be sealed from engine intake (and from the ejector). Furthermore, by commanding open the CVV, fuel vapors generated in the fuel tank (for example running loss fuel vapors, refueling vapors, or vapors resulting from diurnal temperature fluctuations) may be routed to the fuel vapor canister (e.g. 104) for storage, prior to exiting to atmosphere. Method 500 may then end.

Returning to 540, if it is indicated that vacuum build in the fuel system and evaporative emissions system did not reach the predetermined threshold vacuum, method 500 may proceed to 565. At 565, method 500 may include indicating that either CV1 is stuck closed, or that gross undesired evaporative emissions are present in the fuel system and evaporative emissions system. In other words, the vacuum build may have been prevented from reaching the predetermined vacuum threshold due to the CV1 being stuck closed, or due to gross undesired evaporative emissions. Accordingly, a conclusive determination as to the source of the inability to reach the predetermined threshold vacuum may not be indicated at 565. Instead, method 500 may proceed to 570. At 570, method 500 may include commanding closed (actuating closed) the CPV2, and may include deactivating the motor, to spin the engine to rest. Proceeding to 555, method 500 may include storing the results of the evaporative emissions test diagnostic at the controller, and may further include updating vehicle operating conditions. Updating vehicle operating conditions at 555 may include scheduling a test for undesired evaporative emissions under conditions of positive pressure with respect to atmospheric pressure in the intake of the engine, in order to determine whether the CV2 is stuck closed, or whether gross undesired evaporative emissions are present, as discussed above with regard to FIGS. 3-4. Method 500 may then end.

Figure 6:
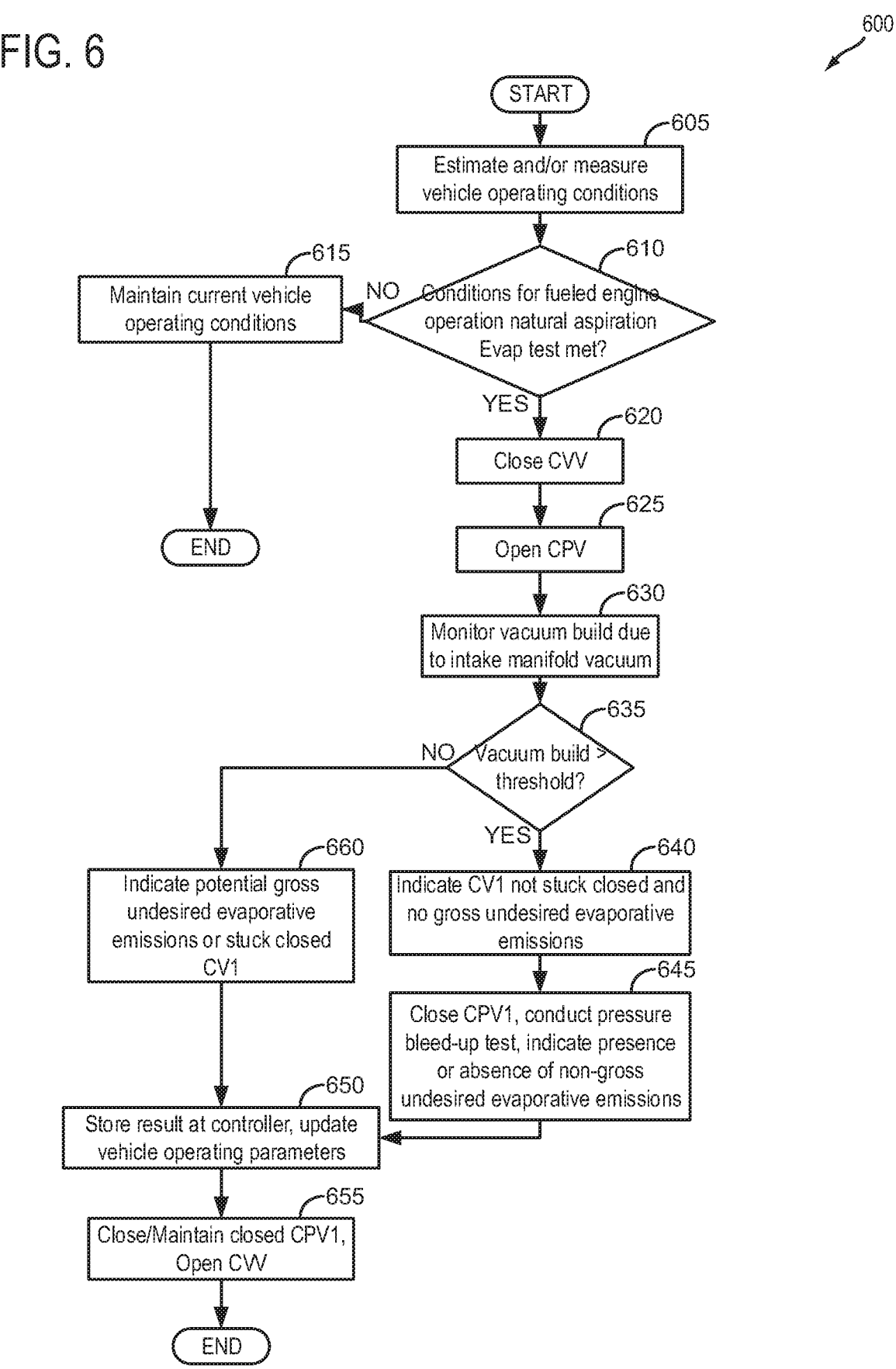
FIG. 6 shows a high-level example method for conducting a test for undesired evaporative emissions on a fuel system and evaporative emissions system, via natural aspiration when the engine is operating to combust air and fuel.

Turning now to FIG. 6, a flow chart for a high level example method 600 for performing an evaporative emissions test diagnostic procedure on an evaporative emissions control system (e.g. 154) and fuel system (e.g. 106), is shown. More specifically, method 600 may be used to conduct an evaporative emissions test diagnostic procedure responsive to an indication that conditions are met for an evaporative emissions test under natural aspiration (intake manifold vacuum) conditions, while the engine is operating to combust air and fuel. In this way, by conducting the evaporative emissions test under natural aspiration conditions where the engine is in operation to combust air and fuel (fueled engine operation), an absence of undesired evaporative emissions and an indication that a first check valve (CV1) (e.g. 153) is not stuck closed may be conclusively indicated responsive to a threshold vacuum being reached during conducting the evaporative emissions test diagnostic. Furthermore, responsive to an indication that the threshold vacuum is not reached during conducting the evaporative emissions test diagnostic, it may be indicated that either gross undesired emissions are present, or that CV1 is stuck closed. Whether the threshold vacuum is indicated to be reached or not, the results of the evaporative emissions test diagnostic procedure may be stored at the controller, as discussed in further detail below.

Method 600 will be described with reference to the systems described herein and shown in FIG. 1, though it should be understood that similar methods may be applied to other systems without departing from the scope of this disclosure. Method 600 may be carried out by a controller, such as controller 166 in FIG. 1, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIG. 1. The controller may employ fuel system and evaporative emissions system actuators, such as first canister purge valve (CPV1) (e.g. 158), second canister purge valve (CPV2) (e.g. 165), canister vent valve (CVV) (e.g. 172), etc., according to the method below.

Method 600 begins at 605 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 610, method 600 may include indicating whether conditions for an evaporative emissions test under natural aspiration (intake manifold vacuum), where the engine is operating to combust air and fuel, are met. For example, conditions for an evaporative emissions test under natural aspiration may include an indication of manifold air pressure (MAP) less than barometric pressure (BP), or atmospheric pressure, by a predetermined threshold amount.

In some examples, conditions being met at 610 may include MAP being less than BP by the predetermined threshold amount for a predetermined time duration. Conditions being met at 610 may in some examples further include an indication that an evaporative emission test diagnostic on the evaporative emissions control system and fuel system under natural aspiration conditions has not already been conducted during the current drive cycle. Conditions being met at 610 may in some examples further include an indication that a purge event is not in progress. Still further, conditions being met at 610 may in some examples include no prior indication of undesired evaporative emissions in the fuel system and/or evaporative emissions system, and no prior indication of CV1 (e.g. 153) being stuck closed.

If, at 610, conditions for an evaporative emissions test diagnostic procedure under natural aspiration are not indicated to be met, method 600 may proceed to 615. At 615, method 600 may include maintaining current vehicle operating status. For example, at 615, method 600 may include maintaining the CPV1 in its current configuration, maintaining the CPV2 in its current configuration, and maintaining the CVV in its current configuration. Furthermore, other engine system actuators such as throttle, fuel injectors, etc., may be maintained in their current status. Method 600 may then end.

Returning to 610, if it is indicated that conditions for an evaporative emissions test diagnostic procedure are met, method 600 may proceed to 620. At 620, method 600 may include commanding closed (actuating closed) the CVV. Proceeding to 625, method 600 may include commanding open (actuating open) the CPV1. While not explicitly illustrated, the CPV2 may be maintained closed or commanded closed at 620. By commanding closed the CVV and commanding open the CPV1 (with the CPV2 closed), vacuum derived from the intake manifold under natural aspiration conditions may be applied to the evaporative emissions system (e.g. 154) and fuel system (e.g. 106). More specifically, by commanding closed the CVV at step 620, the evaporative emissions system and fuel system may be sealed from atmosphere. By commanding open the CPV1 at 625, vacuum derived from the intake manifold may be applied to the sealed evaporative emissions system and fuel system.

Proceeding to 630, method 600 may include monitoring vacuum build in the evaporative emissions system and fuel system. For example, as discussed above, monitoring vacuum build (e.g. negative pressure with respect to atmospheric pressure) may include monitoring pressure via a pressure sensor (e.g. 107), positioned in the fuel system and/or evaporative emissions system. Monitoring vacuum build at 630 may be conducted for a predetermined time duration, in some examples.

Accordingly, proceeding to 635, method 600 may include indicating whether vacuum build as monitored by the pressure sensor during evacuating the evaporative emissions system and fuel system is greater than a predetermined threshold vacuum. The predetermined threshold vacuum may be in some examples be a function of atmospheric pressure. For example, the predetermined threshold may comprise a decreased vacuum level responsive to decreasing barometric pressure, and increased vacuum level responsive to increasing barometric pressure. The predetermined threshold vacuum may be further based on a predetermined diameter, or area, of an orifice whereby undesired evaporative emissions may be escaping from in the fuel system and/or evaporative emissions system.

At 635, if it is indicated that vacuum build in the fuel system and evaporative emissions system has reached the predetermined threshold vacuum, method 600 may proceed to 640. At 640, method 600 may include indicating that CV1 (e.g. 153) is not stuck closed or substantially closed. If CV1 were stuck closed, then the pressure sensor (e.g. 107) would not have registered a change in pressure during evacuating the fuel system and evaporative emissions system. In other words, the CV1 must be functioning as desired responsive to the predetermined threshold vacuum being reached. Furthermore, at 640, it may be indicated that there are no gross undesired evaporative emissions stemming from the fuel system and/or evaporative emissions system. For example, method 600 may include indicating an absence of gross undesired evaporative emissions stemming from an orifice the size of the predetermined diameter, or area, discussed above at 635, where the predetermined diameter, or area, corresponds to gross undesired evaporative emissions. In some examples, gross undesired evaporative emissions may include an orifice diameter corresponding to 0.049" or greater.

Proceeding to 645, method 600 may include closing the CPV1 to isolate the fuel system and evaporative emissions system from atmosphere and from engine intake, and monitoring a pressure bleed-up in the fuel system and evaporative emissions system. Again, pressure may be monitored by a pressure sensor (e.g. 107). Pressure may be monitored for a predetermined duration, in some examples. If pressure in the fuel system and evaporative emissions system reaches a predetermined pressure rise threshold, or if a rate of pressure bleed-up exceeds a predetermined pressure rise rate threshold, then non-gross undesired evaporative emissions may be indicated. However, if, during the predetermined duration, pressure does not reach the predetermined pressure rise threshold, or if the rate of pressure bleed-up does not exceed the predetermined pressure rise rate threshold, then it may be indicated that non-gross undesired evaporative emissions are not present. While step 640 includes indicating an absence of gross undesired evaporative emissions, it may be understood that at step 645, indicating the presence or absence of non-gross undesired evaporative emissions comprises undesired evaporative emissions stemming from a smaller orifice size than that corresponding to gross undesired evaporative emissions. For example, at 645, non-gross undesired evaporative emissions may be indicated corresponding to an orifice size substantially smaller than an orifice size corresponding to gross undesired evaporative emissions. As such, step 645 comprises testing for presence or absence of non-gross undesired evaporative emissions by comparing a pressure change in the fuel system or evaporative emission system to a reference pressure change after evacuating the fuel system and evaporative emissions system.

Proceeding to step 650, method 600 may include storing the results of the evaporative emissions test diagnostic procedure at the controller. As will be discussed in further detail below, the results of the evaporative emissions test diagnostic procedure conducted according to method 600 may in some examples be utilized in conjunction with results of an evaporative emissions test diagnostic procedure conducted under boost conditions (engine-off or engine-on) (see FIGS. 3-4), in order to conclusively determine the presence or absence of undesired evaporative emissions, and functionality of both CV2 (e.g. 170) and a first check valve (CV1) (e.g. 153).

Furthermore, at 650, method 600 may include updating vehicle operating parameters, responsive to the results of the evaporative emissions test diagnostic. For example, responsive to an indication of an absence of gross undesired evaporative emissions, but further responsive to an indication of a presence of non-gross undesired evaporative emissions, updating vehicle operating conditions may include adjusting an evaporative emissions test schedule, and may further include illuminating a malfunction indicator light (MIL) on the vehicle dash, alerting the vehicle operator that is advisable to service the vehicle.

In some examples, updating vehicle operating conditions responsive to the absence of gross undesired evaporative emissions, and further responsive to an indication of the presence of non-gross undesired evaporative emissions, the evaporative emissions system may be configured with the CVV closed, the CPV1 closed, and the CPV2 open, as discussed above. Briefly, with the evaporative emissions system configured as such, fuel tank vapors may travel from the fuel tank, through an entirety of the fuel vapor canister (e.g. both the buffer and non-buffer regions), en route to engine intake. In such an example, the vehicle system may be further configured to operate in an electric mode of operation wherever possible, for subsequent times when the vehicle is in operation. In this way, fuel tank vapors may be routed through the entirety of the canister, and may then be routed to engine intake. However, with the engine off, any fuel tank vapors not adsorbed by the canister may be adsorbed via an AIS HC trap (e.g. 169) positioned in the intake of the engine. In this way, undesired evaporative emissions may be reduced, even under conditions where a presence of non-gross undesired evaporative emissions are indicated.

Further, at 650, responsive to an indication of an absence of gross undesired evaporative emissions, and further responsive to an indication of the absence of non-gross undesired evaporative emissions, method 600 may include maintaining closed the CPV1, maintaining closed the CPV2, and commanding open the CVV. By maintaining closed the CPV1 and CPV2, the fuel system and evaporative emissions system may be sealed from engine intake (and from the ejector). Furthermore, by commanding open the CVV, fuel vapors generated in the fuel tank (for example running loss fuel vapors, refueling vapors, or vapors resulting from diurnal temperature fluctuations) may be routed to the fuel vapor canister (e.g. 104) for storage, prior to exiting to atmosphere. Method 600 may then end.

Turning now to FIG. 7, a flow chart for a high level example method 700 for conducting an evaporative emissions test diagnostic procedure under both boost conditions and natural aspiration conditions, is shown. In other words, method 700 comprises a dual test monitor. Method 700 includes evacuating the fuel system and evaporative emissions system through a first check valve (CV1) (e.g. 153) in a first condition, and evacuating the fuel system and evaporative emissions system through a second check valve (CV2) (e.g. 170) in a second condition. Accordingly, the presence or absence of gross undesired evaporative emissions in the fuel system and/or evaporative emissions system, and whether one of the first check valve or the second check valve is stuck substantially closed, may be indicated based on a vacuum level reached during the evacuating of the fuel system and evaporative emissions system in both the first condition and the second condition. Furthermore, subsequent to evacuating the fuel system and evaporative emissions system via either the CV1 or CV2, the fuel system and evaporative emissions system may be sealed from engine intake and from atmosphere, and a pressure bleed-up test may be conducted, to indicate a presence or absence of non-gross undesired evaporative emissions.

Method 700 will be described with reference to the systems described herein and shown in FIGS. 1-2, though it should be understood that similar methods may be applied to other systems without departing from the scope of this disclosure. Method 700 will be further described with reference to the methods described herein and shown in FIGS. 3-6. Method 700 may be carried out by a controller, such as controller 166 in FIG. 1, and may be stored at the controller as executable instructions in non-transitory memory. Instructions for carrying out method 700 and the rest of the methods included herein may be executed by the controller based on instructions stored on a memory of the controller and in conjunction with signals received from sensors of the engine system, such as the sensors described above with reference to FIG. 1. The controller may employ fuel system and evaporative emissions system actuators, such as first canister purge valve (CPV1) (e.g. 158), second canister purge valve (CPV2) (e.g. 165), canister vent valve (CVV) (e.g. 172), motor (e.g. 220), electric booster (e.g. 155), etc., according to the method below.

Method 700 begins at 705 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 710, method 700 may include indicating whether conditions for an evaporative emissions test diagnostic under boost conditions are met. In this example method 700, it may be understood that conditions being met at 710 may include conditions being met for either an engine-off test (see step 310 of FIG. 3), where the electric booster is utilized to provide boosted conditions of positive intake pressure with respect to atmospheric pressure, or an engine-on test (see step 410 of FIG. 4). As the circumstances for indicating whether conditions are met for conducting either the engine-off test or engine-on test have been described in detail above, such conditions will not be reiterated here, for brevity.

If, at 710, it is indicated that conditions for the evaporative emissions test diagnostic procedure under boost conditions (engine-on or engine-off) are met, method 700 may proceed to 715. At 715, method 700 may include conducting the evaporative emissions test under boost conditions, according to the methods described in detail above with regard to FIGS. 3-4. For example, if conditions are indicated to be met at 710 for conducting the engine-off boost test, method 300 depicted at FIG. 3 may be utilized. Alternatively, if conditions are indicated to be met at 710 for conducting the engine-on boost test, method 400 at FIG. 4 may be utilized. As discussed above, subsequent to conducting the evaporative emissions test diagnostic procedure under either boost conditions where the engine is off (FIG. 3), or under boost conditions where the engine is on (FIG. 4), the results of the test diagnostic may be stored at the controller, in order to utilize the results in conjunction with results of an evaporative emissions test diagnostic procedure conducted under conditions of negative pressure with respect to atmospheric pressure in the engine intake, discussed in further detail below.

Accordingly, subsequent to conducting the evaporative emissions test diagnostic procedure under boost conditions (engine-on or engine-off) and storing the results at the controller according to method 300 depicted at FIG. 3 or method 400 depicted at FIG. 4, method 700 may proceed to 720. At 720, method 700 may include indicating whether conditions for an evaporative emissions test diagnostic procedure under conditions of negative pressure with respect to atmospheric pressure in the engine intake, are met. In other words, at 720, it may be indicated as to whether conditions are met for conducting the evaporative emissions test diagnostic under natural aspiration conditions, where natural aspiration conditions may include either unfueled engine operation (see FIG. 5), or fueled engine operation (see FIG. 6). As the circumstances have been described in detail above for indicating whether conditions are met for conducting either the unfueled engine operation test or the fueled engine operation test, such conditions will not be reiterated here, for brevity.

If, at 720, it is indicated that conditions for an evaporative emissions test diagnostic procedure under natural aspiration conditions (fueled engine operation or unfueled engine operation) are not met, method 700 may proceed to 725. At 725, method 700 may include maintaining vehicle operating conditions, until it is indicated that conditions are met for conducting an evaporative emissions test diagnostic under natural aspiration conditions. For example, a status of evaporative emissions system actuators (e.g. CPV1, CPV2, CVV), fuel system actuators (e.g. fuel injectors, etc.), engine operational status (air fuel ratio, spark timing, etc.), may be maintained.

Accordingly, proceeding to 726, method 700 may include indicating whether a threshold duration of time has elapsed since conducting the evaporative emissions test under boosted conditions, which may include either engine-on conditions or engine-off conditions. For example, consider a situation where the vehicle is in a key-off condition, and the evaporative emissions test is conducted under engine-off boosted conditions according to method 300 depicted at FIG. 3. In one example, another evaporative emissions test, this time under natural aspiration conditions where unfueled engine spinning is utilized to conduct the test according to method 500 depicted at FIG. 5, may be conducted during the same key-off condition. Such a series of tests may be conducted, for example, responsive to a sufficient amount of battery charge being available to conduct both the engine-off test under boosted conditions, and the unfueled engine spinning test using natural aspiration. In such an example, both tests may be conducted within the threshold duration, under some examples.

However, there may be circumstances where the engine-off test under boosted conditions (FIG. 3) is conducted during a key-off condition, and then prior to conducting the test under natural aspiration conditions during the same key-off condition, the vehicle enters into a key-on condition. In such an example, as long as the threshold duration of time has not elapsed, either a natural aspiration test using unfueled engine spinning (FIG. 5), or a natural aspiration test using fueled engine operation (FIG. 6) may be conducted.

Similarly, there may be circumstances where the evaporative emissions test under boosted conditions may be conducted during a key-on condition, where the engine is in operation (FIG. 4). Prior to conducting the test under natural aspiration conditions during the same key-on condition, if the vehicle is turned off (e.g. key-off condition), an evaporative emissions test under natural aspiration conditions where the engine is off (FIG. 5) may be conducted, so long as the threshold duration of time has not elapsed. Such examples are meant to be illustrative.

Said another way, for the dual monitor test depicted at FIG. 7 that includes conducting both a test for undesired evaporative emissions under boosted conditions (engine-on or engine off) and a test for undesired evaporative emissions under natural aspiration conditions (fueled or unfueled engine operation), such tests may not be restricted to being both conducted during the same key-on condition, or the same key-off condition. Instead, the dual test monitor may include conducting one test (e.g. boosted operation) while the vehicle is in operation (key-on), and conducting the other test (e.g. natural aspiration) after the vehicle has been deactivated (key-off), so long as the threshold duration has not elapsed. In another example, the dual test monitor may include conducting one test (e.g. boosted operation) while the vehicle is deactivated (key-off), and conducting the other test (e.g. natural aspiration) after the vehicle has been turned on (key-on), so long as the threshold duration has not elapsed.

Still further, the dual monitor test depicted at FIG. 7 may include conducting both tests (e.g. boosted operation and natural aspiration), in a same key-on condition, or may include conducting both tests (e.g. boosted operation and natural aspiration), in a same key-off condition, so long as the threshold duration has not elapsed.

In some examples, the threshold duration may comprise 1 hours, 2 hours, 3 hours, 4 hours, 5 hours, 6 hours, 7 hours, 8 hours, 9 hours, 10 hours, 12 hours, 14 hours, or 24 hours, for example. Accordingly, if at 726, the threshold duration is not yet indicated to be elapsed, method 700 may return to 720, where it may be assessed as to whether conditions are met for conducting the natural aspiration test (fueled or unfueled engine operation). Alternatively, responsive to an indication that the threshold duration has elapsed, method 700 may proceed to 727, and may include aborting the dual test monitor. In such an example, the fact that the dual test monitor was aborted may be stored at the controller as a flag set at the controller, and another dual test monitor may be scheduled to be conducted at the next available opportunity.

Returning to 720, if it is indicated that conditions for the evaporative emissions test diagnostic procedure under natural aspiration conditions are met, method 700 may proceed to 730. At 730, method 700 may include conducting the evaporative emissions test diagnostic procedure under natural aspiration (fueled engine operation or unfueled engine operation), according to the methods depicted above with regard to FIGS. 5-6.

Subsequent to conducting the test under natural aspiration conditions, which may include either fueled engine operation (FIG. 6), or unfueled engine operation (FIG. 5), method 700 may proceed to 735.

Accordingly, at 735, method 700 may include indicating the results of the dual test monitor. Specifically, results from the evaporative emissions test diagnostic procedure under both boost conditions and natural aspiration conditions may be analyzed and interpreted by the controller, for example, in order to indicate whether CV1 (e.g. 153) is stuck closed or not, whether CV2 (e.g. 170) is stuck closed or not, and whether undesired evaporative emissions are present in the evaporative emissions system (e.g. 154) and/or fuel system (e.g. 106). In some examples, the results of the dual test monitor may be interpreted/analyzed with regard to a lookup table stored at the controller. FIG. 8 depicts one such example lookup table.

Turning to FIG. 8, an example lookup table 800 for interpreting (analyzing) results from the dual test monitor, is shown. Four potential outcomes from the dual test monitor are indicated by letters A, B, C, and D. The four potential outcomes will accordingly be described herein.

Outcome A may comprise an example wherein the predetermined vacuum threshold was reached under both boost conditions (either engine-on or engine-off), and under natural aspiration conditions (fueled engine operation or unfueled engine operation). In such an example outcome A, it may be indicated that both CV1 and CV2 are not stuck closed, and that no gross undesired evaporative emissions (e.g. 0.04" or greater orifice diameter size) are present in the fuel system and evaporative emissions system. If one of the valves were stuck closed, then the predetermined vacuum would not have been reached under conditions wherein the fuel system and evaporative emissions were attempted to be evacuated via the route comprising the stuck closed valve.

Outcome B may comprise an example wherein the predetermined vacuum threshold was not reached under boost conditions (either engine-on or engine-off), and additionally the predetermined vacuum threshold was not reached under natural aspiration conditions (fueled or unfueled engine operation). In such an example outcome B, it may be indicated with high probability that both CV1 and CV2 are not stuck closed, but that the reason for the predetermined vacuum threshold not being reached under both boost conditions and natural aspiration conditions is because of the presence of gross undesired evaporative emissions in the fuel system and/or evaporative emissions system. For example, it may be a low probability event that both CV1 and CV2 are stuck closed. Thus, if the tests under boost conditions and natural aspiration conditions both indicate a inability to reach the predetermined vacuum threshold, the most likely explanation is that gross undesired evaporative emissions are present in the fuel system and/or evaporative emissions system. As such, a technician may be directed to first look for the presence of undesired evaporative emissions, responsive to an indication of outcome B subsequent to conducting the dual test monitor. In such an example scenario, if gross undesired evaporative emissions are not found by a technician, then the culprit of the outcome B may be that both CV1 and CV2 are stuck closed.

Outcome C may comprise an example wherein the predetermined vacuum threshold was reached under boost conditions (engine-on or engine-off conditions), but wherein the predetermined vacuum threshold was not reached under natural aspiration conditions (fueled or unfueled engine operation). In other words, a predetermined negative pressure was not reached when evacuating the fuel system and evaporative emissions system during a natural aspirated mode of operation, but was reached when reducing pressure during a boosted mode of operation. In such an example outcome C, it may be indicated that CV2 is not stuck closed, that CV1 is stuck closed, and that gross undesired evaporative emissions are not present in the fuel system and evaporative emissions system. More specifically, because the predetermined vacuum threshold was reached under one condition, gross undesired evaporative emissions cannot be present, otherwise the predetermined vacuum threshold could not have been reached. Furthermore, because the predetermined vacuum threshold was not reached under one condition (under natural aspiration in this example), then it may be conclusively determined that CV1 is stuck closed. As such, a technician may be directed to mitigating the stuck closed CV1, rather than searching for a source of gross undesired evaporative emissions in the fuel system and evaporative emissions system, for example.

Outcome D may comprise an example wherein the predetermined vacuum threshold was not reached under boost conditions (engine-on or engine-off conditions), but wherein the predetermined vacuum threshold was reached under natural aspiration conditions (fueled or unfueled engine operation). In other words, a predetermined negative pressure was not reached when evacuating the fuel system and evaporative emissions system during a boosted mode of operation, but was reached when reducing pressure during a natural aspirated mode of operation. In such an example outcome D, it may be indicated that CV2 is stuck closed, that CV1 is not stuck closed, and that no gross undesired evaporative emissions are present in the fuel system and evaporative emissions system. For example, similar to outcome C, because the predetermined vacuum threshold was reached under one condition, gross undesired evaporative emissions cannot be present, otherwise the predetermined vacuum threshold could not have been reached. Furthermore, because the predetermined vacuum threshold was not reached under one condition (boost condition in this example), then it may be conclusively determined that CV2 is stuck substantially closed. As such, a technician may be directed to mitigating the stuck closed CV2, rather than searching for a source of undesired evaporative emissions in the fuel system and evaporative emissions system, for example.

In summary, example lookup table 800 may be utilized in order to interpret the results of the dual test monitor conducted according to method 700 depicted at FIG. 7. Accordingly, returning to step 735 of FIG. 7, responsive to indicating the results of the dual test monitor via, for example, lookup table 800, method 700 may proceed to method 900 depicted at FIG. 9 wherein canister purge operations may be adjusted according to the outcome of the dual test monitor. Furthermore, responsive to an indication that either CV1 or CV2 are stuck closed, or responsive to an indication of undesired evaporative emissions, a malfunction indicator light (MIL) may be illuminated on a dash of the vehicle, for example, alerting a vehicle operator to service the vehicle, and may further include indicating the reason for the MIL.

Returning to 710, if it is indicated that conditions are not met for an evaporative emissions test diagnostic procedure under boost conditions (engine-on or engine-off), method 700 may proceed to 740. At 740, method 700 may include indicating whether conditions are met for conducting an evaporative emissions test diagnostic procedure under natural aspiration conditions (fueled engine operation or unfueled engine operation). The circumstances comprising conditions being met for conducting the evaporative emissions test under natural aspiration conditions for unfueled engine operation have been described at step 510 of FIG. 5. The circumstances comprising conditions being met for conducting the evaporative emissions test under natural aspiration conditions for fueled engine operation have been described at step 610 of FIG. 6. Thus, for brevity, such conditions will not be reiterated here.

If, at 740, it is indicated that conditions for an evaporative emissions test diagnostic procedure under natural aspiration conditions (fueled or unfueled engine operation) are met, method 700 may proceed to 745. At 745, method 700 may include conducting the evaporative emissions test under natural aspiration, according to either the method described in detail above with regard to FIG. 5 (unfueled engine spinning) or the method described above with regard to FIG. 6 (fueled engine operation). As discussed above, subsequent to conducting the evaporative emissions test under natural aspiration conditions, the results of the test diagnostic may be stored at the controller, in order to utilize the results in conjunction with results of an evaporative emissions test diagnostic procedure conducted under boost conditions.

Accordingly, subsequent to conducting the evaporative emissions test diagnostic procedure under natural aspiration conditions and storing the results at the controller, method 700 may proceed to 750. At 750, method 700 may include indicating whether conditions for an evaporative emissions test diagnostic procedure under boost conditions (engine-on or engine off conditions) are met. For example, it may be understood that conditions being met at 750 may include conditions being met for either an engine-off test (see step 310 of FIG. 3), where the electric booster is utilized to provide boosted conditions of positive intake pressure with respect to atmospheric pressure, or an engine-on test (see step 410 of FIG. 4). As the circumstances for indicating whether conditions are met for conducting either the engine-off test or engine-on test have been described in detail above, such conditions will not be reiterated here, for brevity.

If, at 750, it is indicated that conditions for an evaporative emissions test diagnostic procedure under boost conditions are not met, method 700 may proceed to 755. At 755, method 700 may include maintaining vehicle operating conditions, until it is indicated that conditions are met for conducting an evaporative emissions test diagnostic under boost conditions (engine-on or engine-off conditions). For example, a status of evaporative emissions system actuators (e.g. CPV1, CPV2, CVV), fuel system actuators (e.g. fuel injectors, etc.), engine operational status (air fuel ratio, spark timing, etc.), may be maintained.

Accordingly, proceeding to 756, method 700 may include indicating whether a threshold duration of time has elapsed since conducting the evaporative emissions test under natural aspiration conditions, which may include either fueled engine operation or unfueled engine operation. Examples regarding the threshold duration have been provided above at step 726 of method 700, and are equally valid for step 756. Thus, detailed description of conditions related to the threshold duration will not be reiterated here, for brevity.

Accordingly, if at 756, the threshold duration is not yet indicated to be elapsed, method 700 may return to 750, where it may be assessed as to whether conditions are met for conducting the boosted test for undesired evaporative emissions (engine-on or engine-off conditions). Alternatively, responsive to an indication that the threshold duration has elapsed, method 700 may proceed to 757, and may include aborting the dual test monitor. In such an example, the fact that the dual test monitor was aborted may be stored at the controller as a flag set at the controller, and another dual test monitor may be scheduled to be conducted at the next available opportunity.

Returning to 750, if it is indicated that conditions for an evaporative emissions test diagnostic procedure under boost conditions are met, method 700 may proceed to 760. At 760, method 700 may include conducting the evaporative emissions test procedure under boost conditions, according either the method depicted above with regard to FIG. 3 or the method depicted above with regard to FIG. 4. As discussed above, subsequent to conducting the evaporative emissions test diagnostic procedure under boost conditions (engine-on or engine-off conditions), the results of the test diagnostic may be stored at the controller, in order to utilize the results in conjunction with results of the evaporative emissions test diagnostic procedure conducted under natural aspiration conditions during the same drive cycle.

Accordingly, proceeding to 765, method 700 may include indicating the results of the dual test monitor. As discussed above with regard to step 735 of method 700, results from the evaporative emissions test diagnostic procedure under both natural aspiration conditions (either fueled or unfueled engine operation) and boost conditions (either engine-on or engine-off conditions) may be analyzed and interpreted by the controller, according to a lookup table such as lookup table 800 depicted at FIG. 8. To avoid redundancy, a thorough description of FIG. 8 will not be reiterated here, but it may be understood that at step 865, results of the dual test monitor may be interpreted according to lookup table depicted at FIG. 8, as discussed in detail above. Furthermore, as discussed above, responsive to an indication that either CV1 or CV2 are stuck closed, or responsive to an indication of undesired evaporative emissions, a malfunction indicator light (MIL) may be illuminated on a dash of the vehicle, for example, alerting a vehicle operator to service the vehicle, and may further include indicating the reason for the MIL. Responsive to indicating the results of the dual test monitor at 765, method 700 may proceed to method 900 depicted at FIG. 9 wherein canister purge operations may be adjusted according to the outcome of the dual test monitor.

Turning now to FIG. 9, a flow chart for a high level example method 900 for conducting fuel vapor canister purging operations, are shown. More specifically, method 900 may proceed from method 700 and may include purging fuel vapors stored in the fuel vapor canister under select engine operating conditions by commanding open the first canister purge valve (CPV1), commanding or maintaining closed the second canister purge valve (CPV2), and commanding open a canister vent valve (CVV) to draw atmospheric air across the fuel vapor storage canister to desorb fuel vapors. Desorbed fuel vapors may be routed through either a first check valve CV1 (e.g. 153) or a second check valve CV2 (e.g. 170) depending on the engine operating conditions, wherein routing desorbed fuel vapors through the CV1 is discontinued responsive to an indication that the CV1 is stuck closed, and wherein routing desorbed fuel vapors through the CV2 is discontinued responsive to an indication that the CV2 is stuck substantially closed.

Method 900 will be described with reference to the systems described herein and shown in FIGS. 1-2, though it should be understood that similar methods may be applied to other systems without departing from the scope of this disclosure. Method 900 may be carried out by a controller, such as controller 166 in FIG. 1, and may be stored at the controller as executable instructions in non-transitory memory. Instructions for carrying out method 900 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, such as CPV1 (e.g. 158), CPV2 (e.g. 165), canister vent valve (CVV) (e.g. 172), etc., according to the method below.

Method 900 begins at 905 and may include indicating whether a fuel vapor canister purge operation request is indicated during a vehicle drive cycle. A fuel vapor canister purge operation may be requested responsive to conditions being met for a canister purge operation. For example, conditions being met for a canister purge operation may include an indication of an amount of fuel vapor stored in the fuel vapor canister (e.g. 104) greater than a predetermined threshold amount, an estimate or measurement of temperature of an emission control device such as a catalyst being above a predetermined temperature associated with catalytic operation commonly referred to as light-off temperature, etc.

If, at 905, a canister purge event request is not indicated, method 900 may proceed to 910. At 910, method 900 may include maintaining vehicle operating conditions. For example, a status of evaporative emissions system actuators (e.g. CPV1, CPV2, CVV), fuel system actuators (e.g. fuel injectors, etc.), engine operational status (air fuel ratio, spark timing, etc.), may be maintained.

Returning to 905, if a canister purge event request is indicated, method 900 may proceed to 915. At 915, method 900 may include indicating whether the vehicle engine is operating under boost conditions. For example, it may be determined whether manifold air pressure (MAP) is greater than barometric pressure (BP) where the engine is in operation to combust air and fuel. Such a determination may be indicated via a pressure sensor (e.g. 115) positioned in an intake manifold, for example a MAP sensor, and a dedicated barometric pressure sensor (e.g. 119). In other examples, barometric pressure may be indicated via any conventional means. If, at 915 it is indicated that the vehicle engine is operating under boost conditions, method 900 may proceed to 920. At 920, method 900 may include indicating whether conditions are met for a purge under boost. For example, conditions being met for purge under boost conditions may include an indication of MAP greater than BP by a predetermined threshold, and may in some examples further include MAP greater than BP by the predetermined threshold, for a predetermined time duration. If, at 920, conditions are not met for purging under boost, then method 900 may proceed to 925, and may include maintaining vehicle operating conditions. Similar to that described above with regard to step 910, at 925, maintaining vehicle operating conditions may include maintaining a status of evaporative emissions system actuators (e.g. CPV1, CPV2, CVV), fuel system actuators (e.g. fuel injectors, etc.), engine operational status (air fuel ratio, spark timing, etc.), etc.

If, at 920, it is indicated that conditions are met for purging under boost conditions, method 900 may proceed to 930. At 930, method 900 may include indicating whether CV2 (e.g. 170) has been previously indicated to be stuck closed. For example, if the dual test monitor described above with regard to method 700 indicated that the CV2 is stuck closed, then method 900 may proceed to 935 and may include aborting the purging operation under boost conditions. More specifically, a stuck closed CV2 may prevent vacuum derived from an ejector system (e.g. 140) under boost conditions from reaching the fuel vapor canister. Thus, purging the fuel vapor canister under boost conditions may be rendered ineffective responsive to an indication of a stuck closed CV2. Accordingly, the purging operation may be aborted at 935. Method 900 may then proceed to 940, and may include updating the fuel vapor canister purging operational status. For example, it may be indicated that a canister purge request was indicated and that conditions were met for a boosted purge operation, but that the purge operation was aborted due to a stuck closed CV2. As the boosted purge operation was aborted, method 900 may thus return to the start of method 900.

Returning to step 930, if it is indicated that conditions are met for a purging operation under boost conditions, and CV2 is not indicated to be stuck closed, method 900 may proceed to 945. At 945, method 900 may include commanding open the CPV1 (and maintaining or commanding closed the CPV2), and commanding open or maintaining open the CVV. Proceeding to step 950, method 900 may include purging the contents of the fuel vapor canister to engine intake. More specifically, by commanding open the CPV1 and commanding open or maintaining open the CVV, vacuum derived from the ejector (e.g. 140) under boost conditions may be routed to the fuel vapor canister (e.g. 104), thus drawing atmospheric air through a vent (e.g. 136), and through the fuel vapor canister. By drawing atmospheric air across the fuel vapor canister, stored fuel vapor may thus be desorbed and routed to the ejector. As discussed above with regard to FIG. 1, upon entering the ejector, air and fuel vapors may be drawn out of the ejector via an outlet port (e.g. 146) and into an intake (e.g. 118) at a position upstream of a compressor (e.g. 126). Operation of the engine, and in some examples the compressor, may then draw the air and fuel vapors through the compressor, and through a charge air cooler (e.g. 156) for delivery to an intake manifold of the engine (e.g. 116).

In some examples, purging the contents of the fuel vapor canister to engine intake may include purging until a stored fuel vapor amount in the canister is below a predetermined threshold canister load. For example, during purging, a learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. More specifically, one or more exhaust gas oxygen sensors (e.g. 125) may be positioned in the engine exhaust to provide an estimate of a canister load (that is, an amount of fuel vapors stored in the canister). Exhaust gas sensor may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Based on the canister load, and further based on engine operating conditions, such as engine speed-load conditions, a purge flow rate may be determined. In one example, purging the canister may include indicating an air/fuel ratio via, for example, a proportional plus integral feedback controller coupled to a two-state exhaust gas oxygen sensor, and responsive to the air/fuel indication and a measurement of inducted air flow, generating a base fuel command. To compensate for purge vapors, a reference air/fuel ratio, related to engine operation without purging, may be subtracted from the air/fuel ratio indication and the resulting error signal (compensation factor) generated. As such, the compensation factor may represent a learned value directly related to fuel vapor concentration, and may be subtracted from the base fuel command to correct for the induction of fuel vapors.

As discussed above with regard to FIG. 1, in other examples one or more oxygen sensors may be positioned in the engine intake, or coupled to the canister (e.g. 104) (e.g., downstream of the canister), to provide an estimate of canister load. In still further examples, one or more temperature sensors (e.g. 157) may be coupled to and/or within canister (e.g. 104). As fuel vapor is desorbed by the adsorbent in the canister, temperature change in the canister may be monitored such that canister load may be estimated based on the temperature change. For example, a temperature decrease during desorption of fuel vapors may be used to estimate canister load.

Accordingly, proceeding to 955, method 900 may include indicating whether the purging event is complete. For example, the purging event may be complete when canister load reaches a predetermined threshold canister load. The predetermined threshold canister load may comprise a canister load that is 10% or less full of fuel vapors. If, at 955, it is indicated that canister purging is not complete, method 900 may return to 950, and may include continuing to purge the contents of the canister to engine intake. However, if at 955 it is indicated that the purging event is complete, method 900 may proceed to 960. At 960, method 900 may include commanding closed the CPV1. By commanding closed the CPV1, the purging operation may be terminated, as the fuel vapor canister may be sealed from the ejector and from engine intake.

Proceeding to 965, method 900 may include updating canister loading state responsive to the recent purging event, and updating a canister purge schedule. For example, the canister loading state may be updated at the controller, and the purge schedule updated to reflect the loading state of the fuel vapor canister. Method 900 may then end.

Returning to 915, if a canister purge request is indicated, but the vehicle is not operating under boost conditions, method 900 may proceed to 970. At 970, method 900 may include indicating whether the vehicle is operating under natural aspiration conditions with the engine operating to combust air and fuel. For example, it may be determined whether MAP is less than BP, for example. As discussed above, such a determination may be indicated via a pressure sensor positioned in an intake manifold (e.g. 116), for example a MAP sensor, and a dedicated barometric pressure sensor (e.g. 119). In other examples, barometric pressure may be indicated via any conventional means. If, at 970 it is indicated that the vehicle engine is operating under natural aspiration conditions with the engine in operation to combust air and fuel, method 900 may proceed to 975. At 975, method 900 may include indicating whether conditions are met for a purge under natural aspiration. For example, conditions being met for purge under natural aspiration conditions may include an indication of MAP less than BP by a predetermined threshold, and may in some examples further include MAP less than BP by the predetermined threshold, for a predetermined time duration. If, at 975, conditions are not met for a purge under natural aspiration conditions, then method 900 may proceed to 980, and may include maintaining vehicle operating conditions. Similar to that described above, at 980, maintaining vehicle operating conditions may include maintaining a status of evaporative emissions system actuators (e.g. CPV1, CPV2, CVV), fuel system actuators (e.g. fuel injectors, etc.), engine operational status (air fuel ratio, spark timing, etc.), etc.

Returning to 975, if it is indicated that conditions are met for a purge operation under natural aspiration conditions, method 900 may proceed to 985. At 985, method 900 may include indicating whether CV1 (e.g. 153) has been previously indicated to be stuck closed. For example, if the dual test monitor described above with regard to method 700 indicated that CV1 is stuck closed, then method 900 may proceed to 990 and may include aborting the purging operation under natural aspiration conditions. More specifically, a stuck closed CV1 may prevent significant vacuum derived from engine intake from reaching the fuel vapor canister. Thus, purging the fuel vapor canister under natural aspiration conditions may be rendered ineffective responsive to an indication of a stuck closed CV1. Accordingly, the purging operation may be aborted at 990. Method 900 may then proceed to 995, and may include updating the fuel vapor canister purging operational status. For example, it may be indicated that a canister purge request was indicated and that conditions were met for a natural aspiration purge operation, but that the purge operation was aborted due to a stuck closed CV1. As the natural aspiration purging operation was aborted, method 900 may thus return to the start of method 900.

Returning to step 985, if it is indicated that conditions are met for a purging operation under natural aspiration, and CV1 is not indicated to be stuck closed, method 900 may proceed to 945. Responsive to method 900 reaching step 945 subsequent to the indication that CV1 is not stuck closed, steps 945 through 965 may proceed exactly as described above. Accordingly, to avoid redundancy, steps 945 through 965 will not be reiterated here.

Turning now to FIG. 10, an example timeline 1000 for conducting evaporative emissions test diagnostic procedures using a dual test monitor approach, as discussed above with regard to FIG. 7, is shown. Timeline 1000 includes plot 1005, indicating whether a key-on event is indicated, over time. Timeline 1000 further includes plot 1010, indicating a status of an electric booster (e.g. 155), over time. In this example, the electric booster may be either on, or off. Timeline 1000 further includes plot 1015, indicating a status of an engine (e.g. 112), over time. The engine may either be off, or may be operated fueled, to combust air and fuel, or may be operating unfueled, for example via a motor (e.g. 220) spinning or rotating the engine without providing fuel or spark to the engine cylinders. Timeline 1000 further includes plot 1020, indicating manifold air pressure (MAP) with respect to barometric pressure (BP), where BP is represented by line 1021. Timeline 1000 further includes plot 1025, indicating whether a first canister purge valve (CPV1) (e.g. 158) is open or closed, plot 1030, indicating whether a second canister purge valve (CPV2) (e.g. 165) is open or closed, and plot 1035, indicating whether a canister vent valve (CVV) (e.g. 172) is open or closed, over time. Timeline 1000 further includes plot 1040, indicating pressure (atmospheric pressure, abbreviated Atm., and negative pressure (vacuum) with respect to atmospheric pressure, abbreviated Vac.) in an evaporative emissions system (e.g. 154) and fuel system (e.g. 106), as indicated by a fuel tank pressure transducer (FTPT) (e.g. 107), for example, over time. Line 1041 represents a predetermined threshold vacuum, which, if reached during an evaporative emissions test diagnostic procedure, may indicate an absence of gross undesired evaporative emissions. Line 1042 represents a predetermined pressure rise threshold, which, if reached subsequent to reaching the predetermined threshold vacuum and subsequent to sealing the fuel system and evaporative emissions system from engine intake and atmosphere, may indicate the presence of non-gross undesired evaporative emissions.

Timeline 1000 further includes plot 1045, indicating whether a first check valve (CV1) (e.g. 153) is indicated to be stuck closed (yes) or not (no), and plot 1050, indicating whether a second check valve (CV2) (e.g. 170) is indicated to be stuck closed (yes) or not (no), over time. Timeline 1000 may further include plot 1055, indicating whether gross undesired evaporative emissions are present in the evaporative emissions system and/or fuel system, over time. For example, gross undesired evaporative emissions may correspond to a predetermined orifice diameter of 0.04", or greater. Timeline 1000 further includes plot 1060, indicating whether non-gross undesired evaporative emissions are present in the evaporative emissions system and/or fuel system, over time. For example, non-gross undesired evaporative emissions may correspond to a predetermined orifice diameter smaller than the predetermined orifice diameter corresponding to gross undesired evaporative emissions.

At time t0, the vehicle is not in operation, as indicated by plot 1005. Accordingly, MAP is indicated to be at BP, indicated by plot 1020, as the engine is not operating. The CPV1 and the CPV2 are closed, indicated by plots 1025 and 1030, respectively, and the CVV is open, indicated by plot 1035. With the CVV open, the fuel system and evaporative emissions are not sealed from atmosphere, and thus a pressure sensor (FTPT) (e.g. 107) positioned between the fuel system and the evaporative emissions system, indicates atmospheric pressure, indicated by plot 1020. CV1 (e.g. 153) is not indicated to be stuck closed, indicated by plot 1045, and CV2 (e.g. 170) is also not indicated to be stuck closed, indicated by plot 1050. Furthermore, gross undesired evaporative emissions are not indicated, illustrated by plot 1055, and non-gross undesired evaporative emissions are not indicated, illustrated by plot 1060.

At time t1, it may be understood that conditions are indicated to be met for conducting an engine-off test for undesired evaporative emissions under boost (see step 310 of method 300). Accordingly, the electric booster (e.g. 155) is activated or actuated on, the CVV is commanded closed, and the CPV2 is commanded open. The CPV1 is maintained closed. With the electric booster activated, pressure in the intake manifold becomes positive with respect to atmospheric pressure, indicated by plot 1020, between time t1 and t2. The positive pressure thus results in a negative pressure with respect to atmospheric pressure developing between time t1 and t2 in the fuel system and evaporative emissions system, the result of the ejector system (e.g. 141), indicated by plot 1040.

At time t2, pressure in the fuel system and evaporative emissions system is indicated to reach the predetermined threshold vacuum, represented by line 1041. Accordingly, because the predetermined threshold vacuum was reached, gross undesired evaporative emissions are not indicated, illustrated by plot 1055, and CV2 is not indicated to be stuck closed, illustrated by plot 1050. Such results may be stored at the controller (e.g. 166), as discussed above. However, while CV2 is not indicated to be stuck closed, it may not be conclusively determined that the CV1 is not stuck closed, as described in detail above.

At time t2, responsive to the predetermined threshold vacuum being reached, the CPV2 is commanded closed, and the CPV1 and CVV are maintained closed. Accordingly, the fuel system and evaporative emissions system may be sealed from engine intake and atmosphere. Pressure in the fuel system and evaporative emissions system may thus be monitored for a predetermined duration, in order to indicate the presence or absence of non-gross undesired evaporative emissions. Accordingly, between time t2 and t3, pressure bleed-up in the fuel system and evaporative emissions system is monitored, as indicated by plot 1040. By time t3, pressure bleed-up is indicated to have remained below the predetermined pressure rise threshold, represented by line 1042. Accordingly, no non-gross undesired evaporative emissions are indicated in the fuel system and evaporative emissions system.

At time t3, the CVV is commanded open. With the CVV commanded open and the CPV1 and CPV2 closed, pressure in the fuel system and evaporative emissions system returns to atmospheric pressure between time t3 and t4, illustrated by plot 1040.

At time t4, it may be understood that conditions are indicated to be met for conducting an evaporative emissions test under natural aspiration conditions, where the engine is operated unfueled, as discussed above at FIG. 5. Conditions being met for conducting such a test are described in detail at step 510 of FIG. 5. It may be understood that, in order for conditions to be met, the threshold duration of time is not indicated to have passed since the prior test under boosted operation, conducted between time t1 and t3. Such a threshold duration is discussed above at steps 726 and 756 of method 700, for example. As conditions are indicated to be met for conducting an unfueled engine spinning evaporative emissions test diagnostic at time t4, the engine is controlled to be spun in a default, or forward direction without providing fuel and spark, as indicated by plot 1015. Furthermore, the CPV2 is commanded open, while the CVV is commanded closed. Accordingly, between time t4 and t5, with the engine spinning unfueled, pressure in the intake manifold decreases to below atmospheric or barometric pressure, indicated by plot 1020.

With the CPV2 commanded open, the CVV commanded closed, and the engine being spun unfueled, pressure in the fuel system and evaporative emissions system may be expected to decrease below atmospheric pressure, if the CV1 is not stuck closed, as gross undesired evaporative emissions were not indicated between time t1 and t2 of example timeline 1000. However, pressure in the fuel system and evaporative emissions system is not indicated to decrease, illustrated by plot 1040. Accordingly, at time t5, it is indicated that the CV1 is stuck closed. In other words, example timeline 1000 may thus represent outcome C, as described above with regard to lookup table 800 depicted above at FIG. 8. More specifically, at time t5, the results from the evaporative emissions test diagnostic conducted under boost (engine-off conditions) and the results of the test conducted under natural aspiration (unfueled engine spinning conditions), may be analyzed by the controller, and interpreted via, for example, a lookup table stored at the controller, such as lookup table 800 depicted at FIG. 8. As the CV1 was indicated to be stuck closed at time t5, a MIL may be illuminated on a dash of the vehicle, alerting the vehicle operator of the stuck closed CV1. Furthermore, at time t5, responsive to completion of the dual test monitor, CPV2 may be commanded closed and the CVV may be commanded open. Accordingly, with the CVV open, pressure in the fuel system and evaporative emissions system returns/remains at atmospheric pressure between time t5 and t6, indicated by blot 1040.

Turning now to FIG. 11, an example timeline 1100 for conducting a purging event under conditions where one of a first check valve or a second check valve positioned in an evaporative emissions system is indicated to be stuck closed, is shown. In this example illustration, it may be understood that CV1 has been indicated to be stuck closed. Timeline 1100 includes plot 1105, indicating whether a fuel vapor canister purging request is indicated, over time. Timeline 1100 further includes plot 1110, indicating manifold air pressure (MAP) with respect to barometric pressure (BP), where BP is represented by line 1111, over time. Timeline 1100 further includes plot 1115, indicating an open or closed state of a first canister purge valve (CPV1) (e.g. 158), plot 1120, indicating an open or closed state of a second canister purge valve (CPV2) (e.g. 165), and plot 1125, indicating an open or closed state of a canister vent valve (CVV) (e.g. 172), over time. Timeline 1100 further includes plot 1130, indicating whether a first check valve (CV1) (e.g. 153) is stuck closed, and plot 1135, indicating whether a second check valve (CV2) (e.g. 170) is stuck closed, over time. Timeline 1100 further includes plot 1140, indicating a canister loading state of a fuel vapor canister (e.g. 104), over time. Line 1141 represents the threshold canister loading state, wherein, if reached during a purging event, the purging event may be indicated to be complete.

At time t0, it may be understood that the vehicle is in operation and that the engine is combusting air and fuel, and that no request for purging the fuel vapor canister has been indicated. MAP is negative with respect to BP, indicated by plot 1110. In other words, it may be understood that the engine is operating under natural aspiration while the engine is combusting air and fuel. As a canister purging operation is not being conducted, the CPV1 is indicated to be closed, illustrated by plot 1115, the CVV is indicated to be open, illustrated by plot 1125, and the CPV2 is indicated to be closed, illustrated by plot 1120. With the CPV1 and the CPV2 closed, the fuel system (e.g. 106) and evaporative emissions system (e.g. 154) may be sealed from engine intake, as discussed above. With the CVV open, the fuel system and evaporative emissions system may be communicatively coupled (fluidically coupled) to atmosphere. As the CVV is open, fuel vapors generated in the fuel tank during vehicle operating conditions (e.g. running loss fuel vapors) may be directed to the fuel vapor canister for storage, prior to exiting to atmosphere. Accordingly, between time t0 and t1, while the engine is in operation, a canister loading state is indicated to increase slightly. As discussed above, in some examples a temperature sensor (e.g. 157) positioned within the fuel vapor canister may be used to infer canister loading state.

At time t1, a purging request is indicated. In some examples, the request for purging may include a canister loading state above a threshold level (not shown), a level of vacuum in the intake manifold greater than a threshold vacuum level (not shown), etc. However, even though a purging request is indicated at time t1, because CV1 has been indicated previously to be stuck closed, the CPV1 may remain closed, and the CVV may remain open. In other words, the purging operation under natural aspiration may be prevented (e.g. aborted). More specifically, CV1 may have been indicated to be stuck closed responsive to running a dual test monitor on the fuel system and evaporative emissions system, such as the dual test monitor depicted in detail above with regard to FIG. 7. As CV1 is indicated to be stuck closed, the purging operation may be prevented, as the stuck closed CV1 may render the purging operation ineffective. Accordingly, between time t1 and t2, vehicle operating conditions are maintained, without conducting a purging operation.

At time t2, MAP is indicated to be equal to BP, and between time t2 and t3, MAP becomes greater than BP. Thus, it may be understood that the engine is operating under boosted conditions with the engine operating to combust air and fuel, between time t2 and t3. At time t3, conditions are indicated to be met for a purging operation under boost conditions with the engine operating to combust air and fuel. For example, conditions being met for a purging operation under boost may include MAP above BP by a predetermined threshold (not shown), for a predetermined time duration (not shown). Conditions being met for a purging operation under boost may further include canister load above a predetermined threshold canister load (not shown), for example. Conditions being met for a purging operation under boost may further include an indication that the CV2 is not stuck closed. Accordingly, at time t3, the CPV1 is commanded open, indicated by plot 1115. As discussed above, by commanding open the CPV1 at time t3, vacuum derived from an ejector (e.g. 140) during boost conditions may be applied to the fuel vapor canister. By applying vacuum to the fuel vapor canister with the CPV1 open and the CVV open, atmospheric air may be drawn across the fuel vapor canister, thus desorbing fuel vapors stored in the fuel vapor canister.

Between time t3 and t4, canister loading state is indicated to decrease. Canister loading state may be indicated via any of the methods described above with respect to FIG. 9, for example. At time t4, canister loading state is indicated to reach the threshold canister loading state, represented by line 1141. Thus, it may be indicated that the fuel vapor canister is substantially free of fuel vapors. In other words, it may be indicated that the fuel vapor canister is clean. Because the canister is indicated to be clean, the CPV1 is commanded closed at time t4, and the purging request is terminated.

Between time t4 and t5, the vehicle remains in operation, and MAP fluctuates, equaling BP at time t5. Between time t5 and t6, the engine is again operating under natural aspiration conditions, indicated by plot 1110.

In this way, an evaporative emissions system may be diagnosed as to the presence or absence of gross undesired evaporative emissions, non-gross undesired evaporative emissions, and whether a CV1 (e.g. 153) and a CV2 (e.g. 170) are functioning as desired. Such indications may allow for mitigating actions to be taken by the vehicle controller, to reduce the release of undesired evaporative emissions to atmosphere, such as via alerting a vehicle operator to have the vehicle serviced. Such indications may additionally allow for canister purge operations to opportunistically conducted, such that canister purge operations are not conducted under circumstances where the purge operation may be ineffective. For example, if a CV1 is stuck closed, then purging may not be conducted under natural aspiration conditions, as described above.

The technical effect is to recognize that for hybrid vehicles, with limited engine run-time (where limited engine run-time refers to conditions where the engine is combusting air and fuel), a dual test monitor, as discussed above at FIG. 7, may be conducted under conditions where the engine is not combusting air and fuel, or under conditions where the engine is operating to combust air and fuel. In this way, the dual test monitor may be conducted more frequently in hybrid vehicles, which may thus result in a reduction in release of undesired evaporative emissions to atmosphere, and which may increase an operational lifetime of the engine.

Additionally, a further technical effect is to recognize that an electric booster may be utilized under conditions where the engine is not combusting air and fuel, to conduct an evaporative emissions test diagnostic on a vehicle fuel system and evaporative emissions system. As discussed, the ability to conduct such a test increase opportunities for detection of sources of undesired evaporative emissions, in vehicles with limited engine run-time, such as hybrid vehicles.

The systems described herein, and with regard to FIGS. 1-2, along with the methods depicted herein, and with regard to FIGS. 3-7 and FIG. 9, may enable one or more systems and one or more methods. In one example, a method comprises under predetermined conditions, supplying air from an electric compressor to an engine that propels a vehicle; evacuating a fuel system and an evaporative emissions system of the vehicle to a threshold vacuum by activating the electric compressor when the engine is off; and indicating a presence or absence of non-gross undesired evaporative emissions based on a pressure rise in the fuel system and the evaporative emissions system after reaching the threshold vacuum. In a first example of the method, the method further includes wherein evacuating the fuel system and the evaporative emissions system via activating the electric compressor further comprises fluidically coupling the fuel system and the evaporative emissions system to an ejector system of the vehicle, where the ejector functions to evacuate the fuel system and the evaporative emissions system when the electric compressor is activated. In a second example of the method, the method further comprises responsive to the threshold vacuum being reached, sealing the fuel system and the evaporative emissions system from atmosphere, and from the engine, in order to indicate the presence or absence of non-gross undesired evaporative emissions based on the pressure rise in the fuel system and the evaporative emissions system. A third example of the method optionally includes any one or more or each of the first and second examples, and further includes wherein indicating the presence or absence of non-gross undesired evaporative emissions based on the pressure rise in the fuel system and evaporative emissions system further comprises: indicating the presence of non-gross undesired evaporative emissions responsive to the pressure rise greater than a predetermined pressure rise threshold, or responsive to the pressure rise greater than a predetermined pressure rise rate threshold, over a predetermined duration of time. A fourth example of the method optionally includes any one or more or each of the first through third examples, and further includes wherein responsive to the threshold vacuum being reached during the evacuating the fuel system and the evaporative emissions system via activating the electric compressor, indicating an absence of gross undesired evaporative emissions in the fuel system and the evaporative emissions system; and indicating that a second check valve, positioned upstream of the ejector system, is functioning as desired. A fifth example of the method optionally includes any one or more or each of the first through fourth examples, and further includes wherein responsive to the threshold vacuum being reached during the evacuating the fuel system and the evaporative emissions system via activating the electric compressor, subsequently evacuating the fuel system and the evaporative emissions system under conditions of negative pressure in an intake of the engine where the electric compressor is off; indicating whether the threshold vacuum is reached during evacuating the fuel system and the evaporative emissions system under conditions of negative pressure in the intake of the engine; and responsive to the threshold vacuum being reached during evacuating the fuel system and the evaporative emissions system under conditions of negative pressure, indicating that a first check valve positioned upstream of the intake is functioning as desired. A sixth example of the method optionally includes any one or more or each of the first through fifth examples, and further comprises responsive to the threshold vacuum not being reached during the evacuating the fuel system and the evaporative emissions system via activating the electric compressor and further responsive to the threshold vacuum not being reached during the evacuating the fuel system and the evaporative emissions system under conditions of negative pressure in the intake of the engine, indicating the presence of gross undesired evaporative emissions in the fuel system and/or evaporative emissions system. A seventh example of the method optionally includes any one or more or each of the first through sixth examples, and further comprises responsive to the threshold vacuum being reached during the evacuating the fuel system and the evaporative emissions system via activating the electric compressor, but where the threshold vacuum is not reached during the evacuating the fuel system and the evaporative emissions system under conditions of negative pressure in the intake of the engine, indicating the first check valve is stuck closed and indicating the absence of gross undesired evaporative emissions in the fuel system and the evaporative emissions system; and responsive to the threshold vacuum not being reached during the evacuating the fuel system and the evaporative emissions system via activating the electric compressor, but where the threshold vacuum is reached during the evacuating the fuel system and the evaporative emissions system under conditions of negative pressure in the intake of the engine, indicating the second check valve is stuck closed and indicating the absence of gross undesired evaporative emissions in the fuel system and the evaporative emissions system. An eighth example optionally includes any one or more or each of the first through seventh examples, and further includes wherein evacuating the fuel system and the evaporative emissions system under conditions of negative pressure in the intake of the engine includes a condition where the engine is combusting air and fuel, or where the engine is spun unfueled, to generate the negative pressure in the intake of the engine. A ninth example optionally includes any one or more or each of the first through eighth examples, and further includes wherein evacuating the fuel system and the evaporative emissions system via activating the electric compressor further comprises drawing air and fuel vapors from a fuel tank positioned in the fuel system through an entirety of a fuel vapor canister positioned in the evaporative emissions system, prior to routing the air and fuel vapors to the engine, the fuel vapor canister configured to adsorb fuel vapors from the fuel tank; and wherein evacuating the fuel system and the evaporative emissions system under conditions of negative pressure in the intake of the engine, where the negative pressure in the intake is generated via spinning the engine unfueled, includes drawing air and fuel vapors from the fuel tank through the entirety of the fuel vapor canister.

Another example of a method comprises evacuating a fuel system and an evaporative emissions system of a vehicle that includes an engine through a first check valve in a first condition, the first condition including negative pressure with respect to atmospheric pressure in an intake of the engine; evacuating the fuel system and the evaporative emissions system through a second check valve in a second condition, the second condition including activating an electric compressor configured to supply air to the engine under predetermined conditions, where the first condition and the second condition are conducted in no particular order and where the first condition and the second condition are conducted within a predetermined time duration of one another; indicating a presence or an absence of gross undesired evaporative emissions in the fuel system and/or evaporative emissions system and indicating whether one of the first check valve or the second check valve is stuck closed, as a function of a vacuum level with respect to a threshold vacuum in the fuel system and evaporative emissions system reached during the evacuating the fuel system and the evaporative emissions system in one or more of the first and second conditions; and indicating a presence or an absence of non-gross undesired evaporative emissions in the fuel system and/or evaporative emissions system in either or both of the first condition and/or the second condition based on a pressure rise in the fuel system and evaporative emissions system, in response to the threshold vacuum being reached and the fuel system and evaporative emission system being sealed from atmosphere and from the engine in either or both of the first condition and/or the second condition. In a first example of the method, the method further includes wherein evacuating the fuel system and the evaporative emissions system of the vehicle in the first condition is conducted via either the engine combusting air and fuel, or via the engine being spun unfueled, where the engine combusting air and fuel and/or where spinning the engine unfueled results in negative pressure with respect to atmospheric pressure in the intake of the engine. A second example of the method optionally includes the first example, and further includes wherein evacuating the fuel system and the evaporative emissions system includes routing fuel vapors from the fuel system through an entirety of a fuel vapor canister positioned in the evaporative emissions system and configured to store fuel vapors from the fuel system, in the first condition where the engine is spun unfueled, or in the second condition where the electric compressor is activated; and wherein evacuating the fuel system and the evaporative emissions system includes routing fuel vapors from the fuel system through a portion of the fuel vapor canister in the first condition where the engine is combusting air and fuel. A third example of the method optionally includes any one or more or each of the first and second examples, and further comprises purging fuel vapors stored in the fuel vapor canister to the engine under select engine operating conditions by fluidically coupling the fuel vapor canister to the engine and by fluidically coupling a vent line stemming from the fuel vapor canister to atmosphere, to draw atmospheric air across the fuel vapor storage canister to desorb fuel vapors; wherein desorbed fuel vapors are routed through either the first check valve or the second check valve depending on the select engine operating conditions; wherein routing desorbed fuel vapors through the first check valve is discontinued responsive to the indication the first check valve is stuck closed; and wherein routing desorbed fuel vapors through the second check valve is discontinued responsive to the indication that the second check valve is stuck closed. A fourth example of the method optionally includes any one or more or each of the first through third examples, and further comprises indicating the second check valve is stuck closed and the absence of gross undesired evaporative emissions responsive to the threshold vacuum not being reached during the second condition but being reached during the first condition; indicating the first check valve is stuck closed and the absence of gross undesired evaporative emissions responsive to the threshold vacuum not being reached during the first condition but being reached during the second condition; indicating both the first check valve and the second check valve are functioning as desired, and indicating the absence of gross undesired evaporative emissions, responsive to the threshold vacuum being reached during both the first condition and the second condition; and indicating the presence of gross undesired evaporative emissions responsive to the threshold vacuum not being reached during both the first condition and the second condition. A fifth example of the method optionally includes any one or more or each of the first through fourth examples, and further includes wherein indicating the presence or the absence of non-gross undesired evaporative emissions in the fuel system and/or evaporative emissions system further comprises: indicating the absence of non-gross undesired evaporative emissions responsive to the pressure rise in the fuel system and evaporative emissions system remaining below a pressure rise threshold, or where a pressure rise rate in the fuel system and evaporative emissions system remains below a pressure rise rate threshold, for a predetermined duration. A sixth example of the method optionally includes any one or more or each of the first through fifth examples, and further includes wherein evacuating the fuel system and the evaporative emissions system through the second check valve in the second condition involves coupling the fuel system and the evaporative emissions system to the engine via an orifice having an inlet pressure reduced by a venturing effect.

A system for a vehicle comprises an engine including an intake; a motor, configured to spin the engine unfueled; a fuel system including a fuel tank, the fuel tank fluidically coupled to an evaporative emissions system comprising a fuel vapor canister; a canister vent valve, positioned in a vent line that couples the fuel vapor canister to atmosphere; a first canister purge valve, positioned in a purge line stemming from the fuel vapor canister; a second canister purge valve, selectively fluidically coupled to the purge line via a first conduit and selectively fluidically coupled to the vent line via a second conduit; a first check valve, positioned in a conduit upstream of an intake of the engine and downstream of the first canister purge valve and the second canister purge valve; a second check valve, positioned in the purge line downstream of the first canister purge valve and the second canister purge valve, and downstream of the conduit upstream of the intake of the engine; an ejector system, positioned downstream of the second check valve; an electric compressor, positioned in the intake upstream of the air intake throttle and configured to supply air to the engine; a fuel tank pressure transducer positioned between the fuel tank and the fuel vapor canister; and a controller storing instructions in non-transitory memory that, when executed, cause the controller to: in a first condition, evacuate the fuel system and evaporative emissions system by commanding closed the canister vent valve, commanding closed the first canister purge valve, commanding open the second canister purge valve and evacuating the fuel system and evaporative emissions system through the first check valve by spinning the engine unfueled via the motor to generate a vacuum in the intake of the engine that serves to evacuate the fuel system and evaporative emissions system; in a second condition, evacuate the fuel system and evaporative emissions system by commanding closed the canister vent valve, commanding closed the first canister purge valve, commanding open the second canister purge valve and evacuating the fuel system and evaporative emissions system through the second check valve via the ejector system with the electric compressor activated; indicate a presence or an absence of gross undesired evaporative emissions and indicate whether the first check valve and the second check valve are functioning as desired, as a function of whether a threshold vacuum is reached during evacuating the fuel system and the evaporative emissions system in both the first and second conditions, where the threshold vacuum is indicated via the fuel tank pressure transducer; and indicate a presence or an absence of non-gross undesired evaporative emissions in the fuel system and the evaporative emissions system based on a pressure rise in the fuel system and the evaporative emissions system as indicated via the fuel tank pressure transducer, in either or both of the first condition and/or the second condition subsequent to the threshold vacuum being reached and subsequent to sealing the fuel system and evaporative emissions system from the intake of the engine and from atmosphere after the threshold vacuum is reached. In a first example of the system, the system further includes wherein the controller stores additional instructions to indicate both the first check valve and the second check valve are functioning as desired and the absence of gross-undesired evaporative emissions in response to the threshold vacuum being reached in both the first condition and the second condition; indicate the first check valve is stuck closed but that the second check valve is functioning as desired and the absence of gross undesired evaporative emissions in response to the threshold vacuum being reached in the second condition but not the first condition; indicate the second check valve is stuck closed but that the first check valve is functioning as desired and the absence of gross undesired evaporative emissions in response to the threshold vacuum being reached in the first condition but not the second condition; and indicate the presence of gross undesired evaporative emissions responsive to the threshold vacuum not being reached during either the first condition or the second condition. A second example of the system optionally includes the first example, and further includes wherein the controller stores additional instructions to, in either or both of the first condition and/or the second condition, in response to the threshold vacuum being reached, seal the fuel system and the evaporative emissions system by commanding closed the second canister purge valve and commanding or maintaining closed the canister vent valve and the first canister purge valve; monitor pressure in the fuel system and evaporative emissions system via the fuel tank pressure transducer; and indicate the presence of non-gross undesired evaporative emissions responsive to pressure in the fuel system and the evaporative emissions system remaining below a pressure rise threshold, or responsive to a rate of pressure rise in the fuel system and the evaporative emissions system remaining below a pressure rise rate threshold, for a predetermined duration of time.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
evacuating a fuel system and an evaporative emissions system of a vehicle that includes an engine through a first check valve in a first condition, the first condition including negative pressure with respect to atmospheric pressure in an intake of the engine;
evacuating the fuel system and the evaporative emissions system through a second check valve in a second condition, the second condition including activating an electric compressor configured to supply air to the engine under predetermined conditions, where the first condition and the second condition are conducted in no particular order and where the first condition and the second condition are conducted within a predetermined time duration of one another;
indicating a presence or an absence of gross undesired evaporative emissions in the fuel system and/or the evaporative emissions system and indicating whether one of the first check valve or the second check valve is stuck closed, as a function of a vacuum level with respect to a threshold vacuum in the fuel system and the evaporative emissions system reached during the evacuating the fuel system and the evaporative emissions system in one or more of the first and second conditions; and
indicating a presence or an absence of non-gross undesired evaporative emissions in the fuel system and/or the evaporative emissions system in either or both of the first condition and/or the second condition based on a pressure rise in the fuel system and the evaporative emissions system, in response to the threshold vacuum being reached and the fuel system and the evaporative emissions system being sealed from atmosphere and from the engine in either or both of the first condition and/or the second condition.

2. The method of claim 1, wherein evacuating the fuel system and the evaporative emissions system of the vehicle in the first condition is conducted via either the engine combusting air and fuel, or via the engine being spun unfueled, where the engine combusting air and fuel and/or where spinning the engine unfueled results in negative pressure with respect to atmospheric pressure in the intake of the engine.

3. The method of claim 2, wherein evacuating the fuel system and the evaporative emissions system includes routing fuel vapors from the fuel system through an entirety of a fuel vapor canister positioned in the evaporative emissions system and configured to store fuel vapors from the fuel system, in the first condition where the engine is spun unfueled, or in the second condition where the electric compressor is activated; and
wherein evacuating the fuel system and the evaporative emissions system includes routing fuel vapors from the fuel system through a portion of the fuel vapor canister in the first condition where the engine is combusting air and fuel.

4. The method of claim 3, further comprising:
purging fuel vapors stored in the fuel vapor canister to the engine under select engine operating conditions by fluidically coupling the fuel vapor canister to the engine and by fluidically coupling a vent line stemming from the fuel vapor canister to atmosphere, to draw atmospheric air across the fuel vapor canister to desorb fuel vapors;
wherein the desorbed fuel vapors are routed through either the first check valve or the second check valve depending on the select engine operating conditions;
wherein routing the desorbed fuel vapors through the first check valve is discontinued responsive to an indication the first check valve is stuck closed; and
wherein routing the desorbed fuel vapors through the second check valve is discontinued responsive to an indication that the second check valve is stuck closed.

5. The method of claim 1, further comprising indicating the second check valve is stuck closed and the absence of gross undesired evaporative emissions responsive to the threshold vacuum not being reached during the second condition but being reached during the first condition;
indicating the first check valve is stuck closed and the absence of gross undesired evaporative emissions responsive to the threshold vacuum not being reached during the first condition but being reached during the second condition;
indicating both the first check valve and the second check valve are functioning as desired, and indicating the absence of gross undesired evaporative emissions, responsive to the threshold vacuum being reached during both the first condition and the second condition; and
indicating the presence of gross undesired evaporative emissions responsive to the threshold vacuum not being reached during both the first condition and the second condition.

6. The method of claim 1, wherein indicating the presence or the absence of non-gross undesired evaporative emissions in the fuel system and/or the evaporative emissions system further comprises:
indicating the absence of non-gross undesired evaporative emissions responsive to the pressure rise in the fuel system and the evaporative emissions system remaining below a pressure rise threshold, or where a pressure rise rate in the fuel system and the evaporative emissions system remains below a pressure rise rate threshold, for a predetermined duration.

7. The method of claim 1, wherein evacuating the fuel system and the evaporative emissions system through the second check valve in the second condition involves coupling the fuel system and the evaporative emissions system to the engine via an orifice having an inlet pressure reduced by a Venturi effect.

* * * * *